United States Patent
Goto

(10) Patent No.: US 7,180,664 B2
(45) Date of Patent: Feb. 20, 2007

(54) SHEET FOR USE FOR PROJECTION SCREEN, LIGHT DIFFUSION SHEET AND PROJECTION SCREEN

(75) Inventor: Masahiro Goto, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/960,469

(22) Filed: Oct. 7, 2004

(65) Prior Publication Data

US 2005/0041287 A1  Feb. 24, 2005

Related U.S. Application Data

(62) Division of application No. 10/144,470, filed on May 13, 2002, now Pat. No. 6,822,792.

(30) Foreign Application Priority Data

| May 14, 2001 | (JP) | ............................. 2001-143219 |
| Aug. 10, 2001 | (JP) | ............................. 2001-243272 |
| Sep. 11, 2001 | (JP) | ............................. 2001-275031 |

(51) Int. Cl.
 G03B 21/56 (2006.01)
 G03B 21/60 (2006.01)
 G02B 27/10 (2006.01)

(52) U.S. Cl. ....................... 359/456; 359/460; 359/628

(58) Field of Classification Search ........ 359/455–457, 359/460, 619, 628
See application file for complete search history.

(56) References Cited

U.S. PATENT DOCUMENTS

| 3,754,811 A | 8/1973 | Hoadley et al. |
| 4,315,671 A | 2/1982 | Bunch |
| 4,468,092 A | 8/1984 | Inoue et al. |
| 4,525,029 A | 6/1985 | Inoue et al. |
| 4,573,764 A | 3/1986 | Bradley |
| 5,768,014 A | 6/1998 | Lee |
| 6,417,966 B1 | 7/2002 | Moshrefzadeh et al. |
| 6,636,355 B2 | 10/2003 | Moshrefzadeh et al. |
| 2004/0160669 A1* | 8/2004 | Osawa et al. ................ 359/457 |

* cited by examiner

*Primary Examiner*—Christopher Mahoney
(74) *Attorney, Agent, or Firm*—Timothy J. Keefer; Seyfarth Shaw LLP

(57) ABSTRACT

A light diffusion sheet or film including a plurality of unit lenses formed of a material having a refractive index N1, each unit lens having a trapezoidal cross-section. At least one between lens portion, having a triangular cross-section, positioned between two of the unit lenses. The between lens portion is formed of a material having a refractive index N2 that is less than N1. If $\theta$ represents an angle defined by a side of the trapezoidal cross-section and a line normal to a base of the trapezoidal cross-section, then $\sin(90-\theta) > N2/N1$ and $N1 < 1/\sin(2\theta)$.

26 Claims, 32 Drawing Sheets

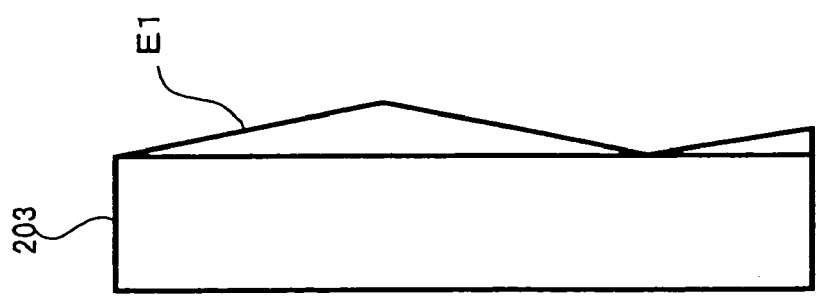
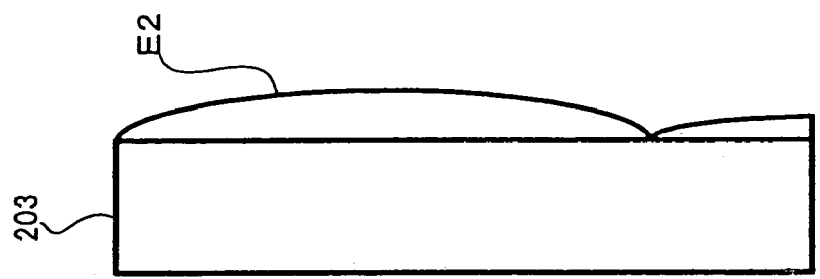
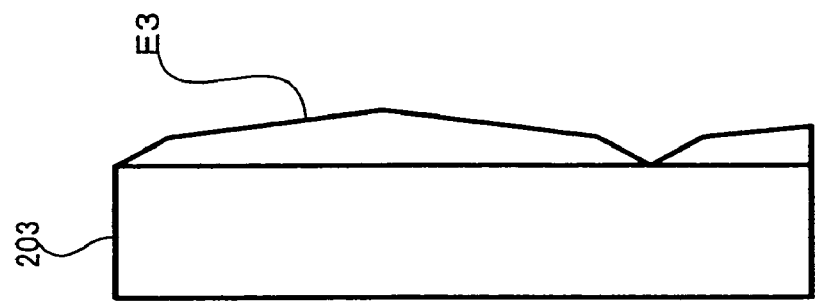
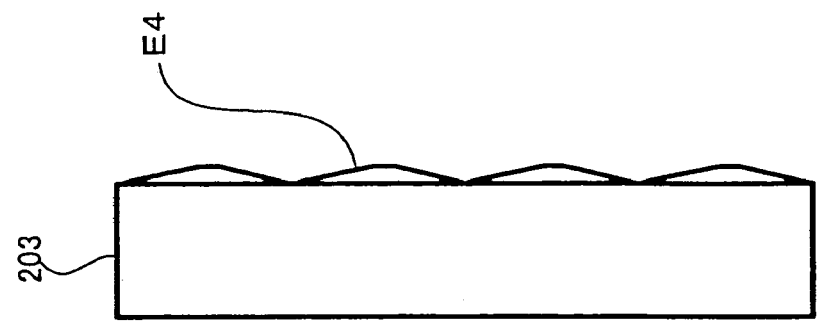

SHEET FOR USE FOR PROJECTION SCREEN, LIGHT DIFFUSION SHEET AND PROJECTION SCREEN

CROSS REFERENCE TO RELATED APPLICATION

This application is a Divisional of U.S. patent application Ser. No. 10/144,470, entitled "SHEET FOR USE FOR PROJECTION SCREEN, LIGHT DIFFUSION SHEET AND PROJECTION SCREEN", filed May 13, 2002 now U.S. Pat. No. 6,822,792 which claims priority of Japanese patent application serial number 2001-243272 filed Aug. 10, 2001, Japanese patent application serial no. 2001-143219 filed May 14, 2001, and Japanese patent application Ser. No. 2001-275031 filed Sep. 11, 2001.

BACKGROUND OF THE INVENTION

1. Field of the Invention

The present invention relates to a sheet or film for use for a projection screen, a projection screen, and a projection display device, and a light diffusion sheet or film and a projection screen using the light diffusion sheet or film, each of which is suitable for being viewed by having obliquely projected thereon an image from an image light source having a cell structure such as an LCD (Liquid Crystal Display Device), or a DMD (Digital Micro-mirror Device).

2. Description of the Related Art

A rear-surface projection type projection display device using three CRTs of red, green, and blue as the image light source and using a transmission type projection screen as the projection screen is conventionally known. In general, the projection screen is constructed using a Fresnel lens sheet and a lenticular lens sheet, and it is the projection screen that is for the purpose of obtaining a diffusion surface having directionality by causing an image to be focused thereon through the use of an image light from a projector. And, as illustrated in FIG. 10, the projection screen 80 has a Fresnel lens sheet 81 having formed on the light emission or outgoing side a circular type Fresnel lens 81b and a lenticular lens sheet 82 that is disposed on the viewer side of that Fresnel lens 81 and has formed on the light incidence side a horizontal diffusion lenticular lens and has formed on the light emission side a black stripe.

And, the Fresnel lens has formed in the acrylic material at prescribed pitches grooves each of that has a prescribed angle and thereby has a function to condense onto the front surface the light rays that have been diffused from the image light in the form of radial rays.

Also, the lenticular lens is the one for obtaining principally a diffused light having directionality in the horizontal direction and has its cylindrical lenses regularly formed in one flat plane in the longitudinal direction lenses to thereby have a function to spread the light distribution property in the horizontal direction.

The projection screen that is used therein, ordinarily, is also only suitable for the projection in the parallel direction in regard to the projection method as well. Generally, for the projection of an image light with respect to the projection screen, the method is adopted that maximizes the focal distance by the use of a reflection mirror. However, in recent years, it has been being observed that the use purpose of the projection screen is increasing in number to a wide variety of use purposes for having people view an image that uses the projection screen. Following this, in regard to the projection method as well, there has been an increasing demand for a projection display device, etc. wherein an image is viewed by projecting the image directly onto the projection screen by projecting from an image light source having a cell structure such as an LCD, a DMD, etc.

If with the conventional system an image is obliquely projected onto the projection screen from the image light source as described above, the difference in size and shape, or the like, between the upper and the lower of the letter or the projected image on the projection screen occurs. This raised the basic problem that the image is very difficult for the viewer to see. For that reason, there had been made at a lot of quarters attempts to provide a projection screen and system enabling viewing by obliquely projecting the image onto the projection screen without lowering the quality level of the image, as one type of projection display device. Under these circumstances, the inventor of this application disclosed in the specification of his Japanese Patent Application Laid-Open No. 2000-180967 a projection screen and a projection display device that is a projection system which in a rear-surface projection type display upwardly or downwardly projects the image from an image light source toward the projection screen while maintaining the quality of the image at a level equal to that which is attained when projecting the image from the image light source in parallel directions with one another and in which a total-reflection prism is provided on the light incidence surface side of the projection screen.

However, since the above-described projection screen necessitates two sheets of lens systems, it is necessary to provide two production lines for manufacturing those respective lenses and, in addition, the operations for handling could not help becoming complicated. Also, since using a circular Fresnel lens or a circular-arc-like prism, there is the problem that continuous production is difficult.

SUMMARY OF THE INVENTION

Whereupon, a first object of the present invention is to provide a sheet or film for use for a projection screen, the projection screen, and a projection display device, and a production method for the sheet or film for use for the projection screen and the projection screen, each of which enables making the handling simple and also enables the performance of continuous production by a single production line.

On the other hand, regarding the projection display device, etc., for the purpose of enhancing the level of the viewer's visual recognition, the one wherein the light diffusion or film is used for the screen is known. As the light diffusion sheet or film, there are, for example, the one wherein concavities/convexities processing is performed on the surface of a light transmission film, the one wherein light diffusion fine particles are contained in the interior of a resin film, a lenticular lens sheet wherein circular-columnar lenses are parallel-disposed in one flat plane, etc. Also, the using of those sheets in combination two or three in number has also been performed. Each of those projection display devices is the one that aims to enhance the visual recognition by, utilizing the difference between the respective indexes of refraction of the film, the atmospheric air, the fine particles, etc., refracting the image light at the boundaries thereof in many directions, diffusing the image light into a wide range of area, and thereby causing it toward the viewer side.

However, that results in that by the sheet surface having formed thereon the light diffusion fine particles or the concavities and convexities the image light has been randomly reflected to cause the occurrence of many stray lights, followed by deterioration in the surface brightness, contrast, etc. of the display. Also, the light diffusion sheet or film that has the diffusion properties as a result of the concavities/convexities processing of the surface, because that diffusion property and transparency property have angle dependency, had the problem that the visual recognition varies depending upon the angle at which the viewer watches the screen. On the other hand, the light diffusion property of the light diffusion sheet or film leads also to increasing the scatter reflection of the external light, with the result that the contrast remarkably decreases, raising the problem that the image becomes likely to be out of focus. On that account, the present invention has a second object to provide a light diffusion sheet or film wherein the surface brightness does not decrease, nor does the contrast deteriorate; the angle dependency is less; and the scatter reflection of the external light is less, and a projection screen using that light diffusion sheet or film.

Further, in the above-described construction, there is the problem that the external light that had entered from the light outgoing surface side has been reflected by the incidence surface of the sheet, followed by the deterioration in the contrast. In addition, when attempting to cause the procurement of the properties with use only of the above-described random diffusion and the diffusion in the one-side surface lens, the upper limit of the gain is only to an extent of 3 and it is impossible to obtain a gain greater that that. On that account, the present invention has a third object to provide a light diffusion sheet or film that can prevent the reflection of external light that has entered from the light emission surface and thereby obtain a high value of gain, and a projection screen using that light diffusion or film.

On the other hand, in the liquid crystal display device, or the like, there is known the one wherein, for enhancing the viewer's visual recognition, a light diffusion sheet is used on the viewer side of the liquid crystal panel. For that light diffusion sheet, there are, for example, the one that is obtained by performing concavity/convexity processing with respect to the surface of a light transmission film, the one wherein light diffusion fine particles are contained in the resin film, a lenticular lens sheet wherein circular-columnar lenses are disposed in parallel with one another on one flat surface, etc. Also, using these sheets two or three in number in combination has been being done, too. Each of these is intended to enhance the visual recognition properties by, utilizing the difference between the refractive indexes of the film, the atmospheric air, the fine particles, etc., refracting the image light rays at the boundary between each two of them in many directions, thereby diffusing the image light rays over a wide range, and making them go out toward the viewer side.

However, that results in that, by the surface of the sheet having formed thereon the light diffusion fine particles, concavities/convexities, etc., the image light rays were randomly reflected to cause the occurrence of a lot of stray light rays, followed by the decrease in the surface brightness and contrast of the display. Also, the light diffusion sheet that has the diffusion properties through the performance of the concavities/convexities processing on the surface has its diffusion properties and transparency change depending upon the angle. Therefore, there is the problem that the visual recognition properties changed according to the angle from that the display has been viewed. On the other hand, the light diffusion properties of the light diffusion sheet lead also to increasing the scatter reflection of the external light and this remarkably decreases the contrast, raising the problem that the image easily gets out of focus. In a case where using a single light diffusion sheet independently, there is also the problem that the enlargement of the angle of visibility in the horizontal, or perpendicular, direction became insufficient.

On that account, the present invention has a fourth object to provide a member with an enlarged two-dimensional angle of visibility, that prevents the decrease in the surface brightness and that of the contrast due to the stray light rays, has less dependency upon the angle, and has the external light rays less scatter reflected, and a display device using that member with an enlarged two-dimensional angle of visibility.

Hereinafter, the present invention will be explained.

In a first aspect of the present invention, the above object is solved by providing a sheet or film for use for a projection screen, the sheet or film being adapted to be used for a screen of a rear surface projection type projection display device and be equipped with a prism surface and a lenticular lens surface, wherein the prism surface and the lenticular lens surface are formed integrally with each other in the way in which their respective reverse surfaces are bonded together; the prism surface is formed, as a total reflection linear Fresnel lens, on at least a part of an image light source side of the display device; and the lenticular lens surface is formed on a viewer side of the linear Fresnel lens in the way in which its cross section is in the shape of a trapezoid.

According to this first aspect of the present invention, since the projection screen that has been conventionally constructed of two lens sheets can be constructed of a single sheet of lens, the number of production processes can be reduced and therefore the productivity can greatly be enhanced. Resultantly, the invention can contribute to achieving the cost-down of the product. Also, in case comparison is made with the construction that is made up of two sheets of lenses, the invention is also advantageous from the viewpoint of the transmittance. Also, since the lens assembly is comprised of the linear Fresnel lens and the lenticular lens the cross section of that is trapezoidal, continuous manufacture thereof on the production line becomes possible. From this viewpoint as well, it is possible to greatly enhance the productivity.

In the above-described aspect of the invention, the angle defined by one slant of the trapezoid of the lenticular lens may be formed in the way of being made different in the width direction thereof so that the optical axis, as viewed in the horizontal direction, of an image light may be corrected.

If that is done like that, the optical-axial correction in the horizontal direction and therefore it is possible to provide an excellent image to the viewers.

Also, in this aspect of the invention, on the viewer side of the slant of the trapezoid there may be disposed a material having a refractive index lower than the refractive index of a material constituting the trapezoid. In this case, the material having a low refractive index may be constructed of a solid, liquid, or gaseous one regardless of whether it is solid, liquid, or gaseous. In addition, that material needs only to be adhered substantially onto the entire surface of the slant of the trapezoid. Accordingly, that material may be filled on the whole surface of the "V"-shaped groove intervening between two adjacent of the trapezoids or on a part of the surface thereof.

If the invention is constructed like that, the light rays that go through the lenticular lens toward the viewer are for the most part reflected by the slant of the trapezoid. As a result of this, it is possible to obtain a light diffusion in the horizontal direction and hence it becomes possible to ensure a large angle of visibility in the horizontal direction.

In a case where the invention is constructed like that, further, it may be arranged that the material having a lower refractive index be colored. And, the material having a lower refractive index may be colored by adding dye, pigment, or light absorption particles.

In a case where the invention is constructed like that, even when there is a light that has transmitted through the slant of the trapezoid without being reflected by it, it can be absorbed into within the colored low refractive index material. Also, coloring can be achieved by adding to the low refractive index material various kinds of materials including dye, pigment, light absorption particles, etc.

In the above-described first aspect of the invention, on the viewer side of the slant of the trapezoid there may be formed a layer consisting of a low refractive index material having a refractive index lower than the refractive index of a material constituting the trapezoid.

If that is done like this, the amount of the low refractive index material can be mitigated, thereby enabling the reduction in the weight of the screen. Also, it is possible to further form a third layer on the layer of the low refractive index material, thereby imparting a desired function.

Also, on the viewer side of the low refractive index material there may be provided a light absorption portion. In this case, that light absorption portion may be provided by providing on the viewer side of the layer of the low refractive index material a black stripe, for example, with the use of a black color painting.

If doing this, even when there is a light that has transmitted without being reflected by the slant of the trapezoid, that light can be absorbed by the light absorption portion, whereby the same effect as that obtainable when coloring the low refractive index material can be obtained.

Further, it may be arranged that on the viewer side of the slant of the trapezoid there be formed a reflection layer of metal.

In a case where doing like that, it is possible to almost completely reflect the light that is going to transmit the slant of the trapezoid from inside the lenticular lens regardless of the index of refraction of the material that is disposed on the viewer side of the slant of the trapezoid.

Also, the invention may be constructed as a sheet or film for use for the projection screen wherein on the viewer side of the sheet or film for use for the projection screen according to the above-described aspect there is further provided a diffusion layer.

If constructing like that, the diffusion in both the horizontal direction and the vertical direction of the screen is compensated for, with the result that the uniformity of the image can be improved.

In a second aspect of the present invention, the above object is solved by providing a projection screen wherein on the viewer side of the sheet or film for use for the projection screen according to the above-described aspect of the invention there is further provided a diffusion sheet.

According to the second aspect of the present invention, it is possible to use in the projection screen the sheet or film for use for the projection screen having the effect attainable with the above-described first aspect of the invention. In addition, the diffusion in both the horizontal and vertical directions of the screen is compensated for by the diffusion sheet, thereby enabling further improvement of the image in terms of the uniformity.

In the above-described aspect, the invention may be constructed in the way in which on the viewer side there is provided at least one function selected from the group consisting of an AR, a HC, an AS, an AG, a soil-resistant function, and a sensor. Here, the "AR" is an abbreviation of the anti-reflection and is referred to as the function to suppress the reflectance of the light entering the surface of the lens. Also, the "HC" is an abbreviation of the hard coat and is referred to as the wear-resisting function to prevent the formation of scratches or claws on the surface of the lens by having the strength of the surface of the lens increased. The "AS" is an abbreviation of the anti-static and is referred to as the anti-static function. Also, the "AG" is an abbreviation of the anti-glare and is referred to as the anti-glare function of the lens. The "soil-resistant function" is referred to as the function to prevent soil from attaching onto the surface of the lens. And, the "sensor" is referred to, for example, as a touch sensor. In the present invention, it may be made to have only one function, or have multiple functions, of such functions.

In a case where doing like that, it is possible to make the projection screen have a third function to thereby make the product attractive to the demanders.

In a third aspect of the present invention, the above object is solved by a projection display device equipped with the projection screen according to the second aspect of the invention.

If doing like that, the projection screen having the above-described effect can be applied to the projection display device.

In a fourth aspect of the present invention, the above object is solved by a production method of producing a sheet or film for use for a projection screen which comprises: a step of continuously forming a linear Fresnel lens in the longitudinal direction on one-surface side of a base sheet; and a step of continuously forming a lenticular lens, the cross section of that is trapezoidal, on the-other-surface side of the base sheet. Also, in a fifth aspect of the present invention, the above object is solved by providing a production method of producing a projection screen, which comprises: a step of continuously forming a linear Fresnel lens on one-surface side of a base sheet; a step of continuously forming a lenticular lens, the cross-section of that is trapezoidal, in the longitudinal direction on the-other-surface side of the base sheet; and a step of bonding a light diffusion sheet on a surface of the continuously formed lenticular lens.

According to the production method of those fourth and fifth aspects of the invention, the sheet or film for use for the projection screen, and the projection screen, can be produced on the continuous production line and therefore the productivity is remarkably increased, and, also, a large reduction in the manufacturing cost can be achieved.

A light diffusion sheet or film according to a sixth aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and the unit lens is formed using a material having a prescribed refractive index of N1; a portion, the cross section of that is triangular, and that is located between adjacent two of the unit lenses, is formed using a material having a refractive index N2 lower than the N1 and having added thereto light absorption particles; and when it is assumed that θ represents the angle defined by the slant of the trapezoid with respect to a normal line to the light emission portion, the relationship holds true that is expressed as:

$$\sin(90°-\theta) > N2/N1$$

and $N1 < 1/\sin 2\theta$

Also, a light diffusion sheet or film according to a seventh aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion and is formed using a material having a prescribed refractive index N1; the portion of the slant of the trapezoid has formed thereon a transparent low refractive index layer having a refractive index of N2 lower than the N1; a portion, the cross section of that is triangular, and that is located between adjacent two of the unit lenses, is formed using a material having a refractive index higher than the N2 and having added thereto light absorption particles;

and when it is assumed that θ represents the angle defined by the slant of the trapezoid with respect to a normal line to the light emission portion, the relationship holds true that is expressed as:

$\sin(90°-\theta) > N2/N1$ and $N1 < 1/\sin 2\theta$

In this aspect of the invention, since the cross-sectional configuration of the unit lens is substantially trapezoidal, the θ is constant, namely the slant basically is in the shape of a straight line. However, the present invention includes a case where the slant is curvilinear or in the form of a combination comprised of multiple straight lines each two of that defines a shallow angle. In this case, although the θ varies, if 90% or more of the θ at each portion constituting the slant satisfies the above-described relationship, the below-mentioned effect can be brought about. Therefore that case should be construed as being included in the technical concept of the present invention (The same applies to the θ in the following description.).

According to the light diffusion or film of the sixth and the seventh aspect of the invention, the incident light parallel with the normal line to the light emission surface is totally reflected by the slant of the cross-sectionally viewed trapezoid and is not reflected at all by the light emission surface and instead goes toward the viewer side. Also, the stray light within the sheet or the light that has entered from the viewer side is absorbed by the light absorption particles. Especially, since, in the present invention, the entire cross-sectionally viewed triangle portion is not constructed using the light absorption particles but is constructed using a material wherein the light absorption particles are diffused into the transparent material, the total reflection at the slant portion can be highly efficiently made. Accordingly, it is possible to obtain a light diffusion sheet or film the brightness and contrast of that are respectively high. In addition, the total reflection at the slant portion and the light absorption of the cross-sectionally viewed triangle portion can be realized by being made compatible at a high level, without being affected by the coloring concentration for a material capable of absorbing light.

The screen of the present invention is for use for a single-light-source projector, and, on account of using the Fresnel lens, the angle of incidence upon the present sheet can be made perpendicular. Incidentally, it is known that the angle of incidence upon the slant is generally in a range of 0°±10°.

A light diffusion sheet or film according to an eighth aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and a portion, the cross section of that is triangular, and that is located between adjacent two of the unit lenses, is formed using a material having a refractive index lower than that of the unit lens and having added thereto light absorption particles; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as;

$0 < H < T/(\tan(2\theta+10°) - \tan\theta)$

A light diffusion sheet or film according to a ninth aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; the portion of the slant of the trapezoid has formed thereon a transparent low refractive index layer having a refractive index lower than that of the unit lens; a portion, the cross section of that is triangular, and that is located between adjacent two of the unit lenses, is formed using a material having a refractive index higher than that of the transparent low refractive index and having added thereto light absorption particles; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as:

$0 < H < T/(\tan(2\theta+10°) - \tan\theta)$

According to the light diffusion sheet or film of these eighth and ninth aspects, even a light that has entered at a 10° degree angle of inclination at maximum with respect to the normal line to the light emission surface and that has been reflected by the surface of the transparent low refractive index layer of the trapezoid slant formed by the cross section of the unit lens is made to go out from the light emission surface toward the viewer side without reaching the transparent low refractive index layers of the trapezoid slants formed by adjacent two of the cross sections of the unit lenses. Also, the stray light within the sheet or the light that has entered from the viewer side is absorbed by the light absorption particles. In the present invention as well, the entire cross-sectionally viewed triangle portion is not constructed using the light absorption particles but is constructed using a material wherein the light absorption particles are diffused into the transparent material, the total reflection at the slant portion can be highly efficiently made. Accordingly, it is possible to obtain a light diffusion sheet or film the brightness of that is high and the stray light of that is less.

A light diffusion sheet or film according to a tenth aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and the unit lens is formed using a material having a prescribed refractive index of N1; a portion, the cross section of that is triangular, and that is located between adjacent two of the unit lenses, is formed using a material having a refractive index N2 lower than the N1 and having added thereto light absorption particles; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as:

$\sin(90°-θ) > N2/N1$ $N1 < 1/\sin 2θ$ and $0 < H < T/(\tan(2θ+10°)-\tan θ)$

Also, a light diffusion sheet or film according to an eleventh aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and the unit lens is formed using a material having a prescribed refractive index of N1; the portion of the slant of the trapezoid has formed thereon a transparent low refractive index layer having a refractive index of N2 lower than the N1; a portion, the cross section of that is triangular, and that is located between adjacent two of the unit lenses, is formed using a material having a refractive index higher than the N2 and having added thereto light absorption particles; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as:

$\sin(90°-θ) > N2/N1$ $N1 < 1/\sin 2θ$ and $0 < H < T/(\tan(2θ+10°)-\tan θ)$

This light diffusion sheet or film according to the tenth and the eleventh aspect of the present invention has the merits of the seventh and the ninth aspect as well as the sixth and the eighth aspect of the present invention. According to each of these light diffusion sheet or film, the incident light rays that are parallel with the normal line to the light emission surface are totally reflected by the surface of the transparent low refractive index layer of the slant and, at the light emission surface, are made to go out toward the viewer side without undergoing the total reflection. Also, even a light that has entered at a 10 degrees angle of inclination at maximum with respect to the normal line to the light emission surface and that has been reflected by the surface of the transparent low refractive index layer of the trapezoid slant formed by the cross section of the unit lens is made to go out from the light emission surface toward the viewer side without reaching the transparent low refractive index layers of the trapezoid slants formed by adjacent two of the cross sections of the unit lenses. In the present invention as well, the entire cross-sectionally viewed triangle portion is not constructed using the light absorption particles but is constructed using a material wherein the light absorption particles are diffused into the transparent material. Therefore, the total reflection at the slant portion can be highly efficiently made. Accordingly, it is possible to obtain a light diffusion sheet or film the brightness and contrast of that are high and the stray light of that is less.

In the light diffusion sheet or film of the tenth aspect of the present invention, it may be constructed in the way in which the prescribed refractive indexes N1 and N2 and the length T and height H of the upper bottom of the trapezoid satisfy the relationship of:

$1 < N1 < 5.76$ $0.23 < N2/N1 < 0.996$ and $H < T/0.57$

This modification can also be suitably applied to the light diffusion or film of each of the sixth to the eleventh aspect, independently, or in a form combined with other modifications.

In a case where the invention is constructed like that, in the light diffusion or film according to the tenth aspect of the invention, when the θ is in a range of 5° to 15°, the incident light rays that are parallel with the normal line to the light emission surface can be totally reflected by the slant surface and at the light emission surface can be made to go out toward the viewer side without the occurrence of reflection. Also, once it has been reflected within the sheet by the slant surface, the light is made to go out from the light emission surface without reaching another slant surface again. Here, the reason why the range of the e has been set to 5° to 15° is because a suitable angle of visibility characteristic can be obtained by making the taper angle of the unit lens range from 5° to 15°.

In the light diffusion sheet or film of the seventh aspect, the thickness of the transparent low refractive index layer may be 0.1 μm or more. This modification can also be suitably applied to the light diffusion or film of the sixth to the eleventh aspect, independently, or in a formed combined with other modifications.

If doing like that, it is possible to make the total reflection resulting from the transparent low refractive index layer reliable. Also, in the light diffusion sheet or film according to the sixth aspect, the amount of the light absorption particles added to the material forming the portion the cross section of that is triangular may be between 10 and 60 mass %. The amount of the light absorption particles more preferably is between 30 and 50 mass %. This modification can also be suitably applied to the light diffusion or film of the sixth to the eleventh aspect, independently, or in a formed combined with other modifications.

In a case where constructing like that, it is possible to make the addition effect of the light absorption particles maximum. When the amount added is smaller than that, the amount filled into the cross-sectionally viewed triangle portion becomes deficient and resultantly the width of the so-called black stripe becomes narrow, which results in that the contrast deteriorates. Also, if adding in an amount larger than that, it is unpreferable because the light absorption particles inconveniently remain on the light emission surface (the upper bottom portion of the trapezoid).

Also, in the light diffusion sheet or film according to the sixth aspect, the average particle size of the light absorption particles may be from 1/30 to 2/3, or more preferably from 1/20 to ⅕, of the height, or the opening width of the groove, of the light emission portion forming the upper bottom of the cross-sectionally viewed trapezoid. This modification can also be suitably applied to the light diffusion or film of the sixth to the eleventh aspect, independently, or in a formed combined with other modifications.

By doing so, the light absorption effect can be made high inefficiency. In addition, when manufacturing, it can be filled into the cross-sectionally viewed triangle portion without any problem coming up. In a case where making the particle size larger than necessary, the particles inconveniently protrude from the defining line of the triangle portion without being sufficiently buried within that triangle portion, with the result that it becomes more likely that clearances are produced. Conversely, in a case where the particle size is smaller than necessary, although the filling into the triangle portion becomes easier, it becomes difficult at the time of manufacture to scratch the light absorption particles off from the light emission surface. Resultantly, the tendency becomes higher that the light absorption particles remain on the light emission surface of the lens.

Also, in the light diffusion sheet or film according to the sixth aspect of the invention, the light emission portion may be formed in the way of being made convex toward the viewer side. This modification can also be suitably applied to the light diffusion or film of the sixth to the eleventh aspect, independently, or in a formed combined with other modifications.

If doing so, the light absorption particles are prevented from being left on the light emission portion at the time of manufacture. Therefore, such is convenient.

Also, in the light diffusion sheet or film according to the sixth aspect, the unit lens may be formed on a plate-like, or a film-like, transparent base member. This modification can also be suitably applied to the light diffusion or film of the sixth to the eleventh aspect, independently, or in a formed combined with other modifications.

In a case where having done so, it is possible, using the die roll, to perform manufacture of the arrayed unit lenses continuously.

Also, in the light diffusion sheet or film according to the sixth aspect, it may have bonded thereto on the viewer side a sheet having mixed therein a diffusion agent.

In a case where having done so, since the surface on the viewer side can be made a flat plane, machining with respect to the obverse surface becomes easy. Also, owing to the optical action of the diffusion agent, the gain on the light emission side can be uniformly leveled. The index of refraction of a bond layer or adhesion layer for bonding that diffusion agent-mixed sheet may be approximately the same as that of the unit lens. This is because it is thought that no adverse effects as optically viewed exist.

In a case where having constructed as mentioned above, on the viewer side of the diffusion agent-mixed sheet there may be provided at least one of an anti-reflection layer, a hard coat layer, a polarizing filter layer, an anti-static layer, a glare-proofing layer, a soil-proofing layer, and a touch sensor layer. In the present invention, it may be arranged that only one of those functions be provided on the viewer side, or multiple ones thereof be provided thereon.

In a case where having constructed in a such-like way, the light diffusion sheet or film can be made to have a variety of functions.

Also, further, in the present invention, the above object is solved by providing a projection screen wherein the Fresnel lens is disposed on the image light source side of any one of the light diffusion sheets or films.

According to that the above, the properties of the light diffusion sheet can be realized in the projection screen.

Also, in that projection screen, it may be arranged that the slant of the cross-sectionally viewed trapezoid of each of a plurality of the unit lenses be formed in the way of being extended in the vertical direction.

According to the above, the light can be diffused horizontally.

A light diffusion sheet or film according to a twelfth aspect of the invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and the unit lens is formed using a material having a prescribed refractive index of N1; a portion, the cross section of that is triangular, and that is located between adjacent two of the unit lenses, is formed using a material having a refractive index of N2 lower than the N1 and having added thereto light absorption particles, or a material having a refractive index of N2 lower than the N1 and having been colored; and when it is assumed that $\theta$ represents the angle defined by the slant of the trapezoid with respect to a normal line to the light emission portion, the relationship holds true that is expressed as:

$$\sin(90°-\theta) > N2/N1$$

and $$N1 < 1/\sin 2\theta$$

and the surface of the light incidence portion has performed thereon embossing processing.

Also, a light diffusion sheet or film according to a thirteenth aspect of the invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and the unit lens is formed using a material having a prescribed refractive index of N1; the portion of the trapezoid slant has formed thereon the transparent low refractive index having a refractive index layer of N2 lower than the N1; a portion, the cross section of that is triangular, and that is located between adjacent two of the unit lenses, is formed using a material having a refractive index higher than the N2 and having added thereto light absorption particles, or a material having a refractive index higher than the N2 and having been colored; and when it is assumed that $\theta$ represents the angle defined by the slant of the trapezoid with respect to a normal line to the light emission portion, the relationship holds true that is expressed as:

$$\sin(90°-\theta) > N2/N1$$

and $$N1 < 1/\sin 2\theta$$

and the surface of the light incidence portion has performed thereon embossing processing. Here, since the cross-sectional configuration of the unit lens is substantially trapezoidal, the $\theta$ is constant, namely the slant basically is in the shape of a straight line. However, the present invention includes a case where the slant is curvilinear or in the form of a combination of multiple straight lines each two of that defines a shallow angle. In this case, although the $\theta$ varies, if 90% or more of the $\theta$ at each portion constituting the slant satisfies the above-described relationship, the below-mentioned effect can be brought about. Therefore that case should be construed as being included in the technical concept of the present invention (The same applies to the θ in the following description.).

According to the light diffusion sheet or film according to the twelfth and the thirteenth aspect, since the surface of the light incidence portion is subjected to embossing processing, of the external light rays that have entered from the sheet light emission portion side the light rays that reach the sheet light incidence portion and are reflected are diffused and are incident upon the slant portion at a large angle. Therefore, they enter the cross-sectionally viewed triangle portion without being totally reflected by the slant portion and are absorbed into the light absorption particles or a colored material. This enables enhancing the contrast of the light diffusion or film. Further, the incident light rays that are parallel with the normal line to the light emission surface are totally reflected by the surface of the cross-sectionally viewed trapezoid slant within the light diffusion sheet or film and are emitted toward the viewer side without the occurrence of reflection at the light emission surface. Also, the stray light within the sheet or the light that has entered from the viewer side is absorbed by the light absorption particles or the coloring material. Accordingly, it is possible to obtain a light diffusion sheet or film that has high brightness and contrast.

The screen of the present invention is mainly for use for a single-light-source projector, and, on account of using the Fresnel lens, the angle of incidence upon the present sheet can be made perpendicular. Incidentally, it is known that the angle of incidence upon the slant is generally in a range of 0°±10.

A light diffusion sheet or film according to a fourteenth aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and a portion, the cross section of that is triangular, and that is located between adjacent two of the unit lenses, is formed using a material having a refractive index lower than that of the unit lens and having added thereto light absorption particles or a material having a refractive index lower than that of the unit lens and having been colored; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as:

$$0<H<T/(\tan(2\theta+10°)-\tan\theta)$$

and the surface of the light incidence portion has performed thereon embossing processing.

Also, a light diffusion sheet or film according to a fifteenth aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; the portion of the trapezoid slant has formed thereon a transparent low refractive index layer having a refractive index lower than that of the unit lens; and a portion, the cross section of that is triangular, and that is located between adjacent two of the unit lenses, is formed using a material having a refractive index higher than that of the transparent low refractive index layer and having added thereto light absorption particles or a material having a refractive index higher than that of the transparent low refractive index layer and having been colored; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as:

$$0<H<T/(\tan(2\theta+10°)-\tan\theta)$$

and the surface of the light incidence portion has performed thereon embossing processing.

According to the light diffusion sheet or film according to the fourteenth and fifteenth aspect, since the surface of the light incidence portion is subjected to embossing processing, of the external light rays that have entered from the sheet light emission portion side the light rays that reach the sheet light incidence portion and are reflected are diffused and are incident upon the slant portion at a large angle. Therefore, they enter the cross-sectionally viewed triangle portion without being totally reflected by the slant portion and are absorbed into the light absorption particles or the colored material. This enables enhancing the contrast of the light diffusion or film. Further, even the incident light rays that enter the light diffusion sheet or film at a 10 degrees angle of inclination at maximum as defined with respect to the light emission surface and that have been reflected by the surface of the transparent low refractive index layer of the trapezoid slant formed by the cross section of the unit lens are made to go out from the light emission surface toward the viewer side without reaching the transparent low refractive index layer of the trapezoid slant formed by the cross sections of two adjacent of the unit lenses. Also, the stray light within the sheet or the light that has entered from the viewer side is absorbed by the light absorption particles or the colored material.

A light diffusion sheet or film according to a sixteenth aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and the unit lens is formed using a material having a prescribed refractive index of N1; a portion, the cross section of that is triangular, and that is located between adjacent two of the unit lenses, is formed using a material having a refractive index N2 lower than the N1 and having added thereto light absorption particles, or a material having a refractive index N2 lower than the N1 and being colored; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as:

$$\sin(90°-\theta)>N2/N1$$

$$N1<1/\sin 2\theta$$

and $$0<H<T/(\tan(2\theta+10°)-\tan\theta)$$

and the surface of the light incidence portion has performed thereon embossing processing.

A light diffusion sheet or film according to a seventeenth aspect of the present invention is the one having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and the unit lens is formed using a material having a prescribed refractive index of N1; the portion of the trapezoid slant has formed thereon a transparent low refractive index layer having a refractive index N2 lower than the N1; a portion, the cross section of that is triangular, and that is located between adjacent two of the unit lenses, is formed using a material having a refractive index higher than the N2 and having added thereto light absorption particles, or a material having a refractive index higher than the N2 and being colored; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as:

$\sin(90°-\theta) > N2/N1$ $N1 < 1/\sin 2\theta$ and $0 < H < T/(\tan(2\theta+10°)-\tan \theta)$ and the surface of the light incidence portion has performed thereon embossing processing.

The light diffusion sheet or film according to each of the sixteenth and the seventeenth aspect also has concurrently the merits that are obtained with each of the twelfth and the fourteenth, and the thirteenth and the fifteenth aspect of the invention. According to each of those light diffusions or films, since the surface of the light incidence portion is subjected to embossing processing, of the external light rays that have entered from the sheet light emission portion side the light rays that reach the sheet light incidence portion and are reflected are diffused and are incident upon the slant portion at a large angle. Therefore, they enter the cross-sectionally viewed triangle portion without being totally reflected by the slant portion and are absorbed into the light absorption particles or the colored material. This enables enhancing the contrast of the light diffusion or film. Further, the incident light rays that are parallel with the normal line to the light emission surface are totally reflected by the transparent low refractive index layer surface of the trapezoid slant and are emitted toward the viewer side without the occurrence of reflection at the light emission surface. Also, the light that has entered the light diffusion sheet or film at a 10 degrees angle of inclination at maximum with respect to the normal line to the light emission surface and that has been reflected by the surface of the transparent low refractive index layer of the trapezoid slant formed by the cross section of the unit lens is made to go out from the light emission surface toward the viewer side without reaching the transparent low refractive index layers of the trapezoid slants formed by adjacent two of the cross sections of the unit lenses. Accordingly, it is possible to obtain a light diffusion sheet or film the brightness and contrast of that are respectively high and the stray light of that is less.

In the light diffusion sheet or film according to the sixteenth aspect, it nay be arranged that T representing the length of the upper bottom of the trapezoid, H representing the height of the upper bottom thereof, and θ representing the angle defined by the slant of the trapezoid with respect to a normal line to the light emission portion satisfy the relationship which is expressed as:

$1 < N1 < 5.76$ $0.23 < N2/N1 < 0.996$ and $H < T/0.57$

This modification can also be suitably applied to the light diffusion or film according to each of the other aspects that are described in and after the twelfth aspects, independently, or in a form combined with other modifications. In a case where the invention is constructed like that, in the light diffusion or film according to the fifth or the sixth aspect of the invention, when the θ is in a range of 5° to 15°, the incident light rays that are parallel with the normal line to the light emission surface can be totally reflected by the slant surface and at the light emission surface can be made to go out toward the viewer side without the occurrence of reflection. Also, once it has been reflected within the sheet by the slant surface, the light is made to go out from the light emission surface without reaching another slant surface again. Here, the reason why the range of the θ has been set to 5° to 15° is because a suitable angle of visibility characteristic can be obtained by making the taper angle of the unit lens range from 5° to 15°.

In the light diffusion sheet or film of the thirteenth aspect, the thickness of the transparent low refractive index layer may be 0.1 μm or more. This modification can also be suitably applied to the light diffusion or film according to each of the other aspects that are described in and after the twelfth aspects, independently, or in a form combined with other modifications.

If doing like that, it is possible to make the total reflection resulting from the transparent low refractive index layer reliable.

Also, in the light diffusion sheet or film according to the twelfth aspect, the amount of the light absorption particles added to the material forming the portion the cross section of that is triangular may be between 10 and 60 mass %. The amount of the light absorption particles more preferably is between 30 and 50 mass %. This modification can also be suitably applied to the light diffusion or film according to each of the other aspects that are described in and after the twelfth aspects, independently, or in a form combined with other modifications.

In a case where constructing like that, it is possible to make the addition effect of the light absorption particles maximum. When the amount added is smaller than that, the amount filled into the cross-sectionally viewed triangle portion becomes deficient and resultantly the width of the so-called black stripe becomes narrow, which results in that the contrast deteriorates. Also, if adding in an amount larger than that, the light absorption particles inconveniently remain on the light emission surface (the upper bottom portion of the trapezoid).

Also, in the light diffusion sheet or film according to the twelfth aspect, the average particle size of the light absorption particles may be from 1/30 to 2/3, or more preferably from 1/20 to 1/3, of the height, or the opening width of the groove, of the light emission portion forming the upper bottom of the cross-sectionally viewed trapezoid. This modification can also be suitably applied to the light diffusion or film according to each of the other aspects that are described in and after the twelfth aspects, independently, or in a form combined with other modifications.

By doing so, the light absorption effect can be made high inefficiency. In addition, when manufacturing, it can be filled into the cross-sectionally viewed triangle portion without any problem coming up. In a case where making the particle size larger than necessary, the particles inconveniently protrude from the defining line of the triangle portion without being sufficiently buried within that triangle portion, with the result that it becomes more likely that clearances are produced. Conversely, in a case where the particle size is smaller than necessary, although the filling into the triangle portion becomes easier, it becomes difficult at the time of manufacture to scratch the light absorption particles off from the light emission surface. Resultantly, the tendency becomes higher that the light absorption particles remain on the light emission surface of the lens.

Also, in the light diffusion sheet or film according to the twelfth aspect of the invention, the light emission portion may be formed in the way of being made convex toward the viewer side. This modification can also be suitably applied to the light diffusion or film according to each of the other aspects that are described in and after the twelfth aspects, independently, or in a form combined with other modifications.

If doing so, the light absorption particles are prevented from being left on the light emission portion at the time of manufacture. Therefore, such is convenient.

Also, in the light diffusion sheet or film according to the twelfth aspect, the unit lens may be formed on a plate-like, or a film-like, transparent base member. This modification can also be suitably applied to the light diffusion or film according to each of the other aspects that are described in and after the twelfth aspects, independently, or in a form combined with other modifications.

In a case where having done so, it is possible, using the die roll, to perform manufacture of the arrayed unit lenses continuously.

Also, in the light diffusion sheet or film according to the twelfth aspect, it may have bonded thereto on the viewer side a sheet having mixed therein a diffusion agent. This modification can also be suitably applied to the light diffusion or film according to each of the other aspects that are described in and after the twelfth aspects, independently, or in a form combined with other modifications. In a case where doing like that, since the surface on the viewer side can be made flat, machining with respect to the surface becomes easy. Also, owing to the optical action of the diffusion agent, the gain on the light emission side can be uniformly leveled. The index of refraction of a bond layer or adhesion layer for bonding that diffusion agent-mixed sheet may be approximately the same as that of the unit lens. This is because it is thought that no great effects as optically viewed exist.

In a case where having constructed as mentioned above, on the viewer side of the diffusion agent-mixed sheet there may be provided at least one of an anti-reflection layer, a hard coat layer, a polarizing filter layer, an anti-static layer, a glare-proofing layer, a soil-proofing layer, and a touch sensor layer. In the present invention, it may be arranged that only one of those functions be provided on the viewer side, or multiple ones thereof be provided thereon.

In a case where having constructed in a such-like way, the light diffusion sheet or film can be made to have a variety of functions.

Also, in the light diffusion sheet or film according to the twelfth aspect of the present invention, the configuration of the section, as sectioned by a plane perpendicular to the light emission surface, of the light incidence surface having performed thereon embossing processing may be in the shape of a chipped piece of an ellipse or/and a chipped piece of a polygon. This modification can also be suitably applied to the light diffusion or film according to each of the other aspects that are described in and after the twelfth aspects, independently, or in a form combined with other modifications.

In a case where constructing like that, the light that has entered from the light emission or outgoing surface side can be reflected by the elliptic or polygonal chipped piece portion and can thereby be made to enter the slant portion with the angle of incidence being made sufficiently large. Accordingly, that light can be absorbed by the light absorption particles inside the slant portion and therefore it is possible to obtain a light diffusion sheet or film the contrast of that is high.

In a case where having constructed like that, further, the components of a light that is diffused 3° or more by the emboss configuration the embossing of that is performed on the light incidence surface may be made 20% or more.

In a case where having constructed like that, since many rays of light can be absorbed by the light absorption particles, it is possible to realize a light diffusion sheet or film the contrast of that is high.

Also, further, in the light diffusion sheet or film according to the twelfth aspect, it may be arranged that the area of the embossing performed portion that, when it is assumed that φ represents the components of the angle defined by the slant of the embossing performed portion with respect to the light incidence surface in the same direction as in the case of the θ; and N3 represents the refractive index of the material forming the embossed portion, satisfies the relationship of:

$$\sin(90° - (\sin^{-1}(N3*\sin(2\phi)/N1) + \theta)) < N2/N1$$

be 20% or more of the area of the entire incidence surface. Here, in the equality above, the mark "*" (asterisk mark) means to multiply the item before or after it by the item after or before it. For example, "A*B" indicates the product of A and B (hereinafter the same applies).

In a case where satisfying those conditions, the external light that has entered from the light outgoing surface in a direction perpendicular to the light outgoing surface is reflected by the embossed surface and is absorbed into the light absorption particles. Accordingly, by providing the embossed surface satisfying such conditions in an amount that is 20% or more of the entire incidence surface, it is possible to realize a light diffusion sheet or film the contrast of that is high.

Also, the components of the light that is diffused 20% or more can be made 20% or less according to the configuration of the embossed portion the embossing of that has been performed on the light incidence surface.

In a case where doing so, many rays of image light that have entered the light diffusion sheet or film can reach the viewer side without being absorbed into the light absorption particles of the between-lens portion. Accordingly, it is possible to realize a light diffusion sheet or film the transmittance of that is high.

Also, further, in the expression above, it may be arranged that the area of the embossing performed portion that satisfies the relationship:

$$\sin(90° - (\sin^{-1}(N3/N1)*\sin(\phi - \sin^{-1}(\sin \phi/N3))) + \theta)) < N2/N1$$

be 20% or less of the area of the entire incidence surface.

In a case where satisfying that relationship, the image light that has entered perpendicularly to the light incidence surface is absorbed into the light absorption particles. Accordingly, by controlling so that the area of the embossing performed portion that satisfies the conditions above may be made 20% or less of the area of the entire incidence surface, it is possible to realize a light diffusion sheet or film the transmittance of that is high.

Also, in the light diffusion or film according to the twelfth aspect, it may be arranged that the pitch at which the embossing processing is performed be $1/15$ to $1/1.5$ times as high as the pitch of the light emission surface side unit lens. This modification can also be suitably applied to the light diffusion sheet or film according to each of the other aspects that are described in and after the twelfth aspects, independently, or in a form combined with other modifications.

By constructing like that, it is possible to maximize the effect that is produced by forming the emboss on the side of the light incidence surface. As the merits obtained by having made the emboss pitch fine there can be pointed out the merit that it is possible to prevent the diffusion characteristic from becoming coarse and the merit that it is possible to prevent the occurrence of moiré between the light emission lens and the light incidence lens (emboss).

Further, in the present invention, the above-described objects are solved by providing a projection screen wherein on the image light source side of the light diffusion sheet or film according to any one of the above-described aspects there is disposed a Fresnel lens.

According to that the above aspect, it is possible to realize in the projection screen the various properties of the light diffusion sheet.

Also, in the above-described projection screen, the slant of the cross-sectionally viewed trapezoid of each of a plurality of the unit lenses may be extended in the vertical direction.

In a case where that slant is formed like that, it is possible to diffuse the light in the vertical direction.

The above-described functions and advantages of the present invention will become apparent from the modes of embodiment that will be explained below.

BRIEF DESCRIPTION OF THE DRAWINGS

FIGS. 29A, 29B, 29C, and 29D are views each illustrating an example of the cross-sectional configuration of an embossed portion;

Figure 1:
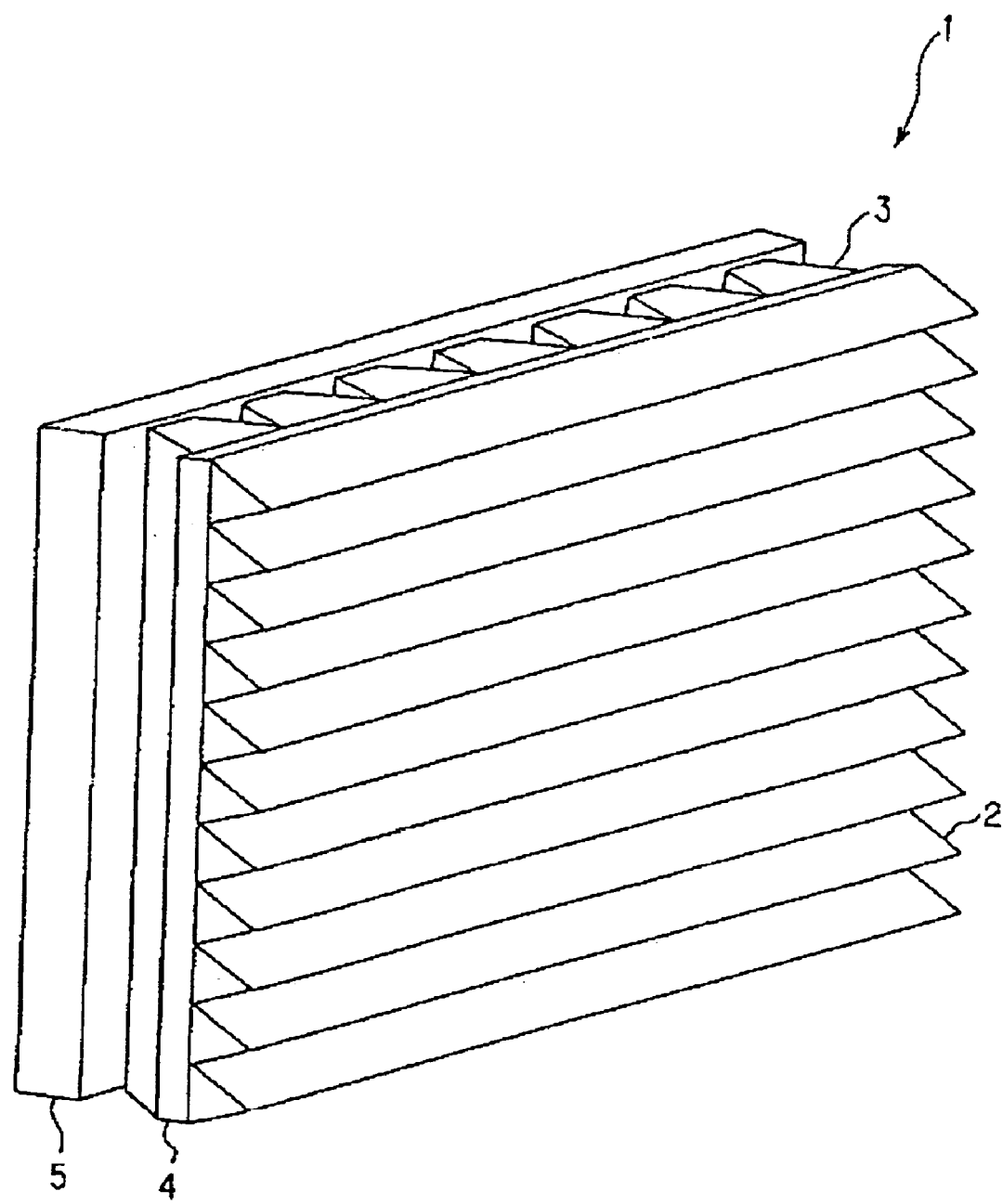
FIG. 1 is a view illustrating a basic construction of a projection screen according to the present invention.

DESCRIPTION OF THE PREFERRED EMBODIMENTS (First to Fifth Embodiments)

Hereinafter, the present invention will be explained according to the embodiments illustrated in the drawings. To begin with, the basic construction of a projection screen (in the specification of this application an assembly having a base sheet that has formed on both surfaces thereof respectively a linear Fresnel lens and a lenticular lens is referred to as "the sheet or film for use for a projection screen" and an assembly having that assembly that has provided thereon a diffusion sheet is referred to as "the projection screen") according to the present invention will be explained with reference to FIG. 1.

In FIG. 1, a projection screen 1 has provided thereon a linear Fresnel lens 2 that is formed on the light incidence side of a base sheet 4 and a lenticular lens 3 that is formed on the viewer side and that is trapezoidal in cross section. Further, on the viewer side of that assembly there is disposed a diffusion sheet 5. The trapezoidal configuration of the lenticular lens 3 is formed into a configuration that is different in the width direction so that the optical axis in the horizontal direction of an image light may be made proper. At the position that is located in a downward, and toward you, direction of the drawing sheet of FIG. 1 there is an image light source not illustrated. The image light that has been projected in an upper/oblique direction from that light source enters, or gets incident upon, a lens surface of the linear Fresnel lens 2 and then is totally reflected by the lens surface on the opposite side and then is converted to a light that is substantially in the horizontal direction. This light then passes through the lenticular lens 3 to reach the viewer not illustrated that is at a zone that is located in a leftward, and toward the depth, direction of the drawing sheet.

FIGS. 2 to 6 are views each illustrating a horizontally cross sectioned section of a corresponding one of the projection screens 1A to 1E according to a first to a fifth embodiment. Each of the projection screens 1A to 1E according to the first to the fifth embodiments of FIGS. 2 to 6 has provided therein from the image light source side toward the viewer side the linear Fresnel lens 2, the base sheet 4, the lenticular lens 3, and the diffusion sheet 5. The base sheet 4 ordinarily is constructed using a transparent resin material such as acrylic resin. Also, the linear Fresnel lens 2 and the lenticular lens 3 are each formed using ionizing radiation hardenable resin. Regarding these, details thereof will be described later when explaining the production method. The diffusion sheet 5 is obtained by causing $SiO_3$, $CaCO_3$, $Al_2O_3$, $TiO_3$, $BaSO_4$, $ZnO$, $Al(OH)_3$, glass powder, etc. to be uniformly mixed, dispersed, and distributed into the base resin material such as acrylic resin. Or, for obtaining the diffusion sheet 5, one kind, or two or more kinds, of diffusion materials such as organic diffusion agent that are not molten, or not chemically changed, in a liquid synthetic resin solvent may be uniformly mixed, dispersed, and distributed as additives. The lenticular lens 3 is a lens for obtaining a diffusion light that is made to have directionality in the horizontal direction and a plurality of convexities each shaped like a configuration the cross section of that is trapezoidal are formed in a single flat plane in the longitudinal direction. The cross-sectional configuration of the trapezoid of each convexity is formed in the way of being differentiated bit by bit from the central part of the screen toward the left and right.

Figure 2:
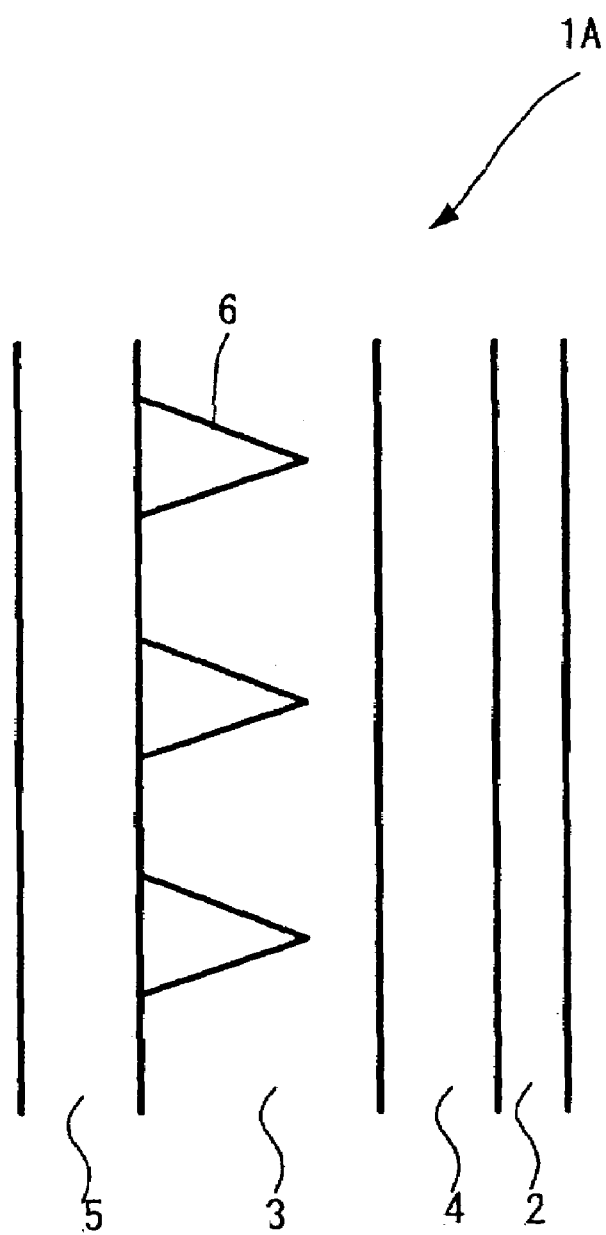
FIG. 2 is a view illustrating a horizontal cross section of the projection screen according to a first embodiment.

In the projection screen 1A according to the first embodiment illustrated in FIG. 2, a "V" shaped gap (hereinafter referred to as "the V-shaped portion") that is created between each trapezoid of the lenticular lens 3 and the diffusion sheet has filled therein a material 6 having a refractive index lower than that of the material constructing the lenticular lens 3. However, for obtaining the effects of the present invention, the low refractive index material 6 has only to have a refractive index lower than that of the material constructing the lenticular lens 3. Accordingly, any one of a solid, a liquid, and a gaseous material may be used for that material irrespective of whether it is a solid, liquid, or a gaseous material. By lowering the refractive index of the material of the V-shaped portion more than that of the lenticular lens 3 in that way, most part of the light rays that are directed from within the lenticular lens 3 toward the slant of the trapezoid can be reflected.

The synthetic resin material of the low refractive index, for example, may be colored by adding dye, pigment, or light absorption particles. By doing so, the light rays that have transmitted through the slant of the trapezoid can be absorbed by the portion of low refractive index material 6.

Figure 3:
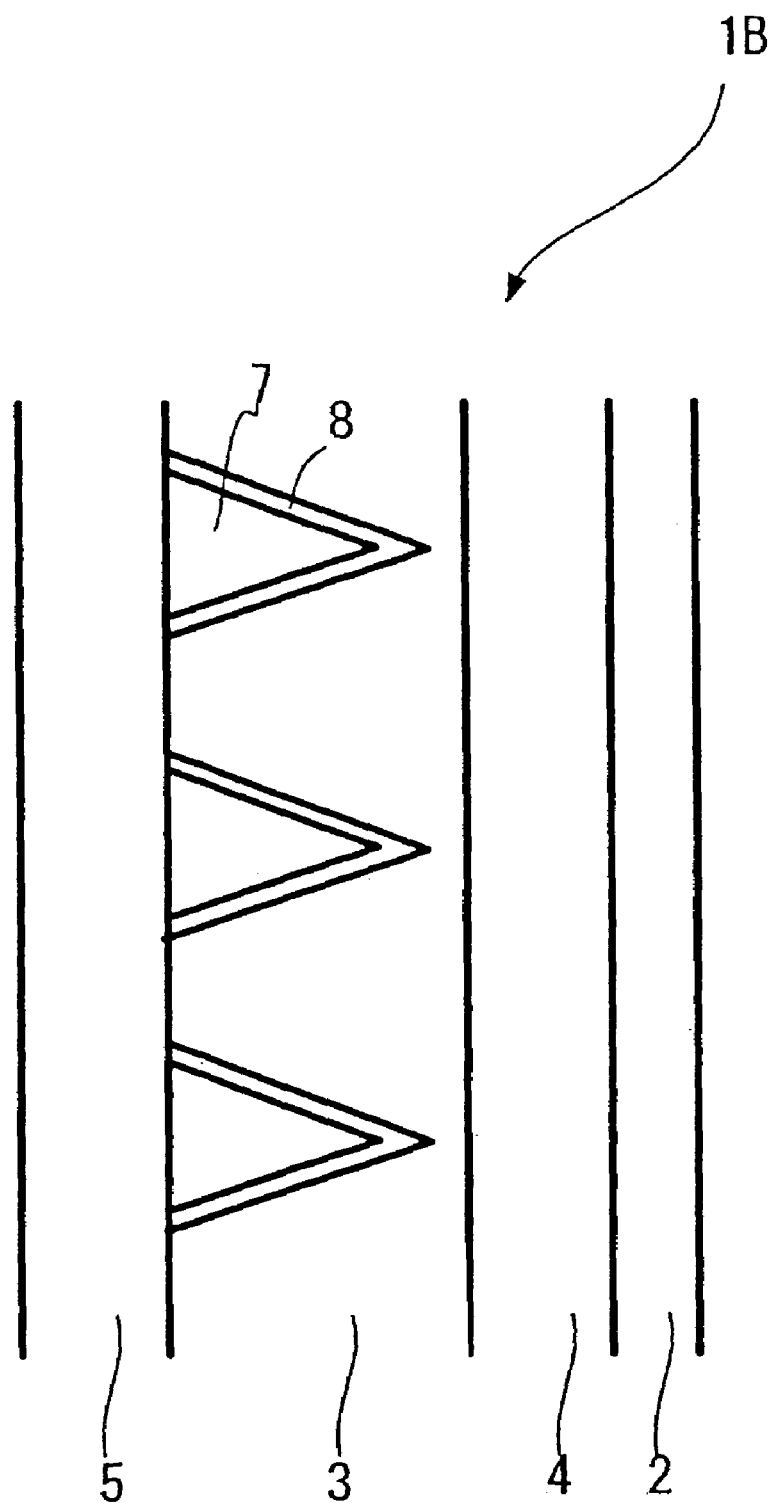
FIG. 3 is a view illustrating a horizontal cross section of the projection screen according to a second embodiment.

In the projection screen 1B according to the second embodiment of FIG. 3, the V-shaped portion is constructed of a low refractive index material layer 8 that has been so formed as to cohere to the slant of the trapezoid of the lenticular lens 3, and a high refractive index portion 7 that is disposed in the way of filling therewith the portion defined between the low refractive index material layer 8 and the diffusion sheet 5. In a case where constructing like that, the light rays that have transmitted through the trapezoid slant portion from within the lenticular lens 3 can be reflected by the boundary surface between the low refractive index material layer 8 and the high refractive index portion 7.

Figure 4:
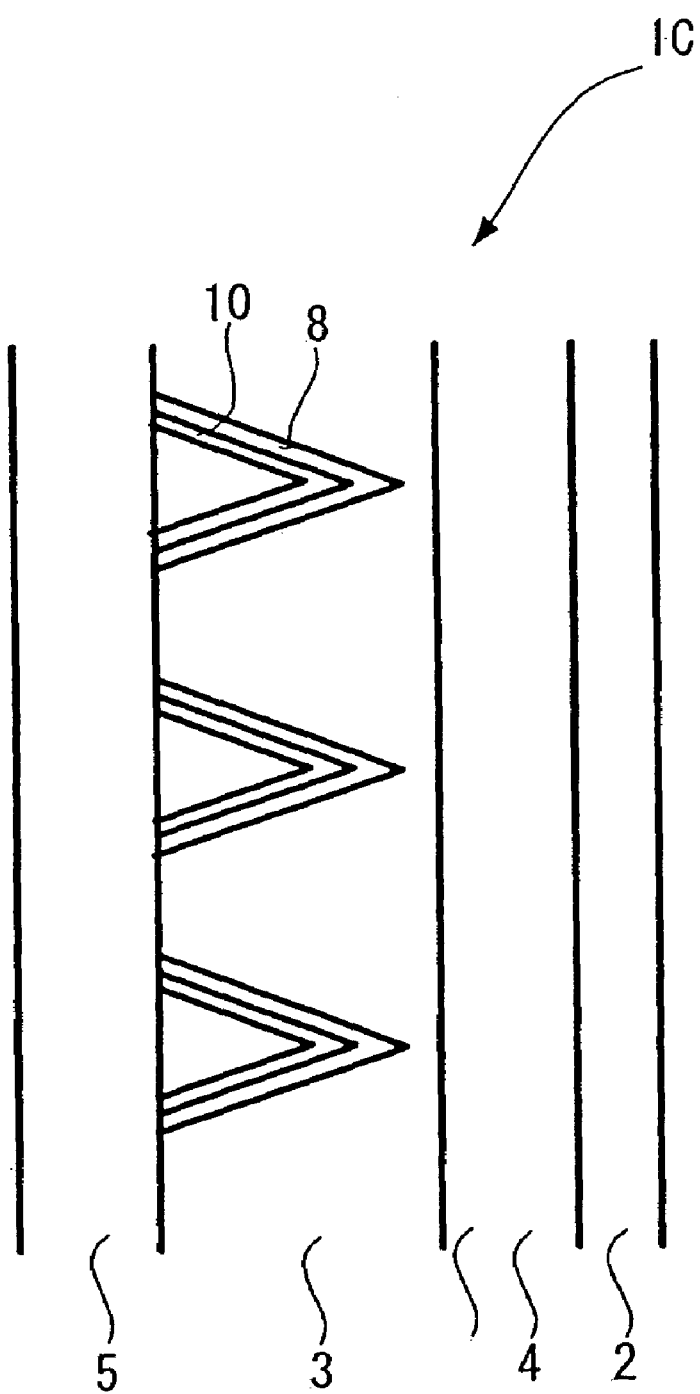
FIG. 4 is a view illustrating a horizontal cross section of the projection screen according to a third embodiment.

In the projection screen 1C according to the third embodiment of FIG. 4, the V-shaped portion has formed thereon the low refractive index material layer 8 that has been formed so as to cohere to the trapezoid slant of the lenticular lens 3, and a light absorption layer 10 that has been formed so as to cohere to the diffusion sheet side of the low refractive index material layer 8. The light absorption layer 10 can be formed using a method of coating, for example, a black painting onto the diffusion sheet side of the low refractive index material layer 8. In this way, it is possible to absorb, by the light absorption layer 10, the light rays that have transmitted the trapezoid slant portion from within the lenticular lens 3. As a modification of that, a light absorption portion 11 may be provided so as to cohere to the diffusion sheet and the low refractive index material 6 may be filled in the rest of the V-shaped portion, as in the case of the projection screen 1D according to the fourth embodiment illustrated in FIG. 5. Even in that case, the same effects can be obtained.

Figure 6:
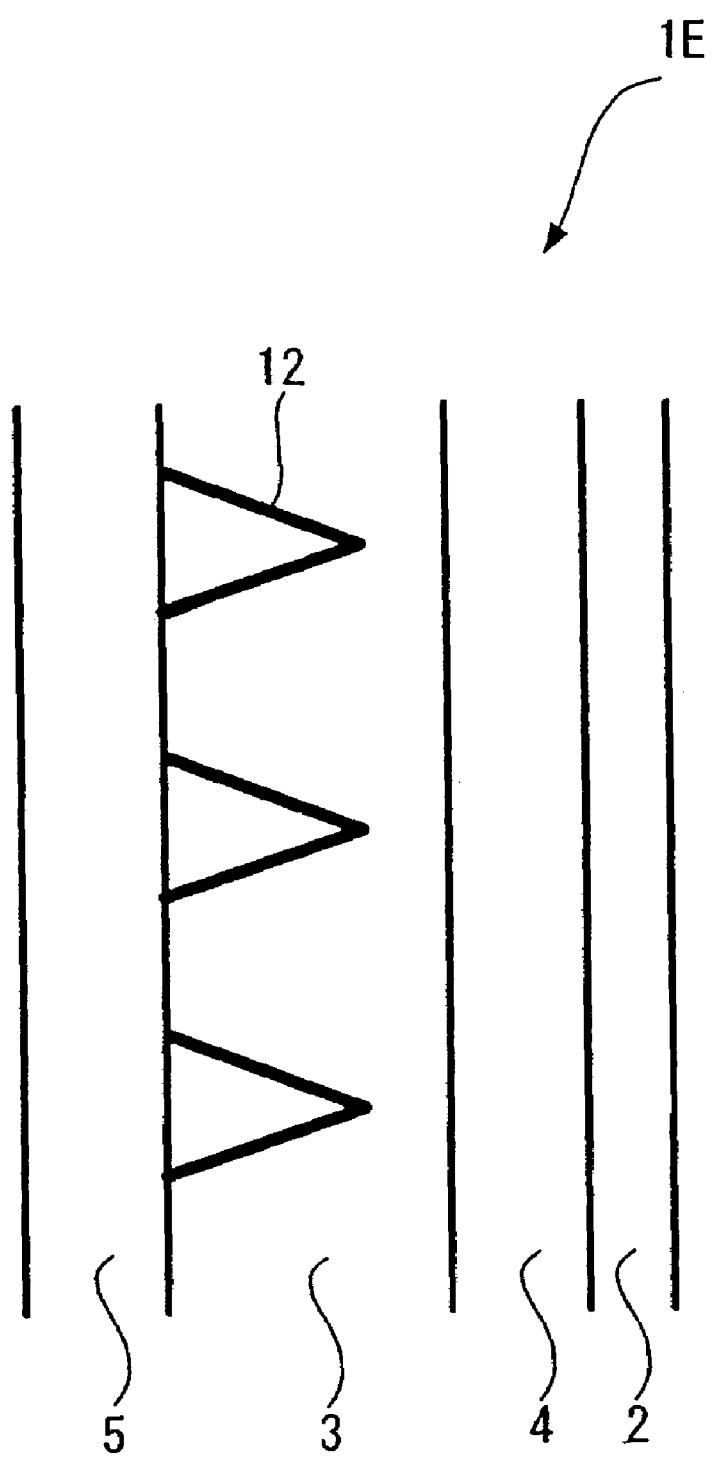
FIG. 6 is a view illustrating a horizontal cross section of the projection screen according to a fifth embodiment.

In the projection screen 1E according to the fifth embodiment of FIG. 6, the V-shaped portion has formed therein a reflection layer 12 of metal so as to cohere to the trapezoid slant of the lenticular lens 3. The reflection layer 12 of metal can be formed by, after the lenticular lens 3 is formed, masking the portion other than the V-shaped portion and then depositing, or the like, on the lens surface metal such as aluminum the refractive index of that is high. In a case where constructing like such, it is possible to almost completely reflect the light rays that have transmitted through the trapezoid slant portion from within the lenticular lens 3.

Figure 5:
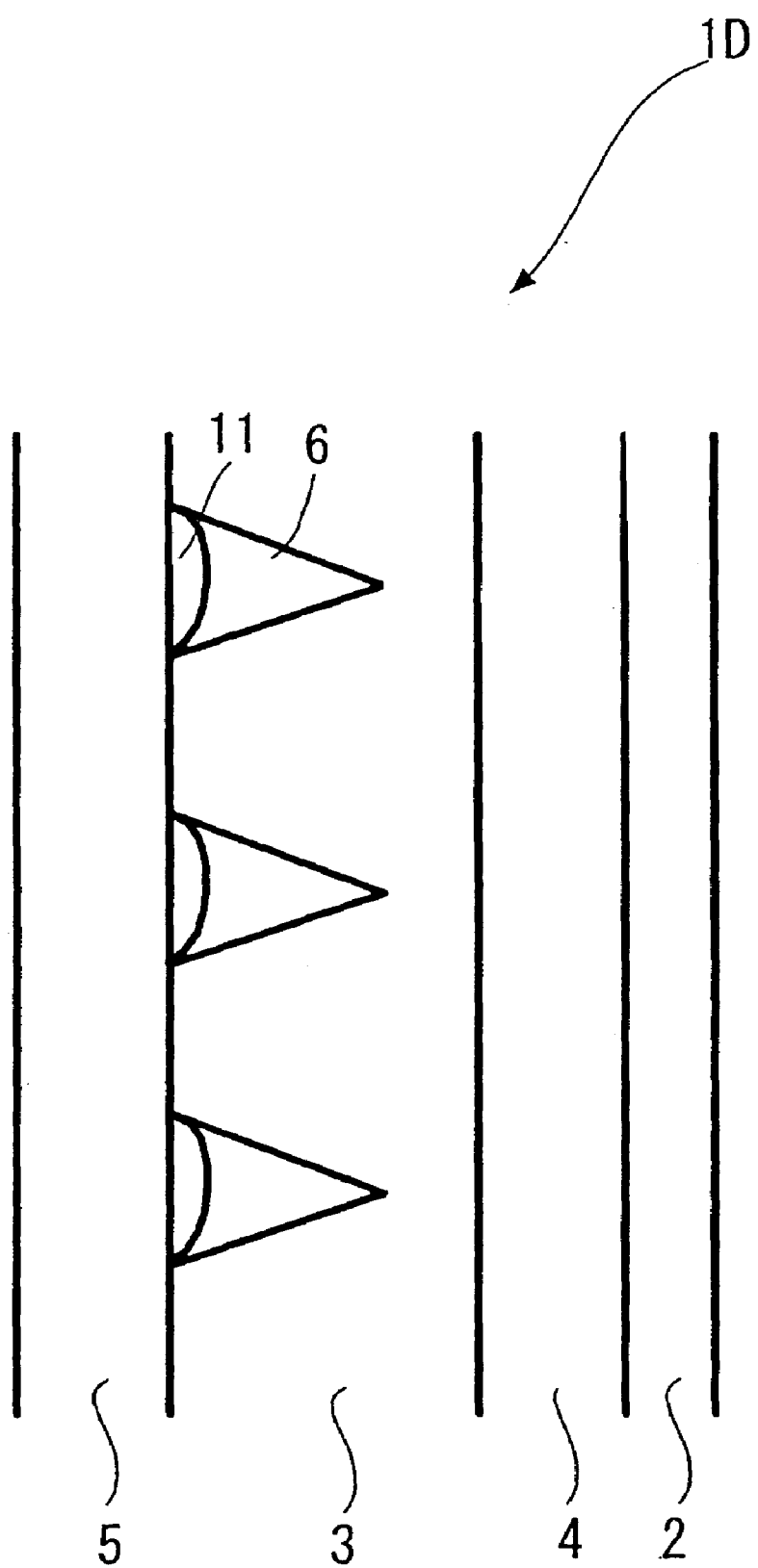
FIG. 5 is a view illustrating a horizontal cross section of the projection screen according to a fourth embodiment.
Figure 7:
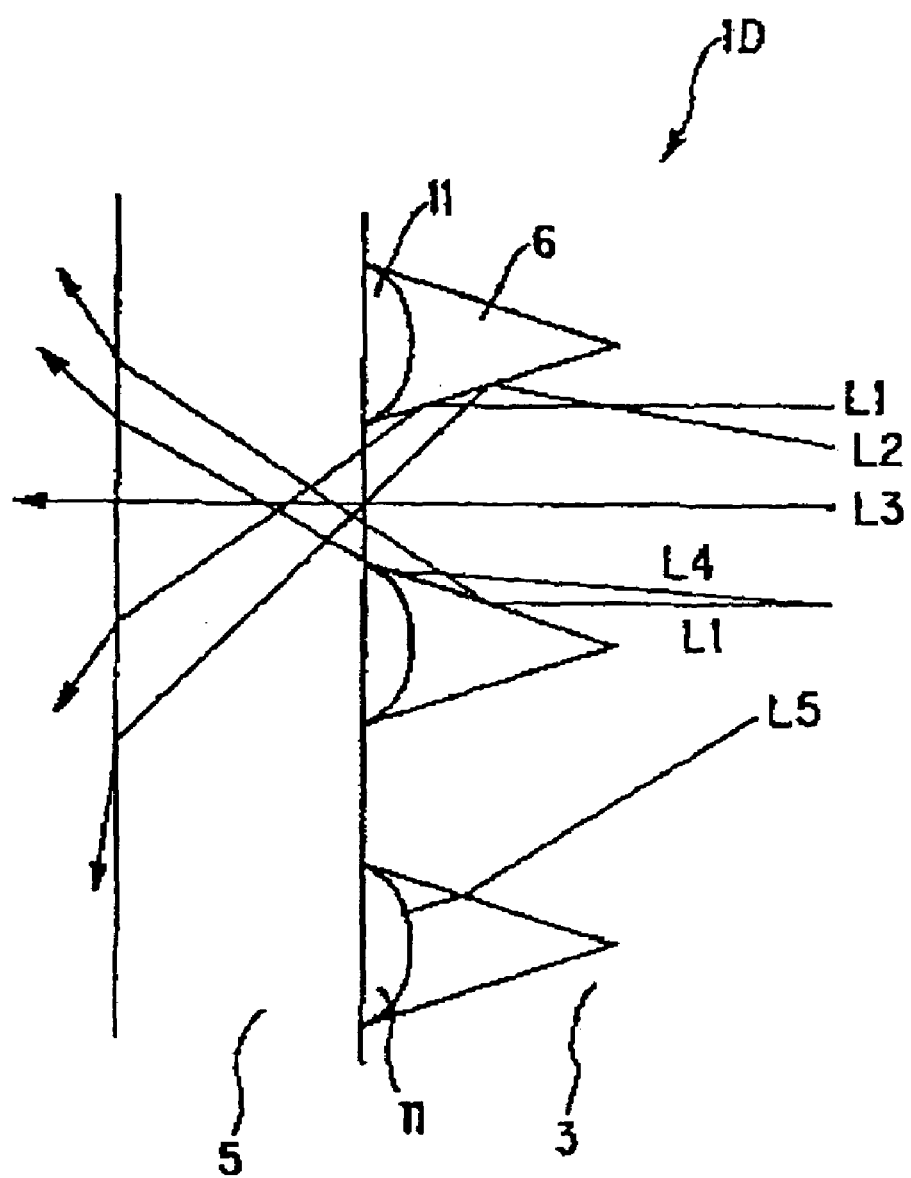
FIG. 7 is a view illustrating light paths in the projection screen according to the fourth embodiment illustrated in FIG. 5.

FIG. 7 is a view illustrating optical paths in the interiors of the lenticular lens portion 3 and diffusion sheet 5 of the above-described projection screen 1D according to the fourth embodiment illustrated in FIG. 5. Only the horizontal light rays L3 that advance to the upper bottom portion of the trapezoid of the lenticular lens 3 are emitted toward the viewer while the other light rays (regardless of whether the light is a horizontal light L1, an oblique light L2, or an oblique light L4) that advance to the trapezoid slant portion are diffused in the left and right directions of the screen. Also, the light rays L5 that have transmitted through the trapezoid slant portion are absorbed into the light absorption portion 11 and do not reach the diffusion sheet 5.

In each of the respective above-described embodiments, on the viewer side of the diffusion sheet 5, preferably, there is imparted thereto a function such as an AR, AG, AS, HC, soil-proofing function, or sensor. The AR is obtained by laminating onto the sheet surface a film having the function to suppress the refractive index of the light incident thereupon, by directly performing AR processing on the sheet surface, etc. The AG is obtained by laminating a film having an anti-glare function with respect to the sheet, by performing AG processing directly on the sheet surface, etc. The As is obtained by laminating an anti-static film onto the surface of the sheet, by directly performing AS processing on the surface of the sheet, etc. The HC is obtained by laminating a film of wear resistance so as to increase the strength of the sheet surface to thereby prevent the sheet surface from being clawed or scratched, by directly performing HC processing on the surface of the sheet, etc. The soil-proofing function is obtained by laminating a film or the like for preventing soil from attaching onto the sheet surface, by directly performing soil proofing on the sheet surface, etc. As the sensor, the function such as a touch sensor needs only to be provided. And, also, nowadays, since a film that concurrently has, of the above-described functions, the functions of AR, AS, HC, and soil proof is available, that film may be bonded to the viewer side of the diffusion sheet 5.

Figure 8:
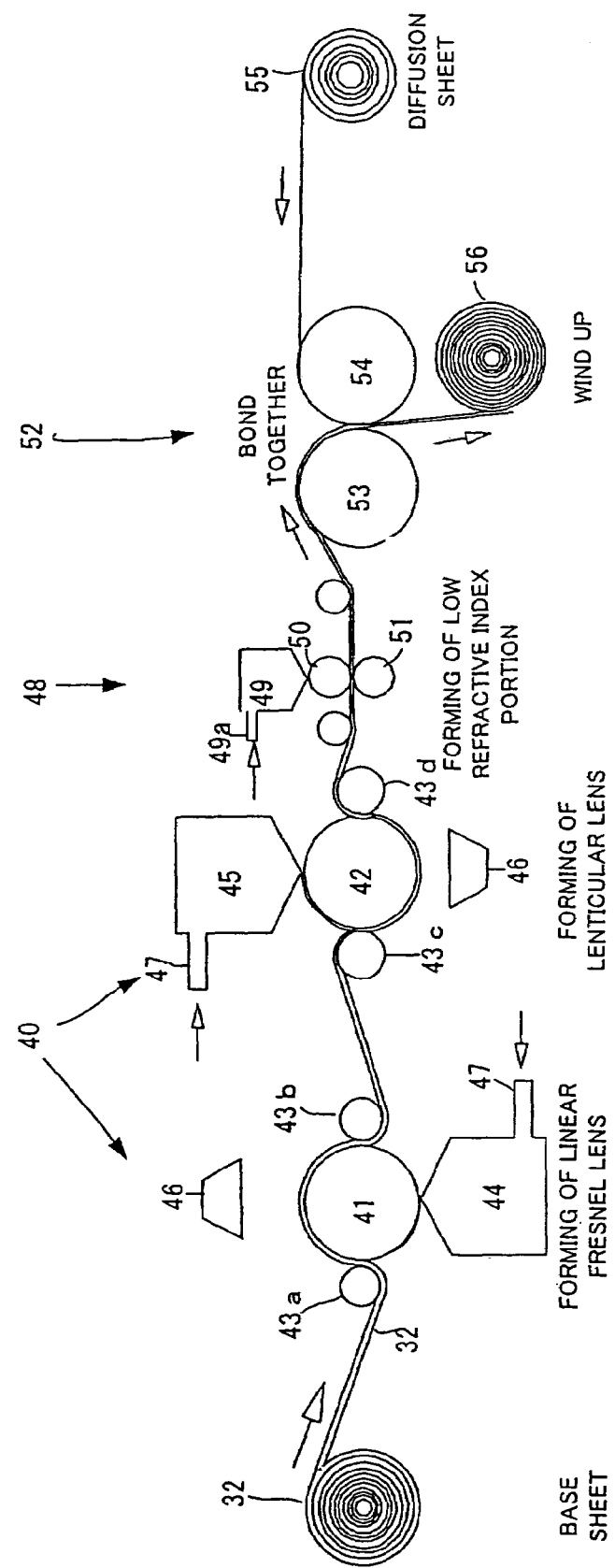
FIG. 8 is a view illustrating the manufacturing processes for the projection screen.

FIG. 8 is a view illustrating the manufacturing processes of the projection screen 1. Hereinafter, with reference to FIG. 8, an explanation will be given of a method for manufacturing the projection screen 1 by a roll transfer technique. In FIG. 8, a processing machine 40 has mounted therein two processing die rolls 41 and 42. The roll 41 has formed in its surface portion a female die for forming the linear Fresnel lens 2 while the roll 42 has formed therein a female die for forming the lenticular lens 3.

The manufacturing method of the present invention is a continuous production method. During the manufacture, an acrylic film having a thickness of 0.2 mm is used as a base sheet 32. The base sheet 32 is pressure-bonded to the rolls 41 and 42 by means of nip rolls 43a to 43d and is traveled at a speed that is synchronized with the speed of the rotation of the rolls. From a T-shaped die 44 that is provided on the lower surface side of the roll 41, ionizing radiation hardenable resin 47 is fed to the roll 41 to thereby fill it into the concavity portion of the roll 41, and is thereby transferred to the base film 32. And, using an ultraviolet ray radiation device 46 provided above the upper surface side of the roll 41, it is exposed and hardened under prescribed conditions to thereby form the linear Fresnel lens 2 on the base sheet 32.

That base sheet 32 is immediately led to the roll 42 and is pressure bonded thereto by means of the nip roll 43 so that the surface thereof on a side opposite to that where it has been processed at the preceding stage may cohere to the roll 42. Further, from a T-shaped die 45 provided on the upper surface side of the roll 42 there is fed ionizing radiation hardenable resin 47, which is filled into the concavity portion of the roll 42 and thereby is transferred to the base sheet 32. And, using an ultraviolet ray radiation device 46 provided below the lower surface side of the roll 42, the resin 47 is hardened under the same conditions as mentioned above. Thereby, the lenticular lens 3 is formed on the surface on a side opposite to that where there is located the surface of the base sheet 32 having provided thereon the linear Fresnel lens 2.

Subsequently, the base sheet 32 is drawn into a low refractive index portion forming device 48 provided on the downstream side of the production line. Then, the low refractive index resin 49a is fed from a T-shaped die 49 to the roll 50. The low refractive index resin 49a that has been fed onto the roll 50, when passing between a roll 50 and a roll 51 opposite thereto, receives the pressing forces of the two rolls 50 and 51 and is thereby filled into the V-shaped portions of the lenticular lens 3 formed on the upper surface of the base sheet 32. The respective rotations of the roll 50 and the opposite roll 51 are synchronized with the rotations of the rolls 41 and 42.

Next, the base sheet 32 is fed to a bonding-together machine 52 on a further downstream side of the production line. In the bonding-together machine 52, a diffusion sheet 55 is fed thereto from a direction opposite to the advancing direction of the base sheet 32. The bonding-together machine 52 has provided therein two pressure-bonding rolls 53 and 54. The rotations of the pressure-bonding rolls 53 and 54 are also synchronized with the rotations of the rolls 41 and 42. In the way in which the base sheet 32 and the diffusion sheet 55 are respectively wound up by the pressure-bonding roll 53 and the pressure-bonding roll 54, the both sheets 32 and 55 are pressure bonded together by receiving the pressing forces at a roll bite portion between those two rolls and then are taken up by and onto a take-up machine 56.

The adhesion between the base sheet 32 and the diffusion sheet 55 may be realized by causing the base sheet to quickly contact with the diffusion sheet 55 while the low refractive index resin 49a is in a semi-molten state, or by providing the bonding-together machine 52 with an adhesive supply device and thereby supplying adhesive into between the both sheets through the use of a prescribed method. Also, with an adhesion layer such as transparent adhesive being provided on the upper surface side of the diffusion sheet 55 beforehand, that adhesion may be achieved with that adhesion layer. By the method mentioned above, it is possible to continuously produce the projection screen 1.

Although in the foregoing description, the processes wherein, by continuously supplying the coiled diffusion sheet 55, this sheet 55 is continuously bonded together with the base sheet 32 having formed on its both surfaces the linear Fresnel lens 2 and the lenticular lens 3, have been explained, it may be arranged that, by cutting the base sheet 32 having had formed thereon the both lenses 2 and 3 into a prescribed configuration, that cut base sheet 32 be bonded onto a cut piece of the diffusion sheet.

FIRST EXAMPLE

Figure 9:
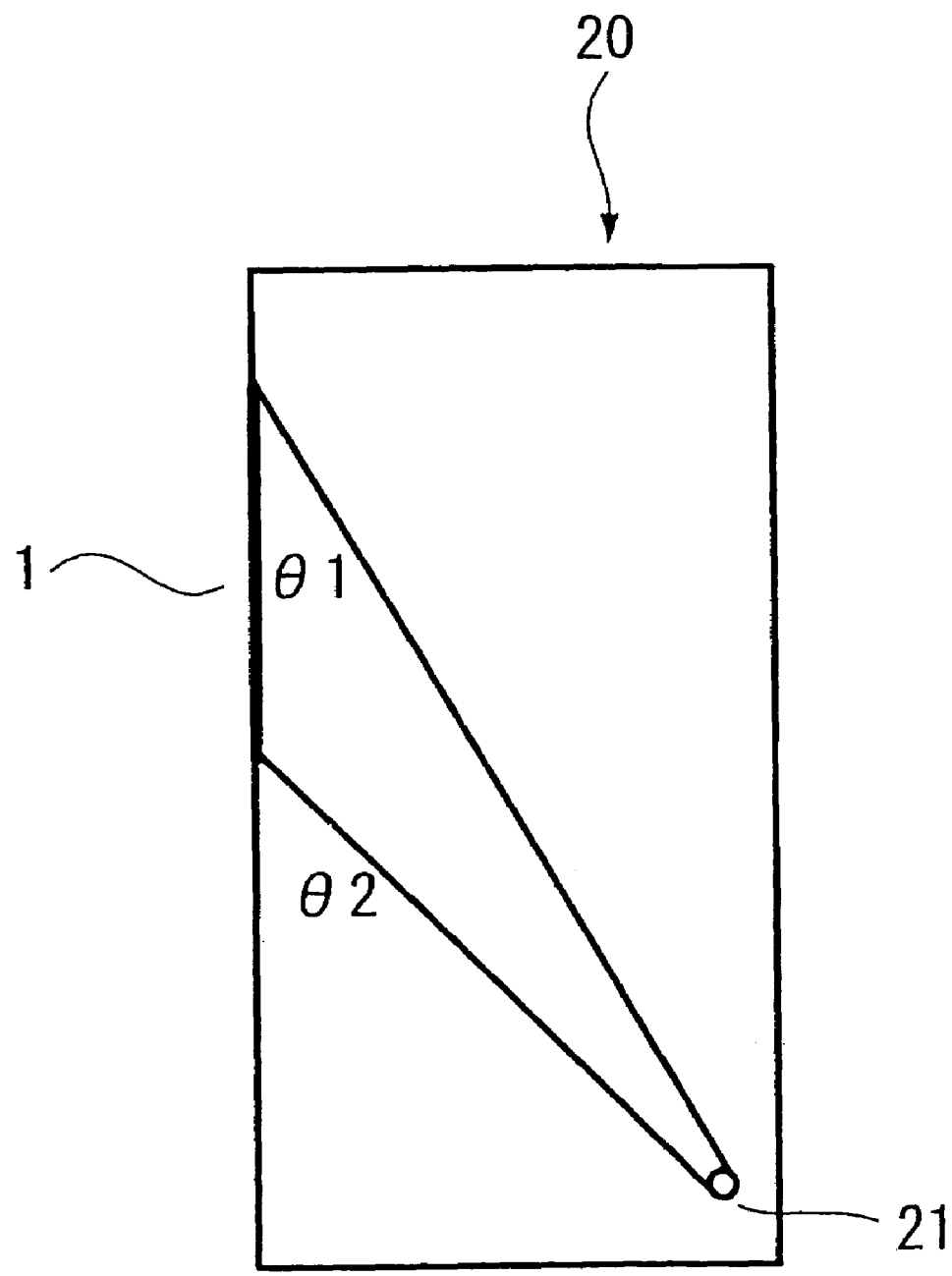
FIG. 9 is a view illustrating a state where an image from an image light source in the embodiment is projected onto the projection screen.
Figure 10:
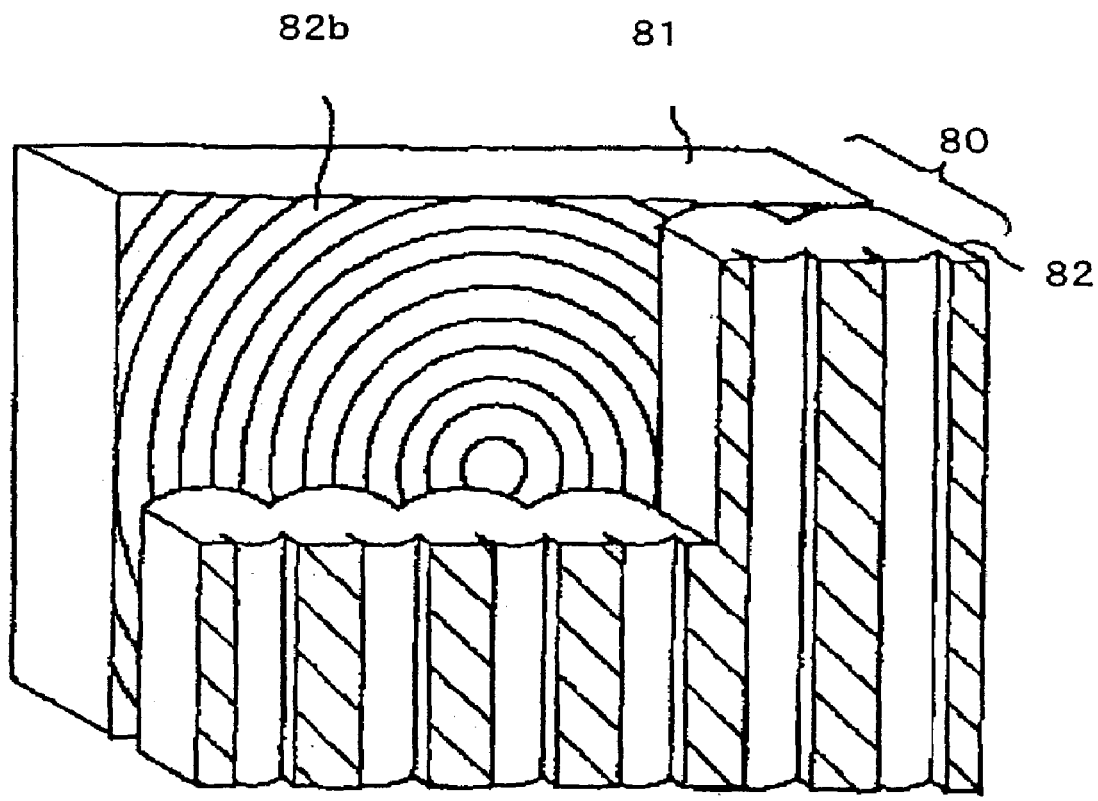
FIG. 10 is a view illustrating a general projection screen.

FIG. 9 is a view illustrating a state where an image from the image light source in the first example is projected onto the projection screen. In the projection display device 20 of this example, the image light source 21 has been disposed at a lower position of the screen 1. As the light source there has been used an LCD light bulb. Also, the image light source 21 has been disposed so that the angle of incidence may be $\theta_1=30°$ at the upper end and $\theta_2=45°$ at the lower end. The apex angle of the linear Fresnel lens is 37°. The image light that has entered the linear Fresnel lens from the image light source 21 is totally reflected, with the result that the vertical direction of the optical axis becomes perpendicular to the screen. The V-shaped portion of the lenticular lens has been formed symmetrically with respect to the screen with the apex angle ranging from 10° to 30° so that the optical axis in the horizontal direction of the image light may be corrected. At this time, the length of the bottom side of the V-shaped portion at the time when regarding it as a triangle is approximately 50% of the lenticular pitch. Also, the V-shaped portion had formed therein an aerial layer filled with black colored particles.

The reflectance of the projection display device 20 having such construction is approximately 4.5% and the transmittance is approximately 85%.

SECOND EXAMPLE

On the viewer side of the projection display device 20 there has been laminated an AR film. As a result of this, a projection display device the reflectance of that is approximately 0.8% and the transmittance of that is approximately 88% could be obtained.

(Sixth and Seventh Embodiments)

Figure 11:
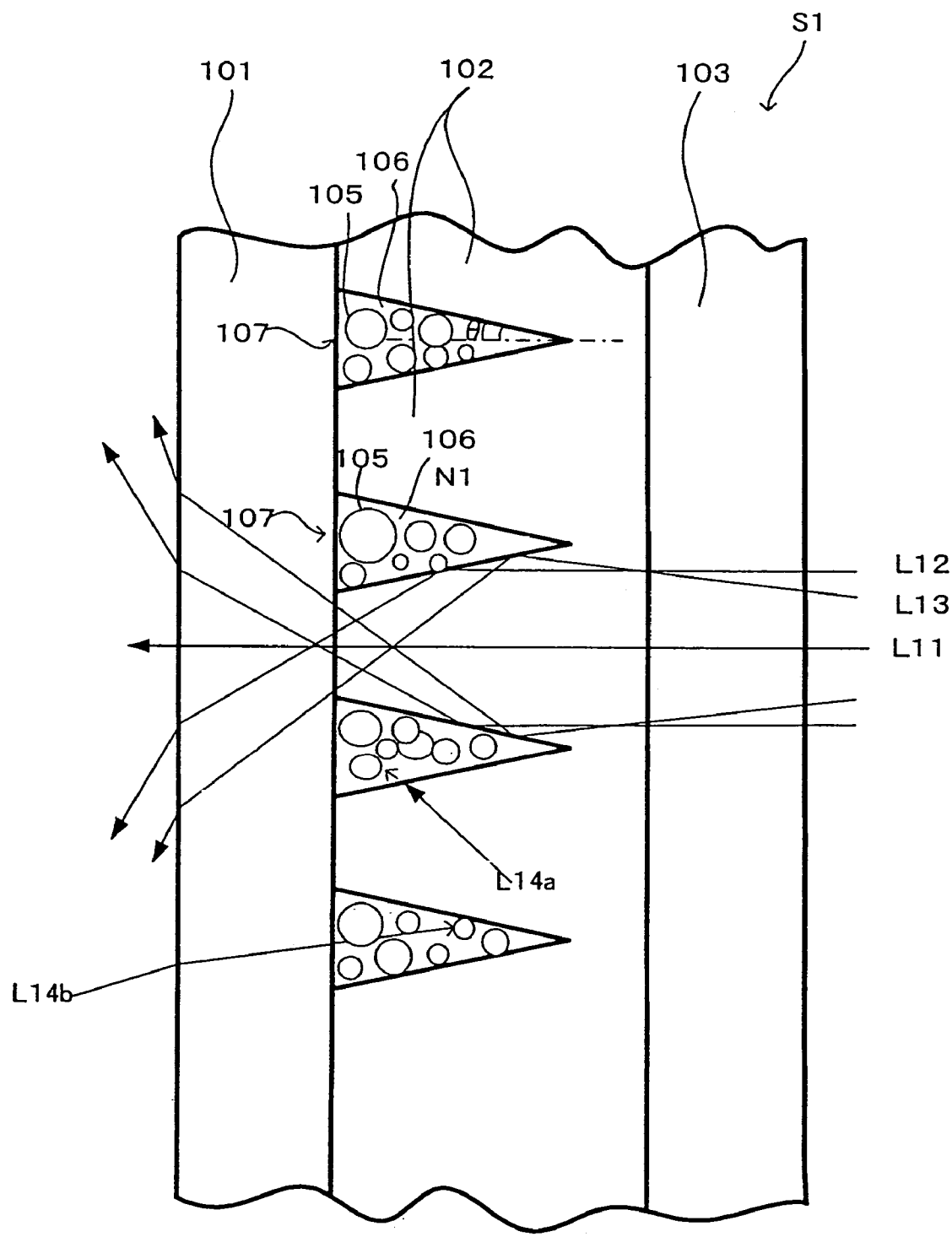
FIG. 11 is a view illustrating a cross section of a light diffusion sheet according to the sixth embodiment.
Figure 12:
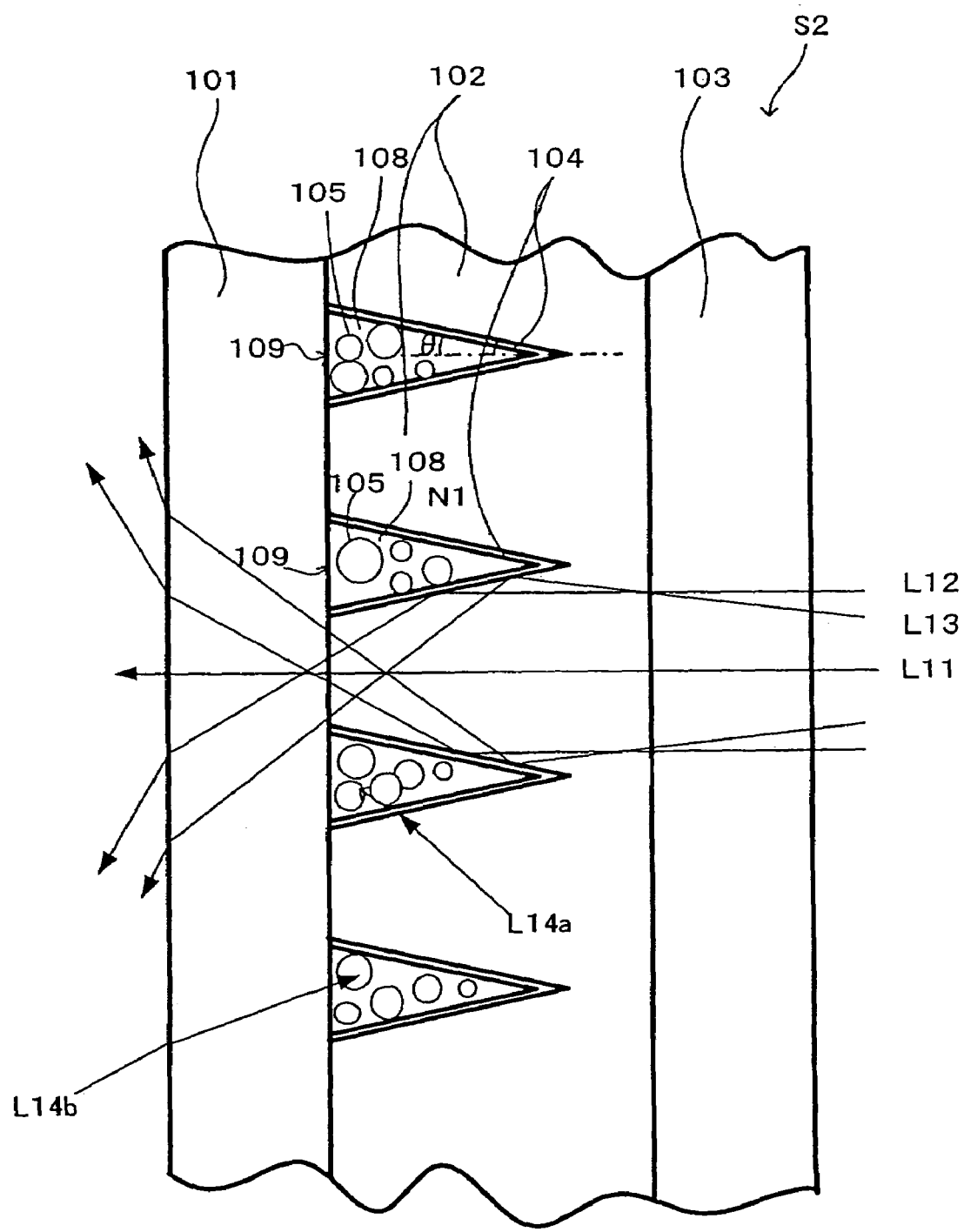
FIG. 12 is a view illustrating a cross section of a light diffusion sheet according to the seventh embodiment.

FIGS. 11 and 12 are views illustrating horizontal cross sections of the light diffusion sheets S1 and S2 according to the sixth and the seventh embodiments of the present invention. In each of these figures, on the right side of the illustration there is disposed an image light source while, on the left side of the illustration there is located the viewer.

FIG. 11 illustrates the light diffusion sheet S1 according to the sixth embodiment of the present invention. In this light diffusion sheet S1, from the viewer side toward the image light source, there are sequentially disposed a diffusion agent mixed sheet 101, unit lenses 102, and a base sheet 103 in the way they are bonded together. The unit lens 102 is formed using a material having a high refractive index N1. Further, in a portion that is defined between two adjacent of the unit lenses 102 and 102 and the cross sectional configuration of that is triangle (hereinafter referred to as "the between-lens portion 107"), there is embedded a material that has been prepared by adding the light absorption particles 105 into a transparent material having a refractive index N2 lower than the N1 (hereinafter referred to as "the transparent low refractive index material 106").

In this embodiment, the ratio between the refractive index N1 of the high refractive index portion 102 and the refractive index N2 of the transparent low refractive index material 106 is set to a prescribed range in order to obtain the optical characteristic of the light diffusion sheet S1. Also, the angle that is defined by the slant at which the between-lens portion 107 and the high refractive index portion 102 contact with each other, with respect to a normal line to the light emission surface (that is parallel with the perpendicular incident light upon the light diffusion sheet S1), is set to be a prescribed angle θ.

The high refractive index portion 102 is ordinarily constructed using a material of epoxy acrylate or the like having ionizing radiation hardenable property. Also, as the transparent low refractive index material 106, there is ordinarily used a material of urethane acrylate or the like having ionizing radiation hardenable property. As the light absorption particles 105 there can be used commercially available colored resin fine particles. Also, the diffusion agent mixed sheet 101 and the base sheet 103 each are constructed using a material having a refractive index substantially the same as that of the high refractive index portion 102. On the viewer side of the diffusion agent sheet 101 there is provided according to the necessity a functional layer such as an anti-reflection layer, a hard coat layer, a polarizing filter layer, an anti-static layer, an anti-glare processed layer, a soil-proofed layer, a touch sensor layer, etc.

Next, the optical paths of the light rays that have entered the unit lens 102 of the light diffusion sheet S1 will be briefly explained with reference to FIG. 11. Incidentally, in FIG. 11, the optical paths of the light rays L11 to L14 are the ones that have been shown as typical examples. In FIG. 11, the perpendicular light ray L11 that has entered the vicinity of the central portion of the unit lens 102 from the image light source side goes straight-forward, as is, through the interior of the light diffusion sheet S1 and passes therethrough to reach the viewer. The perpendicular light ray L12 that has entered the end portion of the unit lens 102 from the image light source side is totally reflected by the slant because of the refractive index difference between the high refractive index portion 102 and the transparent low refractive index material 106 and is emitted toward the viewer side at a prescribed angle. The light ray L13 that has entered, at an angle, the vicinity of the end portion of the unit lens 102 from the image light source side is totally reflected by the slant and is emitted toward the viewer side in a direction opposite to that at the time of incidence and at an angle that is further greater than that angle. The stray light ray L14a that enters the slant at an angle greater than prescribed enters the between-lens portion 107 without being reflected even through the difference in refractive index between the high refractive index portion 102 and the low refractive index material 106 and is absorbed into the light absorption particles 105, not reaching to the viewer side. The stray light ray 14b that has entered the between-lens portion 107 from the viewer side is absorbed into the light absorption particles. Therefore, it does not happen that that stray light ray is emitted toward the viewer side by becoming a reflected light. In this way, there can be obtained a light diffusion sheet S1 that has a wide angle of visibility in the horizontal direction and the contrast and brightness of that are respectively high.

FIG. 12 illustrates the light diffusion sheet S2 according to the seventh embodiment of the present invention. In this light diffusion sheet S2, from the viewer side toward the image light source, there are sequentially disposed the diffusion agent mixed sheet 101, the unit lenses 102, and the base sheet 103 in the way they are bonded together. The unit lens 102 is formed using a material having a high refractive index N1. Further, the slants between two adjacent of the unit lenses 102 and 102 each have formed thereon a layer 104 formed using a transparent material having a refractive index N2 lower than the N1 (hereinafter referred to as "the transparent low refractive index layer 104"). Also, in a portion that is defined between two adjacent of the unit lenses 102 and 102 and the cross sectional configuration of that is triangle there is embedded a material that has been prepared by adding the light absorption particles 105 into a transparent material 108 having a refractive index N2 higher than the N2. In the following explanation, that cross-sectionally viewed triangle portion is referred to as "the between-lens portion 109".

The ratio between the refractive index N1 of the high refractive index portion 102 and the refractive index N2 of the transparent low refractive index material 104 is set to a prescribed range in order to obtain the optical characteristic of the light diffusion sheet S2. Also, the angle that is defined by the slant at which the transparent low refractive index layer 104 and the high refractive index portion 102 contact with each other, with respect to a normal line to the light emission surface (that is parallel with the perpendicular incident light upon the light diffusion sheet S2), is set to be a prescribed angle θ. This will be described later in detail.

The high refractive index portion 102 is ordinarily constructed using a material of epoxy acrylate or the like having ionizing radiation hardenable property. Also, the transparent low refractive index material 104 is formed using a material having a refractive index lower than that of transparent resin such as silica. As the light absorption particles 105 there can be used commercially available colored resin fine particles.

Also, the diffusion agent mixed sheet 101 and the base sheet 103 each are constructed using a material having a refractive index substantially the same as that of the high refractive index portion 102. On the viewer side of the diffusion agent sheet 101 there is provided according to the necessity a functional layer such as an anti-reflection layer, a hard coat layer, a polarizing filter layer, an anti-static layer, an anti-glare processed layer, a soil-proofed layer, a touch sensor layer, etc.

Next, the optical paths of the light rays that have entered the unit lens 102 of the light diffusion sheet S2 will be briefly explained with reference to FIG. 12. Incidentally, in FIG. 12 as well, the optical paths of the light rays L11 to L14 are the ones that have been shown as typical examples. In FIG. 12, the perpendicular light ray L11 that has entered the vicinity of the central portion of the unit lens 102 from the image light source side goes straight-forward, as is, through the interior of the light diffusion sheet S1 and passes therethrough to reach the viewer.

The perpendicular light ray L12 that has entered the end portion of the unit lens 102 from the image light source side is totally reflected by the slant because of the refractive index difference between the high refractive index portion 102 and the transparent low refractive index material 106 and is emitted toward the viewer side at a prescribed angle. The light ray L13 that has entered, at an angle, the vicinity of the end portion of the unit lens 102 from the image light source side is totally reflected by the slant and is emitted toward the viewer side in a direction opposite to that at the time of incidence and at an angle that is further greater than that angle. The stray light ray L14$a$ that enters the slant at an angle greater than prescribed enters the transparent low refractive index layer 104 without being reflected even through the difference in refractive index between the high refractive index portion 102 and the low refractive index material 104 and is absorbed into the light absorption particles 105, not reaching to the viewer side. The stray light ray 14$a$ is absorbed into the light absorption particles 105 of the between-lens portion 109. Also, the stray light ray L14$b$ entering the between-lens portion 109 from the viewer side is also absorbed into the light absorption particles 105. Therefore, it does not happen, either, that that stray light ray reaches the viewer side by becoming a reflected light ray. In this way, there can be obtained a light diffusion sheet S2 that has a wide angle of visibility in the horizontal direction and the contrast and brightness of that are respectively high.

Next, the condition on which the light ray within the light diffusion sheet that has gotten incident upon the unit lens portion of the light diffusion sheet is totally reflected by the slant and simultaneously at the light emission surface that light ray transmits toward the viewer side without being reflected by that surface will be explained with reference to FIGS. 13 and 14.

Figure 13:
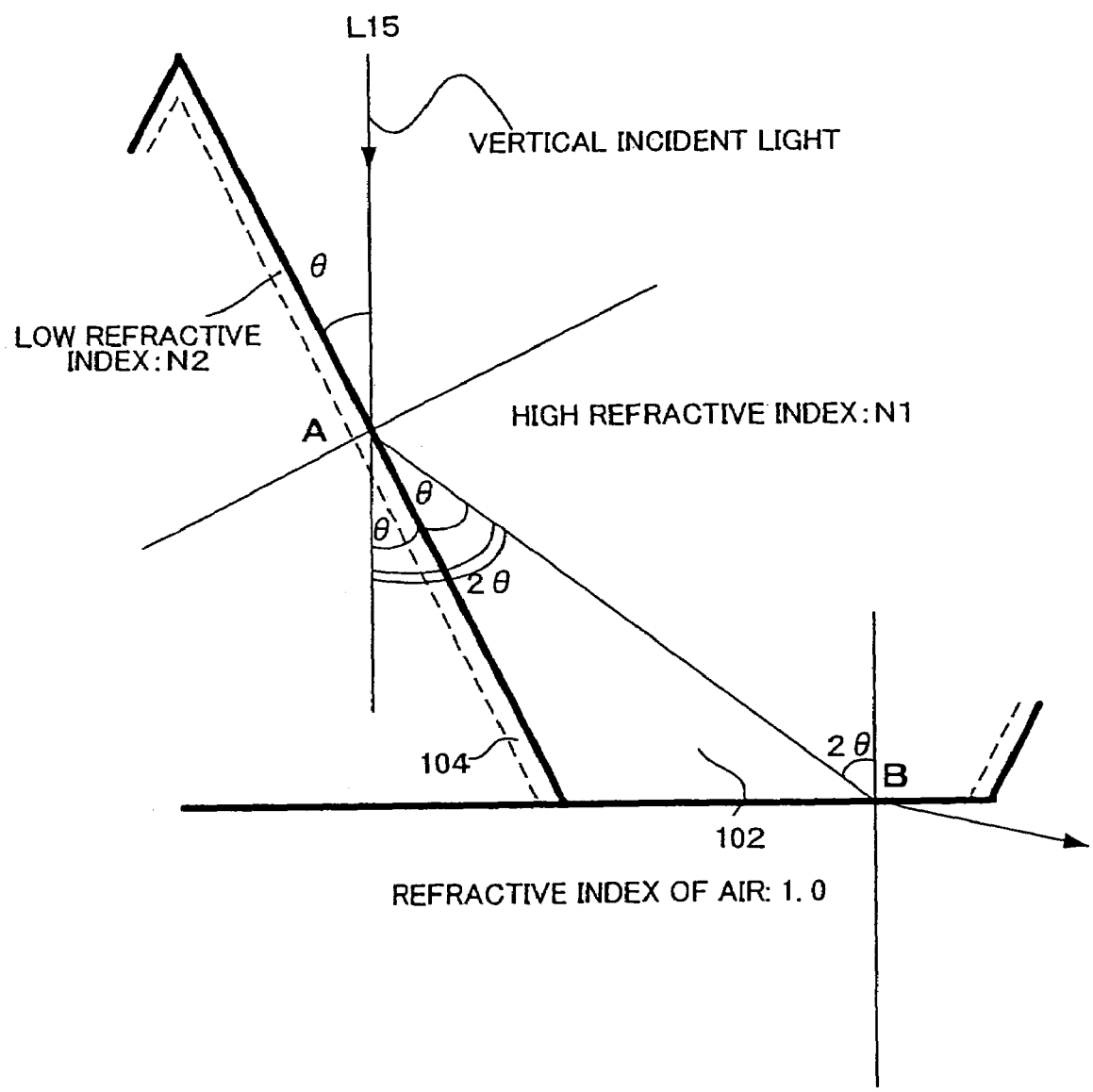
FIG. 13 is a view illustrating light paths in a case where a perpendicular light has entered the light diffusion sheet.

FIG. 13 is a view illustrating the optical paths in a case where the perpendicular light ray L15 has entered, within the light diffusion sheet, the slant of the light diffusion sheet 2 of the seventh embodiment. In FIG. 13, it is assumed that the image light source be located at the upper position of the illustration and the view be located at the lower position thereof. Also, for explanation brevity, the light diffusion agent mixed sheet 101 and the base sheet 103 are omitted (hereinafter the sate applies also in FIGS. 14 and 15 as well).

In FIG. 13, the conditions (critical conditions) under which the perpendicular light ray L15 entering the slant starts being totally reflected at a position A of the slant are expressed according to the Snell's law as follows.

$\sin(90°-\theta) = N2/N1$

Therefore, in order that the perpendicular light ray L15 may always be totally reflected, the following conditions need to be satisfied.

$\sin(90°-\theta) > N2/N1$ (Relationship 1)

Also, the conditions (critical conditions) under which the light ray L15 that has been reflected by the slant at the position A starts being totally reflected at a point B of the light emission surface, under the assumption that 1 represents the index of refraction of the atmospheric air, are expressed according to the Snell's law as follows.

$\sin 2\theta = 1/N1$

Therefore, in order that the light L15 may reliably be made to outgo toward the viewer side, the conditions:

$\sin 2\theta < 1/N1$ (Relationship 2)

need to be satisfied.

Incidentally, for reference, the optical paths that occur when the light ray L16 having a 10 degrees angle of inclination has entered the slant of the light diffusion sheet S2 will briefly be explained below with reference to FIG. 14.

Figure 14:
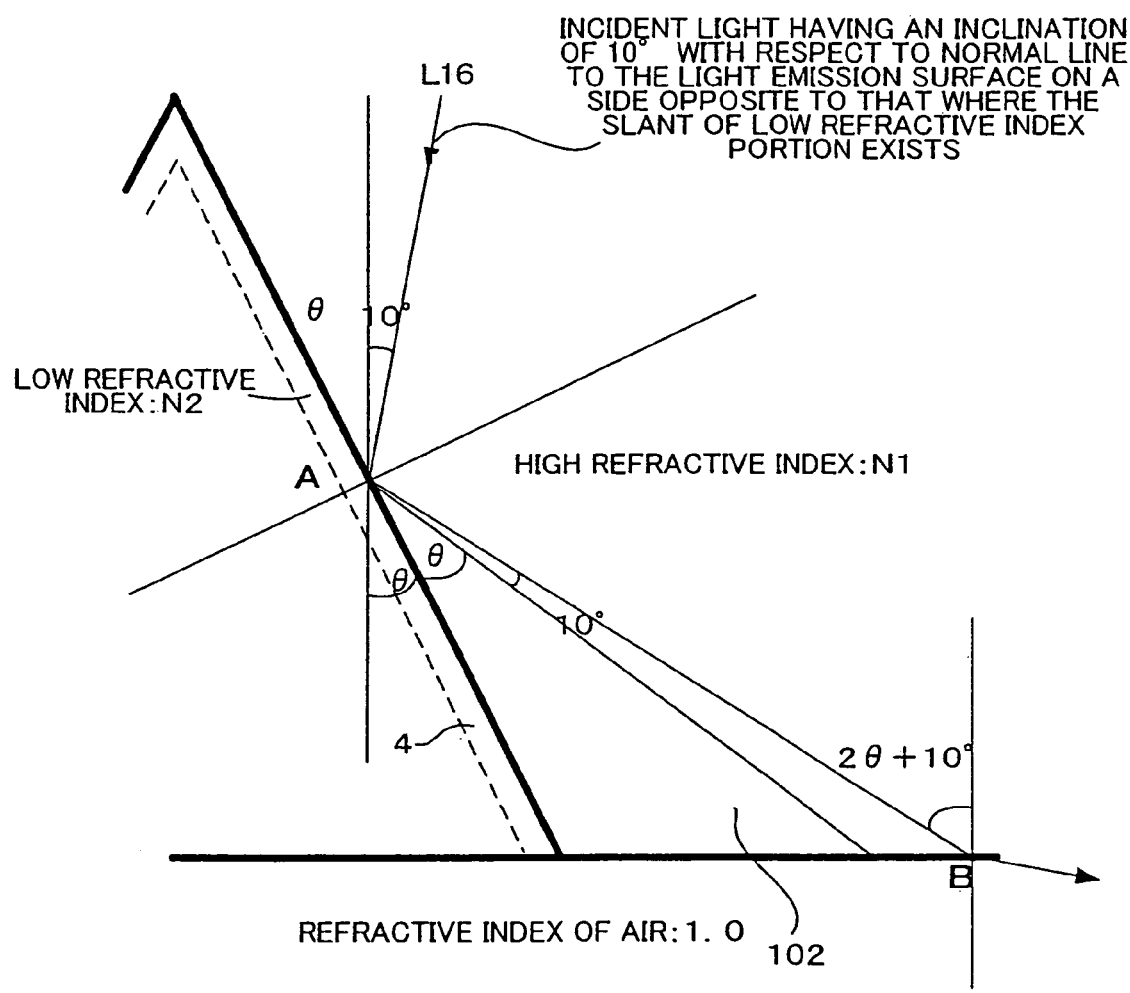
FIG. 14 is a view illustrating a light path that advances when a light having a 10 degrees angle of inclination has entered the light diffusion sheet.

In FIG. 14, the conditions (critical conditions) under which the light ray L16 with a 10 degrees angle of inclination entering the slant starts being totally reflected at the position A of the slant are expressed according to the Snell's law as follows.

$\sin(80°-\theta) = N2/N1$

Therefore, in order that the light ray L16 with a 10 degrees angle of inclination may always be totally reflected, the following conditions need to be satisfied.

$\sin(80°-\theta) > N2/N1$ (Relationship 3)

Also, the conditions (critical conditions) under which the light ray L16 that has been reflected by the slant at the position A starts being totally reflected at the point B of the light emission surface, under the assumption that 1 represents the index of refraction of the atmospheric air, are expressed according to the Snell's law as follows.

$\sin(2\theta+10°) = 1/N1$

Therefore, in order that the light L16 may reliably be made to outgo toward the viewer side, the conditions;

$\sin(2\theta+10°) < 1/N1$ need to be satisfied.

Namely, $N1 < 1/\sin(2\theta+10°)$ (Relationship 4)

Next, the condition on which the light ray that has been reflected by the slant of the light diffusion S2 does not reach the adjacent slant will be explained with reference to FIG. 15. For finding those conditions, in a case where the incident light ray L17 having the greatest angle (10' in actuality) with respect to a normal line to the light emission surface has been totally reflected at a point C on the slant that is in the vicinity of the apex of the triangle the low refractive index portion 104 defines, it suffices to determine the relationship between the height H of the triangle and the length T of the upper bottom of the unit lens so that that reflected light does not reach the adjacent slant.

Figure 15:
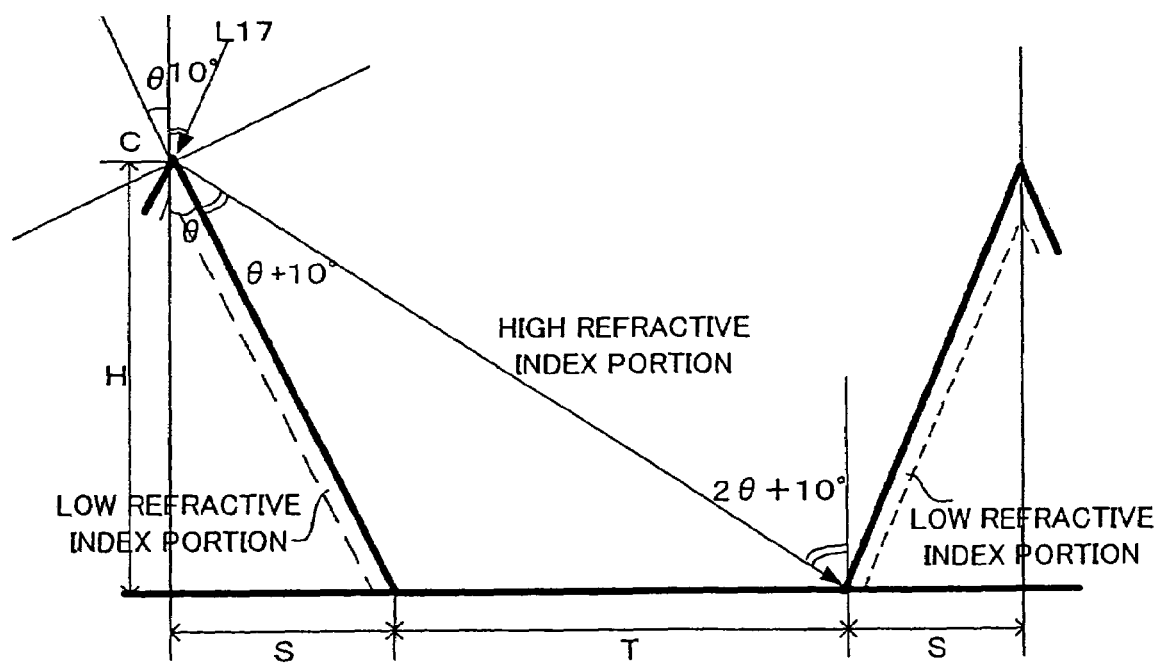
FIG. 15 is a view illustrating light paths that advance when a light having a 10 degrees angle of inclination has entered the vicinity of the apex of a triangle formed by a low refractive index portion.

Assuming in FIG. 15 that 2S represents the length of the bottom side of the triangle, $$\tan\theta = S/H$$

$$\tan(2\theta+10°) = (S+T)/H$$

Accordingly, $$H = T/(\tan(2\theta+10°) - \tan\theta)$$

It the H is smaller than the value expressed above, the reflected light ray does not reach the adjacent slant. Accordingly, said conditions are expressed as follows.

$$H < T/(\tan 2\theta+10°) - \tan\theta) \quad \text{(Relationship 5)}$$

Next, under the assumption that θ ranges from 5° to 15°, let's consider, in that range, about the values N1 and N2 in more detail. In the range of 5°<θ<15°, $$\sin(90°-\theta) < 0.996$$

From the relationship 1, the value of N2/N1 is smaller than this. Therefore, $$N2/N1 < 0.996 \quad \text{(Relationship 6)}$$

On the other hand, in the range of 5°<θ<15°, $$1/\sin 2\theta < 5.76$$

Therefore, from the relationship 2, $$N1 < 5.76 \quad \text{(Relationship 7)}$$

Further, in a case where having considered on the available real material, since the minimum value of N2 is 1.30, $$N2/N1 > 1.30/5.76 = 0.23$$

Accordingly, from above relationship and the relationship 6, $$0.23 < N2/N1 < 0.996 \quad \text{(Relationship 8)}$$

The relationships 7 and 8 indicate the conditions for the values of N1 and N2 to satisfy in the range of 5°<θ<15°.

Also, in the Relationship 5, when θ=15°, the conditions for the value of H to satisfy are determined and are as follows.

$$H < T/0.57$$

Figure 16A:
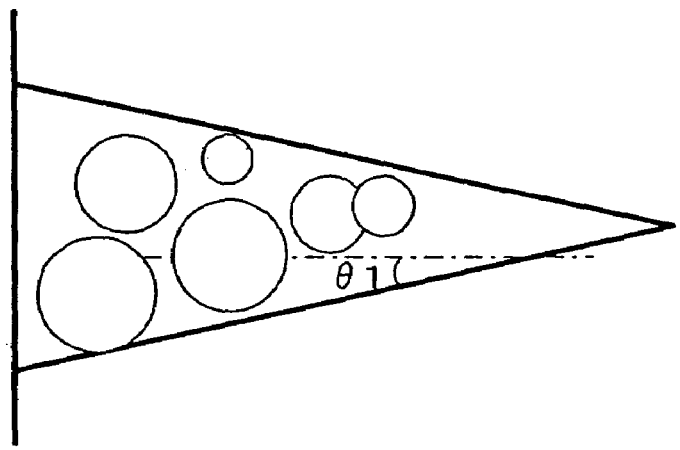
FIGS. 16A, 16B, and 16C are views illustrating various states of the configuration of the low refractive index portion.
Figure 16B:
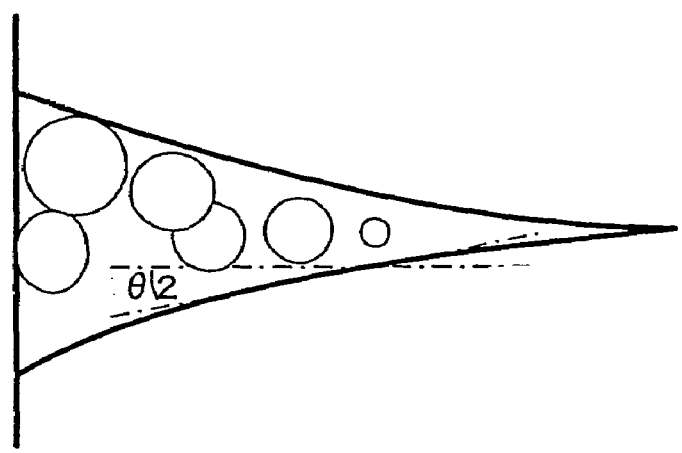
Figure 16C:
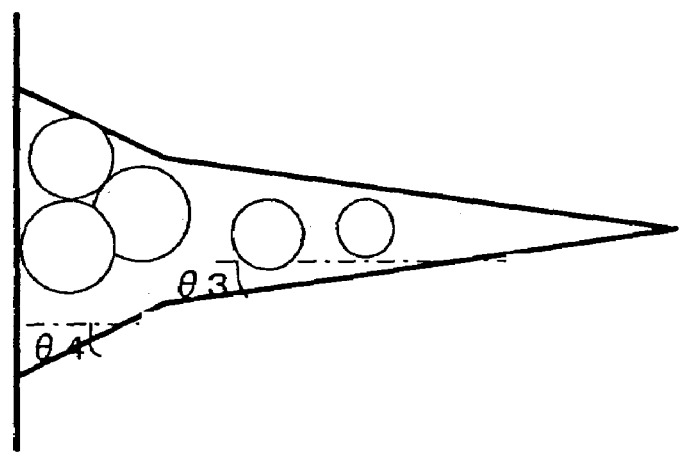

FIGS. 16A, 16B, and 16C are views illustrating various states of the configuration of the between-lens portion 107 or 109. This between-lens portion 107 or 109 basically has a substantially triangular configuration formed by the slants of two adjacent of the unit lenses 102, 102. FIG. 16A illustrates a case where the slant is formed by a straight line. In this case, the angle θ defined between the slant and the normal line to the light emission surface is constant at any point on the slant side. FIG. 16B illustrates a case where the slant is formed by a gentle curve. Also, FIG. 16C illustrates a case where the slant is constructed by two straight lines. In each of these cases, the angle θ2, or θ3 or θ4 that is defined between the slant and the normal line to the light emission surface is different according to the position on the slant. In the present invention, when the angle defined between the slant and the normal line to the light emission surface is not constant as in FIG. 16B or 16C, if 90% or more of the length of the slant satisfies the conditions expressed in the respective relationships 1 to 8 that have so far been explained, it is possible to obtain the effects of the present invention.

Figure 17:
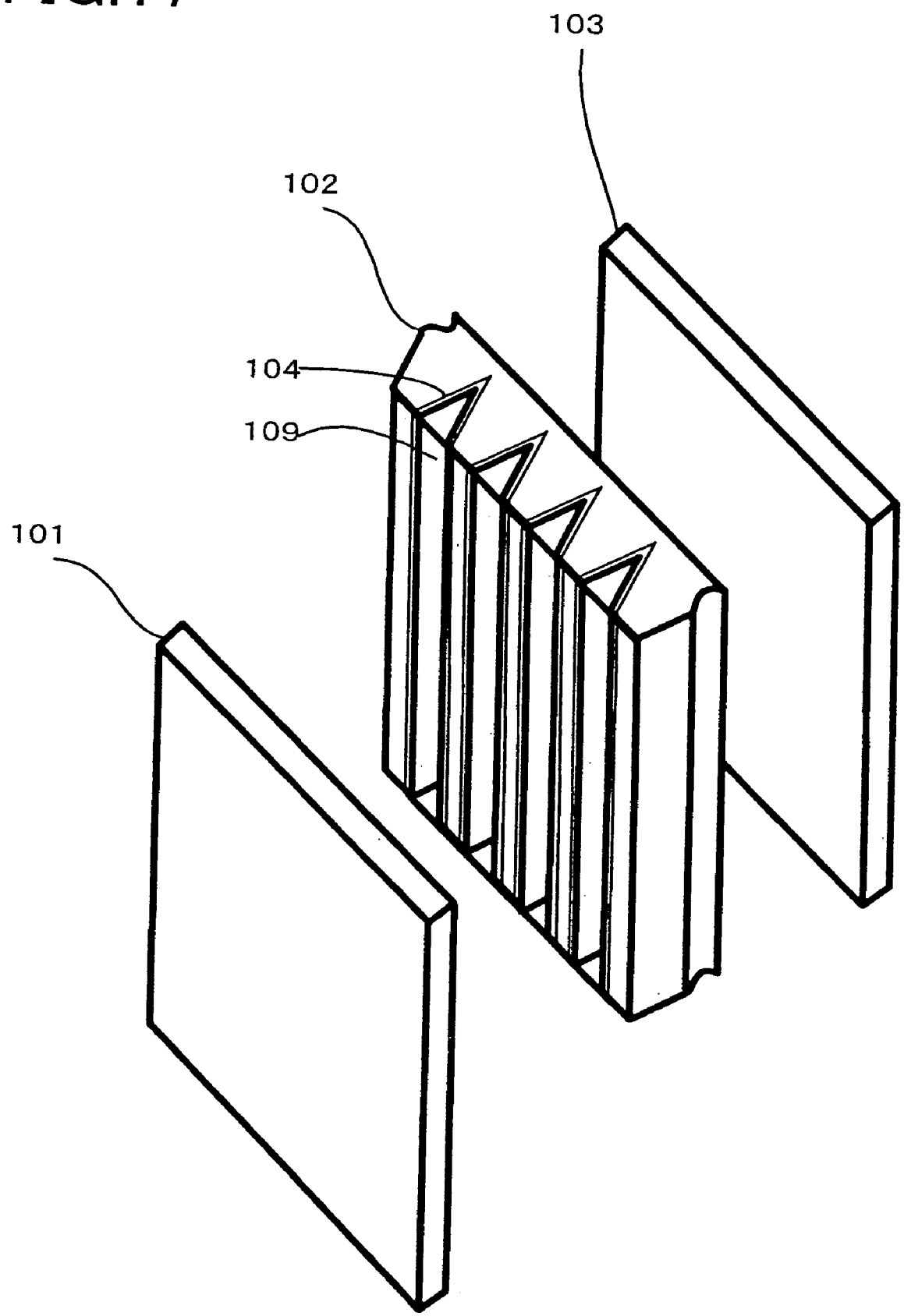
FIG. 17 is a view illustrating an example of the construction of the light diffusion sheet.
Figure 18:
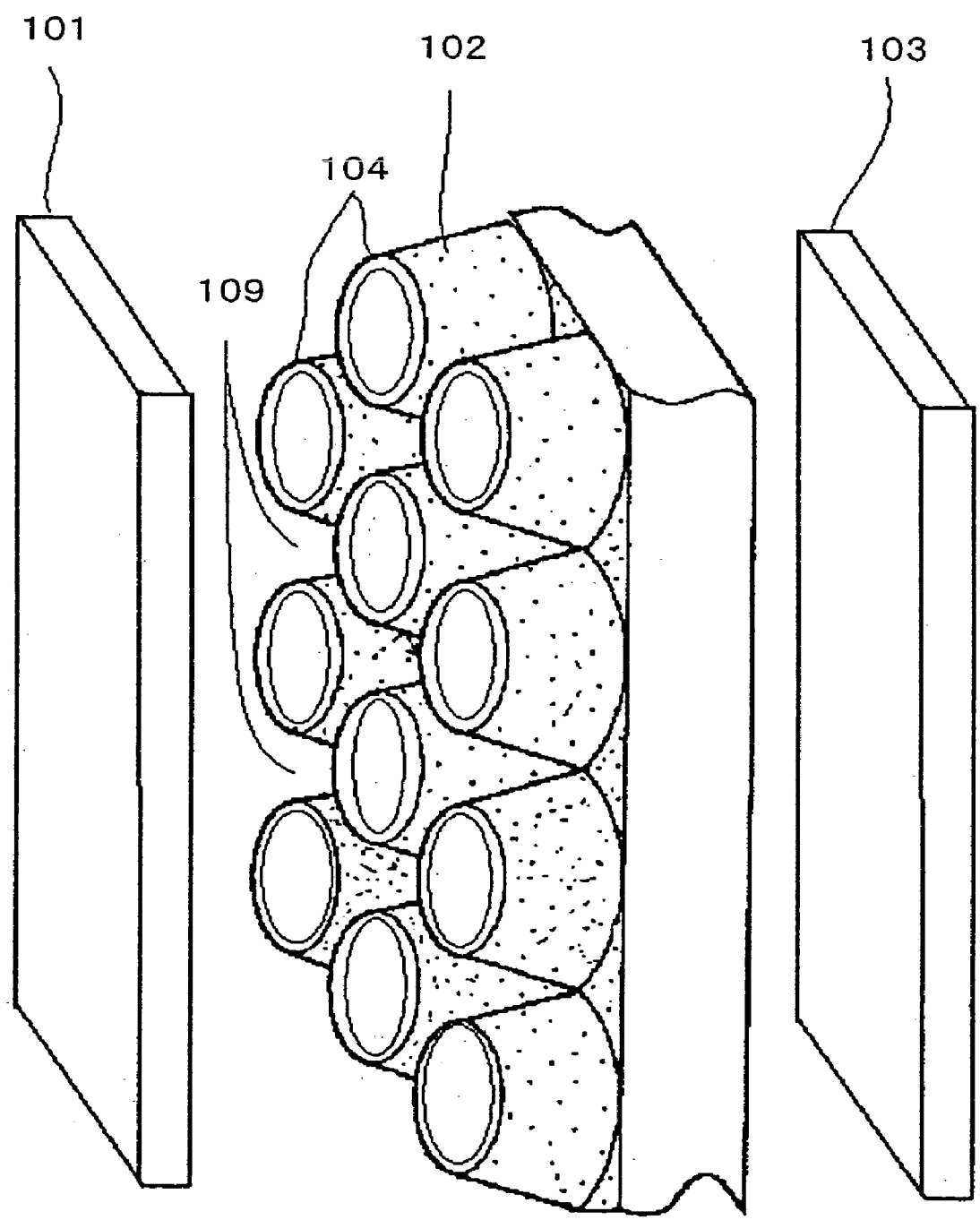
FIG. 18 is a view illustrating another example of the construction of the light diffusion sheet.

FIGS. 17 and 18 are views each illustrating an example of the construction of the light diffusion sheet S2 according to the seventh embodiment. The light diffusion sheet illustrated in FIG. 17 has a unit lens 102 the cross sectional configuration in the horizontal direction of that is fixed in the perpendicular direction. Between two adjacent of the unit lenses 102, 102 has filled therein at the between-lens portion 109 through the transparent low refractive index layer 104 the resin material 108 having added thereto the light absorption particles 105. On the light emission surface side there is disposed the diffusion agent mixed sheet 101 while, on the light incidence surface side, there is disposed the base sheet 103. In this figure, for better understanding, these three are illustrated by being separated from one another. However, in actuality, they are bonded together.

On the other hand, in the light diffusion sheet illustrated in FIG. 18, semi-frusto-conical unit lenses are two-dimensionally arrayed on a perpendicular flat surface. The flat surface of the semi-frusto-conical apex portion of each unit lens is formed on the same plane and, on that flat surface, there is bonded thereto the diffusion agent mixed sheet 101. The space between two adjacent of the unit lenses 102, 102 has filled therein at the between-lens portion 109 through the transparent low refractive index layer 104 the resin material 108 having added thereto the light absorption particles 105. By the construction of the light diffusion sheet illustrated in any one of FIGS. 17 and 18, the effects of the present invention can be obtained.

In FIG. 18, the light can be diffused by the lenses in two, up and down and left and right, directions. Further, even when disposing two one-dimensional light diffusion sheets or films in the way they intersect each other orthogonally, they can be made a two-dimensional light diffusion sheet or film that has the same effects as those attainable with the FIG. 18 structure.

Figure 19:
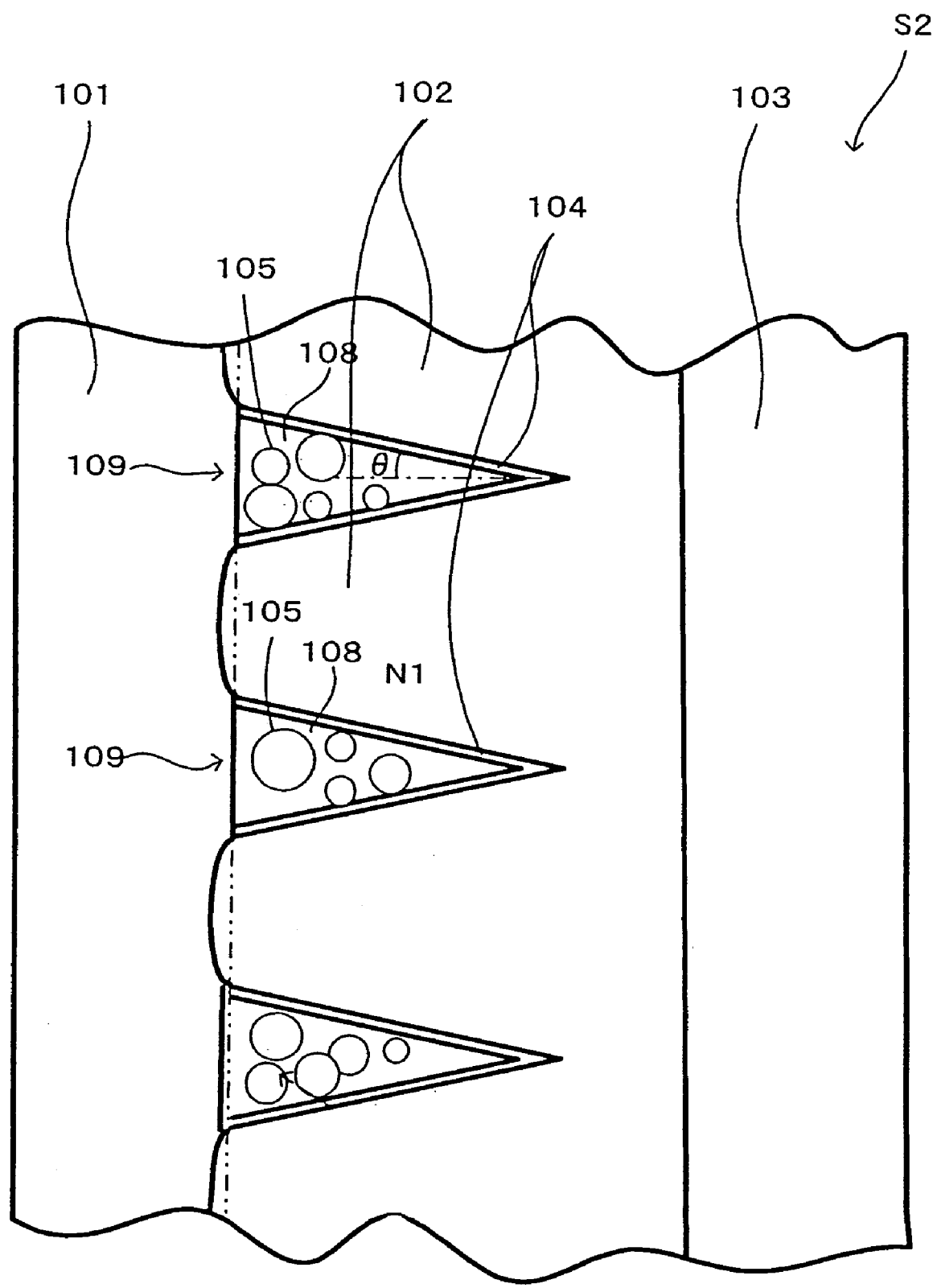
FIG. 19 is a view illustrating the cross section of a modification of the light diffusion sheet according to a seventh embodiment.

FIG. 19 is a view illustrating an example wherein, in the light diffusion sheet S2 according to the seventh embodiment, the light outgoing surface of the unit lens 102 (the portion corresponding to the upper bottom of the cross-sectionally viewed trapezoid) is formed in the way it is convex toward the viewer side. By constructing like that, in the manufacturing process, in the case of adopting the process of first forming the portion of the unit lens 102 and then filling the material 108 having added thereto the light absorption particles 105 into the between-lens portion 107, it is possible, after filling, to completely remove the light absorption particles 105 left on the light emission surface away by the use of a blade.

Figure 20:
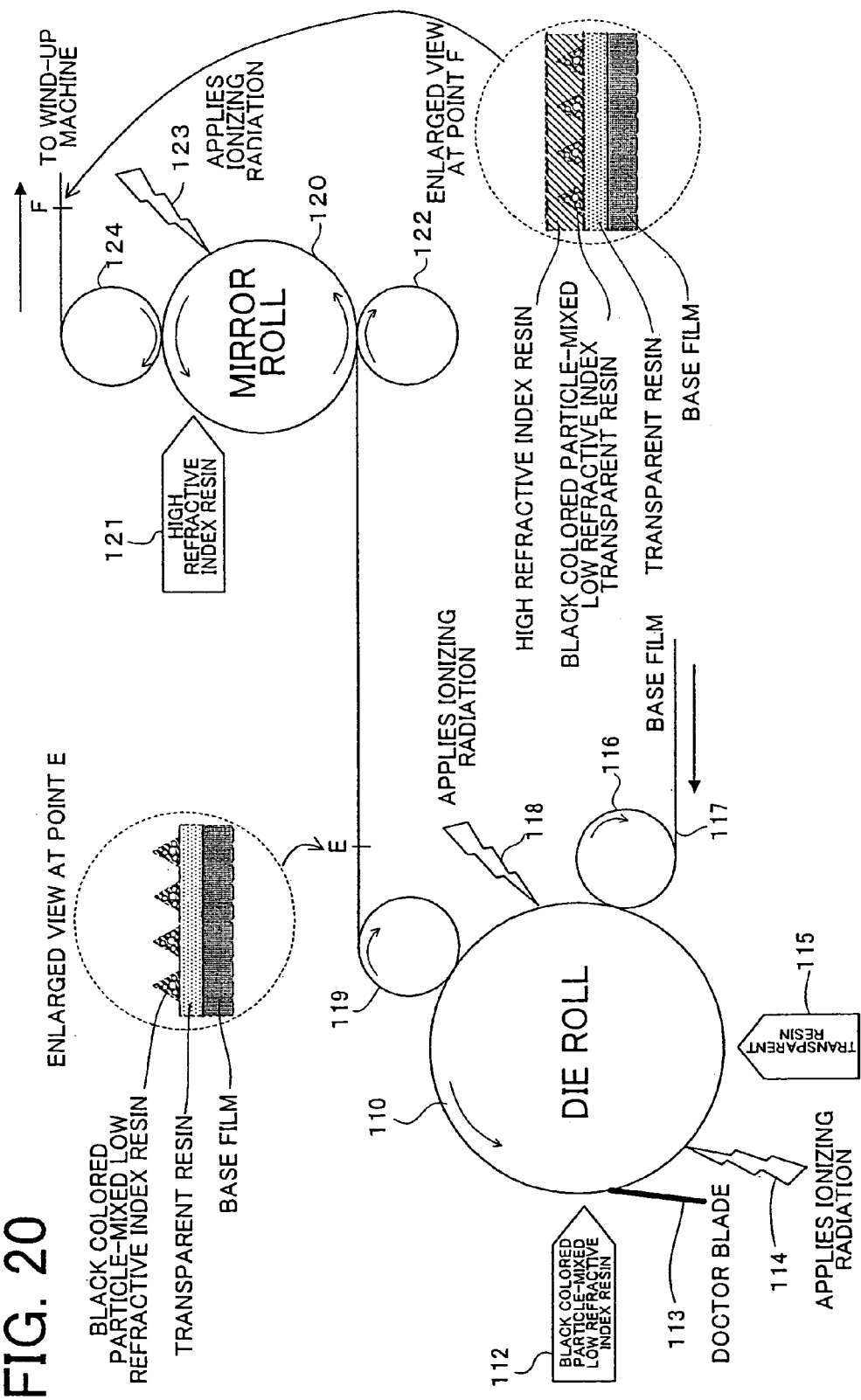
FIG. 20 is a view illustrating a manufacturing method for the light diffusion sheet according to the sixth embodiment.
Figure 21:
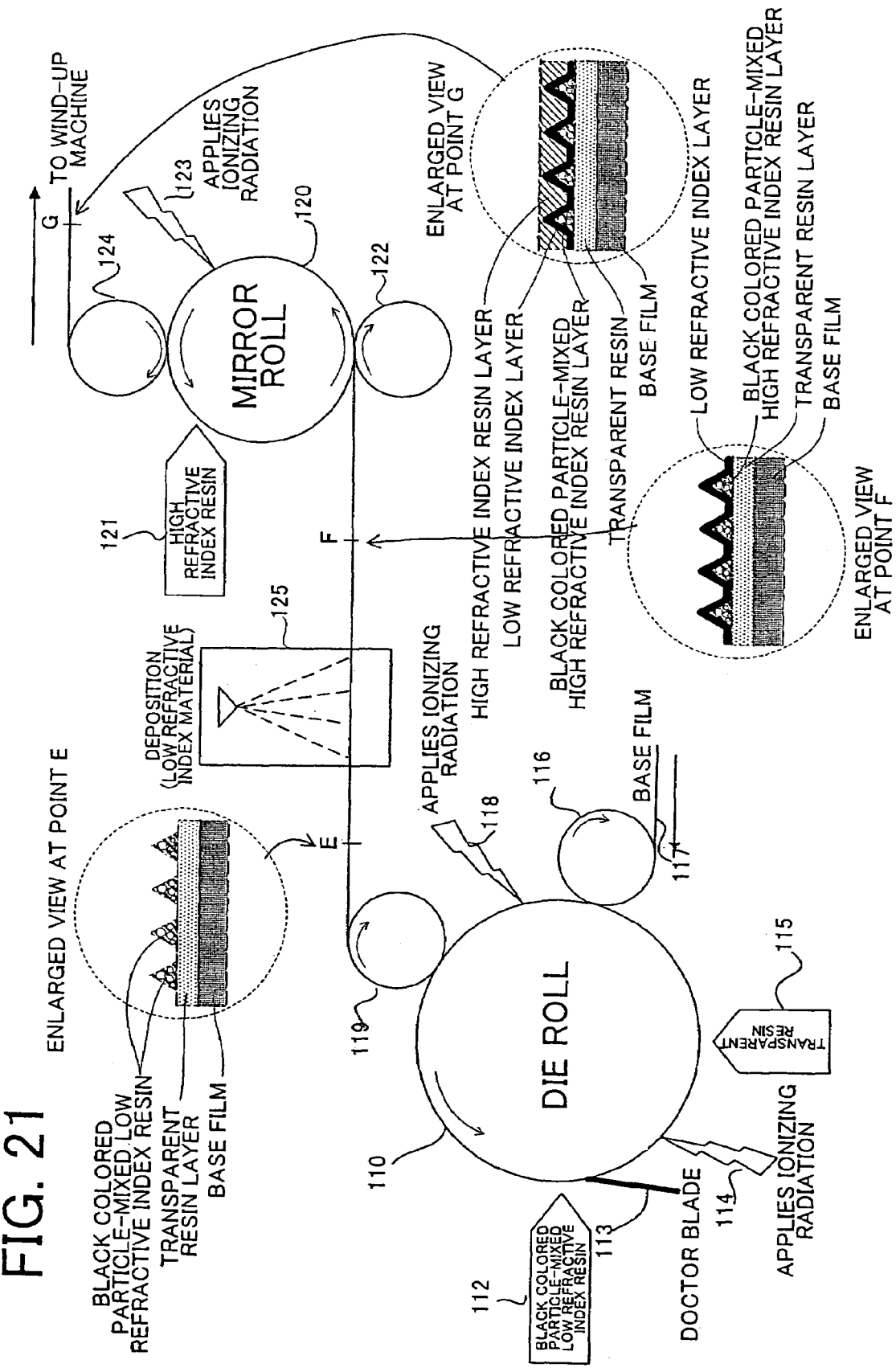
FIG. 21 is a view illustrating a manufacturing method for the light diffusion sheet according to the seventh embodiment.

Next, the production method for manufacturing the light diffusion sheet according to the sixth and the seventh embodiments with reference to FIGS. 20 and 21 will be explained. FIG. 20 and FIG. 21 illustrate, respectively, the production method for the light diffusion sheet S1 according to the sixth embodiment and the production method for the light diffusion sheet S2 according to the seventh embodiment.

A production system that is used for that production method includes a die roll 110, a mirror roll 120, a base film supply roll 116, auxiliary rolls 119, 122, and 124, ionizing radiation hardenable resin feeders 112, 115, and 121, and ionizing radiation applicators 114, 118, and 123. Further, the production system according to the seventh embodiment includes a deposition device 125 for the material forming the transparent low refractive index layer.

In the production system for the light diffusion sheet S1 according to the sixth embodiment of FIG. 20, in the surface of the die roll 110 that rotates at a prescribed speed there is engraved a female die corresponding to the cross-sectionally viewed triangle portion constructing the between-lens portion 107. The low refractive index resin having added thereto black color particles (light absorption particles) and heated up to a prescribed temperature is supplied from the resin feeder 112 onto the die roll 110 and is filled into the concavity portion that is triangular. After the resin in excess is scratched off by a doctor blade 113, ionizing radiation is radiated onto the surface of the roll by the ionizing radiation applicator 114, thereby hardening the low refractive index resin containing therein the black colored particles. Subsequently, from the feeder 115 transparent resin is supplied to over substantially the entire length of the roll width to thereby form the transparent resin layer on the die roll 110. Further, over that surface, the base film 117 is applied by taking it out from the base film supply roll 116. Thereafter, the transparent resin is hardened by radiating ionizing radiation again by the ionizing radiation applicator 118. Then, the resulting film is turned back, by the auxiliary roll 119, to the mirror roll 120. By that turn-back process, the cross-sectionally viewed triangle black-colored added low refractive index portion that has been formed in the concavity portion of the surface of the die roll 110 is peeled off from the surface of the roll. At this point in time, as illustrated in the point E enlarged view, a transparent resin layer is formed on the base film, and, further, the transparent resin layer has formed on its upper surface the black-colored particles added low refractive index resin in the form of a triangle in cross section.

On the side of the mirror roll 120, beforehand, high refractive index resin constructing the unit lenses is supplied from the feeder 121 onto the surface of the roll, whereby a high refractive index resin layer is kept formed in a soft state before being hardened. This high refractive index resin layer and the intermediate product, that has been supplied on from the die roll 110, are pressure-bonded to each other by the mirror roll 120 and an auxiliary roll 122. By this bonding-together, the soft high refractive index resin is introduced into between each two adjacent of the cross-sectionally viewed trapezoids formed by the transparent low refractive index layer, with no clearance existing between the both. Further, ionizing radiation is applied, by the ionizing radiation applicator 23, onto the surface of the mirror roll 120 to thereby harden the high refractive index resin. Then, through the use of an auxiliary roll 124, the film is turned back in the opposite direction, thereby exfoliating the hardened high refractive index resin from the mirror roll 120. At this point in time, as illustrated in a point G enlarged view, the group of unit lenses that has been formed by the high refractive index resin layer the cross section of that is trapezoidal is kept formed on the upper surface of the cross-sectionally viewed triangular transparent low refractive index layer. Thereafter, that sheet is supplied to a take-up machine and thus is taken up in the form of a roll.

In the production system for the light diffusion sheet S2 according to the seventh embodiment of FIG. 21, it is the black-colored particle mixed transparent high refractive index resin (having a refractive index substantially the same as that of the unit lens portion) that is supplied from the resin feeder 112. Also, in this manufacturing process, the deposition device 125 is provided at the position of the production line after passing through it at the point E. In the deposition device 125, the transparent low refractive index material is deposited from above, and to over, the black-colored particle mixed transparent high refractive index resin to thereby form the transparent low refractive index layer 104 (see the point F enlarged view). The other constructions are the same as the production system for the light diffusion sheet S1 illustrated in FIG. 20.

Incidentally, while the above-described process forms the cross-sectionally viewed triangular between-lens portion 107 or 109 by using the die roll 110, it may be arranged that the cross-sectionally viewed trapezoidal high refractive index portion 102 be formed previously using the die roll 110 and then the black-colored particle mixed transparent high refractive index resin, or the black-colored particle mixed transparent low refractive index resin, that forms the between-lens portion 107 or 109 be supplied from the feeder 121 on the side of the mirror roll 120.

THIRD EXAMPLE

As the material of the high refractive index portion 102 (trapezoidal portion) constructing the unit lens, as the transparent low refractive index resin of the between-lens portion 107, and as the light absorption particles, there were, respectively, used epoxy acrylate, urethane acrylate, and the "RUBCOULEUR" (registered trademark) made by Dainichiseika Color & Chemicals Mfg. Co. LTD.

The average particle size of the "RUBCOULEUR" is 8 μm and the amount added thereof has been made 50 mass %.

The refractive index of the high refractive index portion 2 is 1.57 and the refractive index of the between-lens portion 107 is 1.48. On the light incidence side of the sheet that has been constructed in that way, there has been disposed the Fresnel lens sheet, and, on the side of the viewer, there is disposed a diffusion plate. The diffusion plate has an acrylic-made three-layer structure and, as the intermediate layer, there has been used the one having mixed there in a diffusion agent. The lens pitch of the high refractive index portion has been made 50 μm. Also, the length of the upper bottom of the trapezoidal portion of the high refractive index portion 102 and the length of the bottom side of the triangle-like low refractive index portion were set to be equal to each other. The so-called "black stripe proportion" thereby is so set as to be 50%. Further, the apex angle θ has been set to 10°.

The light diffusion sheet that has been constructed above had a transmittance of 80%, a reflectance of 5%, and a gain value of 4. Also, the perpendicular angle of visibility (the half-value angle: the angle at which the brightness that prevails when view is made from that direction becomes half the one that prevails when view is made from the front) is 12° while, on the other hand, the horizontal angle of visibility (the half-value angle) is 25°.

(Eighth and Ninth Embodiments)

Figure 22:
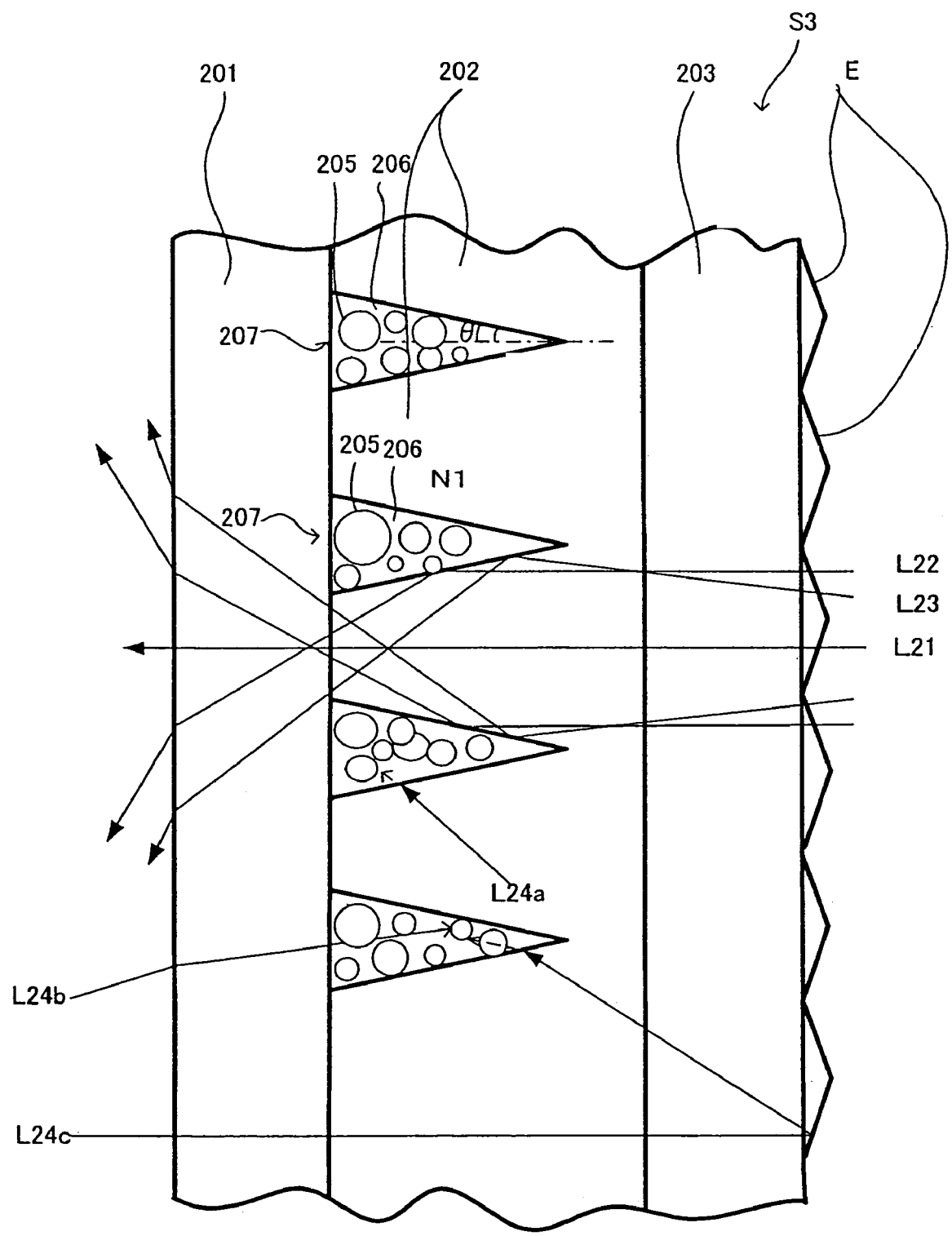
FIG. 22 is a view illustrating the cross section of the light diffusion sheet according to an eighth embodiment.
Figure 23:
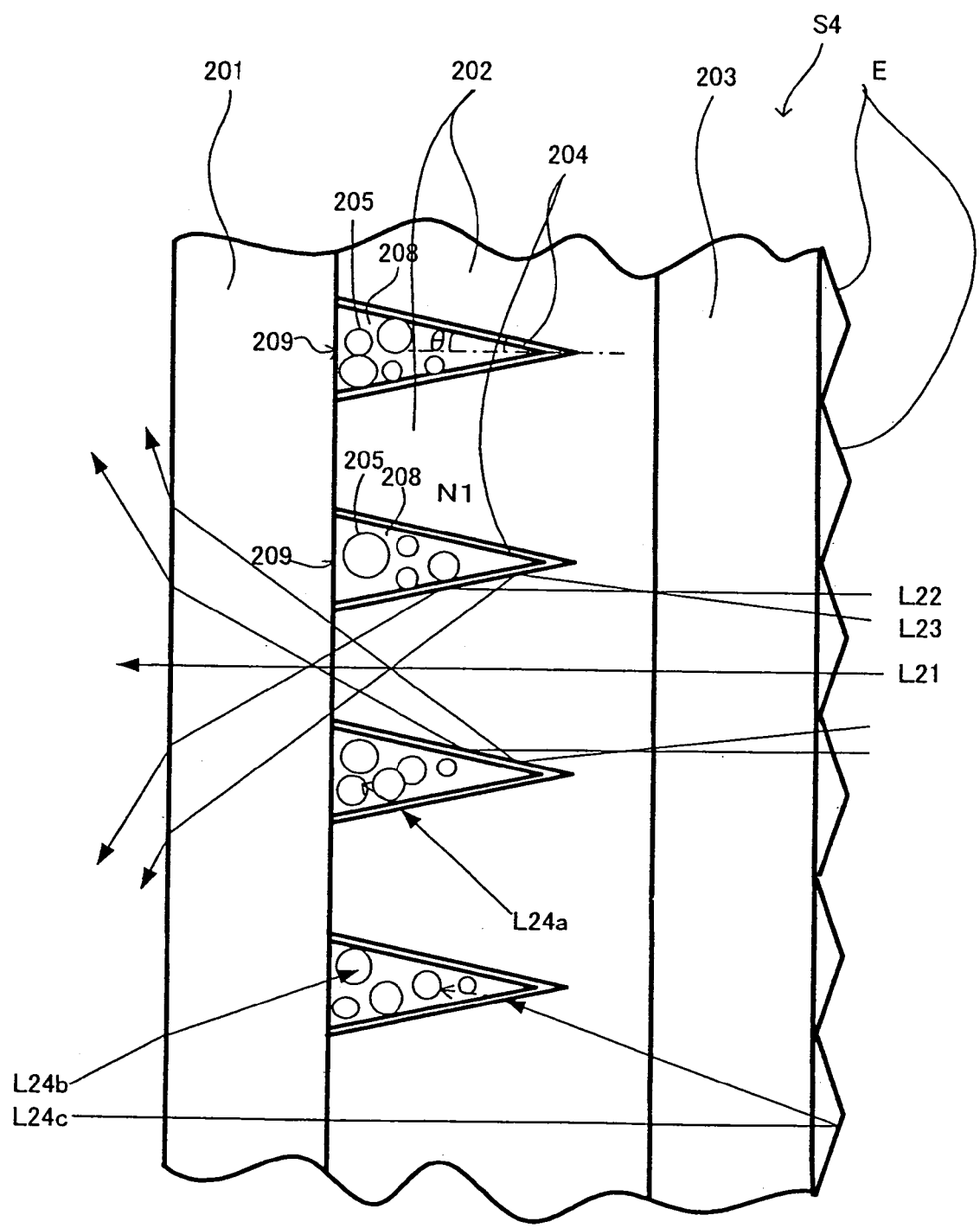
FIG. 23 is a view illustrating the cross section of the light diffusion sheet according to a ninth embodiment.

FIGS. 22 and 23 are views illustrating the horizontal cross sections of the light diffusion sheets S3 and S4 according to the eighth and the ninth embodiments of the present invention. In each of these figures, the image light source is disposed on the right side of the illustration and the viewer is located on the left side of the illustration.

FIG. 22 illustrates the light diffusion sheet S3 according to the eighth embodiment of the present invention. In this light diffusion sheet S3, from the viewer side toward the image light source, there are sequentially disposed a diffusion agent mixed sheet 201, unit lenses 202, and a base sheet 203 in the way they are bonded together. And, further, on the surface of the image light source side of the base sheet 203 there is performed emboss processing and, thereby, the embossed portion E is formed. The unit lens 202 is formed using a material having a high refractive index N1. Further, in a portion that is defined between two adjacent 202, 202 of the unit lenses and the cross sectional configuration of that is triangle (hereinafter referred to as "the between-lens portion 207"), there is embedded a material that has been prepared by adding the light absorption particles 205 into a transparent material having a refractive index N2 lower than the N1 (hereinafter referred to as "the transparent low refractive index material 206"). Also, the embossed portion E is formed using a material having a refractive index N3.

In this embodiment, the refractive index N1 of the high refractive index portion 202, the refractive index N2 of the transparent low refractive index material 206, and the configuration and refractive index N3 are so set as to have a prescribed relationship in order to obtain the optical characteristics of the light diffusion sheet 33. Also, the angle that is defined by the slant at which the between-lens portion 207 and the high refractive index portion 202 contact with each other, with respect to a normal line to the light emission surface (that is parallel with the perpendicular incident light upon the light diffusion sheet 33), is so formed as to be a prescribed angle θ.

The high refractive index portion 202 is ordinarily constructed using a material of epoxy acrylate or the like having ionizing radiation hardenable property. Also, as the transparent low refractive index material 206, there is ordinarily used a material of urethane acrylate or the like having ionizing radiation hardenable property. As the light absorption particles 205 there can be used commercially available colored resin fine particles. Also, the diffusion agent mixed sheet 201 and the base sheet 203 each are constructed using a material having a refractive index substantially the same as that of the high refractive index portion 202. On the viewer side of the diffusion agent sheet 201 there is provided according to the necessity a functional layer such as an anti-reflection layer, a hard coat layer, a polarizing filter layer, an anti-static layer, an anti-glare processed layer, a soil-proofed layer, a touch sensor layer, etc.

Next, the optical paths of the light rays that have entered the unit lens 202 of the light diffusion sheet S3 will be briefly explained with reference to FIG. 22. Incidentally, in FIG. 22, the optical paths of the light rays L21 to L24 are the ones that have been shown as typical examples. In FIG. 22, the perpendicular light ray L21 that has entered the vicinity of the central portion of the unit lens 202 from the image light source side goes straight-forward, as is, through the interior of the light diffusion sheet S3 and passes therethrough to reach the viewer. The perpendicular light ray L22 that has entered the end portion of the unit lens 202 from the image light source side is totally reflected by the slant because of the refractive index difference between the high refractive index portion 202 and the transparent low refractive index material 206 and is emitted toward the viewer side at a prescribed angle. The light ray L23 that has entered, at an angle, the vicinity of the end portion of the unit lens 202 from the image light source side is totally reflected by the slant and is emitted toward the viewer side in a direction opposite to that at the time of incidence and at an angle that is further greater than that angle. The stray light ray L24a that has gotten incident upon the slant at an angle greater than prescribed enters the between-lens portion 207 without being reflected even through the difference in refractive index between the high refractive index portion 202 and the low refractive index material 206 and is absorbed into the light absorption particles 205, not reaching the viewer side. The stray light ray 24b that has entered the between-lens portion 207 from the viewer side (the light outgoing surface side) is absorbed into the light absorption particles. Therefore, it does not happen that that stray light ray is emitted toward the viewer side by becoming a reflected light. Further, the light ray L24c that has perpendicularly entered toward the opening of the light emission surface of the unit lens 202, after sequentially passing through the diffusion agent mixed sheet 201, unit lens 202, and base sheet 203, is reflected by the image light source side inside surface of the embossed portion E and reaches the between-lens portion 207 at a relatively great angle. Accordingly, that light ray enters the between-lens portion 207 without being reflected by the surface of the between-lens portion 207 and is absorbed into the light absorption particles 205. In this way, there can be obtained a light diffusion sheet S3 that has a wide angle of visibility in the horizontal direction and the contrast and brightness of that are respectively high.

FIG. 23 illustrates the light diffusion sheet S4 according to the eighth embodiment of the present invention. In this light diffusion sheet S4, from the viewer side toward the image light source, there are sequentially disposed a diffusion agent mixed sheet 201, unit lenses 202, and a base sheet 203 in the way they are bonded together. And, further, on the surface of the image light source side of the base sheet 203 there is performed emboss processing and, thereby, the embossed portion E is formed. The unit lens 202 is formed using a material having a high refractive index N1. Further, on a slant that is defined between two adjacent 202, 202 of the unit lenses there is formed a layer 204 formed using a material having a refractive index N2 lower than the N1 (hereinafter referred to as "the transparent low refractive index material 204"). Also, in a portion that is defined between two adjacent 202, 202 of the unit lenses and the cross sectional configuration of that is triangle, there is embedded a material that has been prepared by adding the light absorption particles 205 into a material 208 having a refractive index higher than the N2. In the following explanation, the portion the cross sectional configuration of that is triangle is referred to as "the between-lens 209"). Also, the embossed portion E is formed using a material having a refractive index N3.

The refractive index N1 of the high refractive index portion 202, the refractive index N2 of the transparent low refractive index material 206, and the configuration and refractive index N3 are so set as to have a prescribed relationship in order to obtain the optical characteristics of the light diffusion sheet S4. Also, the angle that is defined by the slant at which the transparent low refractive index layer 204 and the high refractive index portion 202 contact with each other, with respect to a normal line to the light emission surface (that is parallel with the perpendicular incident light upon the light diffusion sheet S4), is so formed as to be a prescribed angle θ. The details of this will be described later.

The high refractive index portion 202 is ordinarily constructed using a material of epoxy acrylate or the like having ionizing radiation hardenable property. Also, the transparent low refractive index layer 204 is formed using a material having a refractive index lower than that of the silica transparent resin. As the light absorption particles 205 there can be used commercially available colored resin fine particles. Also, the diffusion agent mixed sheet 201 and the base sheet 203 each are constructed using a material having a refractive index substantially the same as that of the high refractive index portion 202. On the viewer side of the diffusion agent mixed sheet 201 there is provided according to the necessity a functional layer such as an anti-reflection layer, a hard coat layer, a polarizing filter layer, an anti-static layer, an anti-glare processed layer, a soil-proofed layer, a touch sensor layer, etc.

Next, the optical paths of the light rays that have entered the unit lens 202 of the light diffusion sheet S4 will be briefly explained with reference to FIG. 23. Incidentally, in FIG. 23 as well, the optical paths of the light rays L21 to L24 are the ones that have been shown as typical examples. In FIG. 23, the perpendicular light ray L21 that has entered the vicinity of the central portion of the unit lens 202 from the image light source side goes straight-forward, as is, through the interior of the light diffusion sheet S4 and passes therethrough to reach the viewer.

The perpendicular light ray L22 that has entered the vicinity of the end portion of the unit lens 202 from the image light source side is totally reflected by the slant because of the refractive index difference between the high refractive index portion 202 and the transparent low refractive index material 204 and is emitted toward the viewer side at a prescribed angle. The image light ray L23 that has entered, at an angle, the vicinity of the end portion of the unit lens 202 from the image light source side is totally reflected by the slant and is emitted toward the viewer side in a direction opposite to that at the time of incidence and at an angle that is further greater than that angle. The stray light ray L24a that has gotten incident upon the slant at an angle greater than prescribed enters the transparent low refractive index portion 204 without being reflected even through the difference in refractive index between the high refractive index portion 202 and the low refractive index material 204. The stray light ray L24a is absorbed into the light absorption particles 205, not reaching the viewer side. Also, the stray light ray 24b that has entered the between-lens portion 209 from the viewer side also is absorbed into the light absorption particles 205. Therefore, it does not happen that that stray light ray is emitted toward the viewer side by becoming a reflected light. Further, the light ray L24c that has perpendicularly entered toward the opening of the light emission surface of the unit lens, after sequentially passing through the diffusion agent mixed sheet 201, unit lens 202, and base sheet 203, is reflected by the image light source side inside surface of the embossed portion E and reaches the between-lens portion 207 at a relatively great angle. Accordingly, that light ray enters the between-lens portion 207 without being reflected by the surface of the between-lens portion 207 and is absorbed into the light absorption particles 205. In this way, there can be obtained a light diffusion sheet S4 that has a wide angle of visibility in the horizontal direction and the contrast and brightness of that are respectively high.

Incidentally, in FIGS. 22 and 23, there has been illustrated the construction wherein the base sheet 203 is disposed on the light incidence surface side of the light diffusion sheet S3 or S4. However, even when that is removed, the similar optical effects can be obtained.

Also, in FIG. 22, there has been illustrated an example wherein the between-lens portion 207 of the light diffusion sheet S3 has filled therein the low refractive index transparent material having added thereto the light absorption particles. However, even when it is instead constructed that the between-lens portion 207 has filled therein the colored low refractive index material, the similar effects can be obtained.

Similarly, in FIG. 23, there has been illustrated an example wherein the between-lens portion 209 of the light diffusion sheet S4 has filled therein the high refractive index transparent material having added thereto the light absorption particles. However, even when it is instead constructed that the between-lens portion 209 has filled therein the colored high refractive index material, the similar effects can be obtained.

Additionally, the explanations that have been made about FIGS. 13 to 15 in the sixth and the seventh embodiments, are also applied to the eighth and the ninth embodiments.

Figure 24:
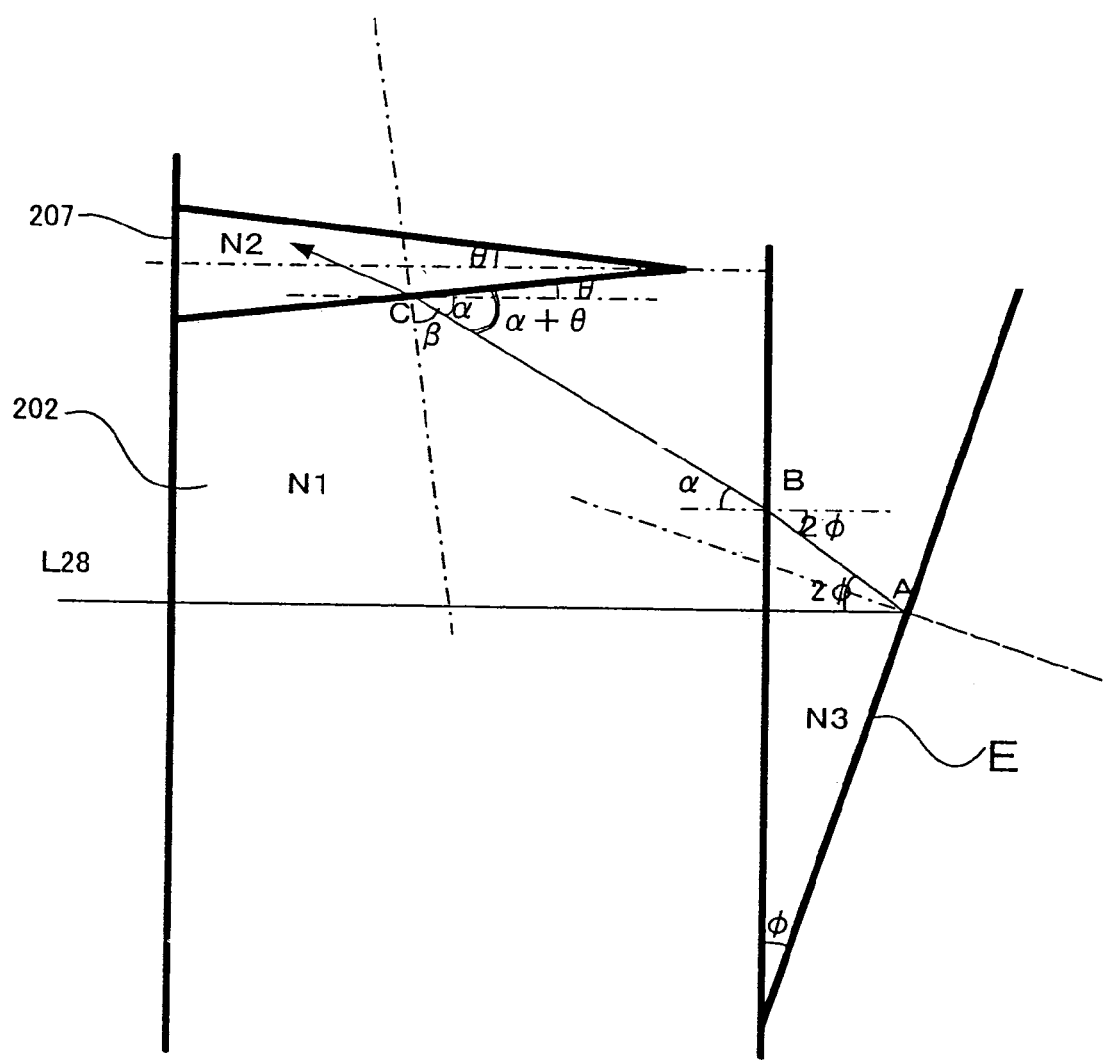
FIG. 24 is a view illustrating the condition on which a light perpendicularly entering from the light outgoing surface side is reflected and further reaches a between-lens portion and is absorbed.

Next, the condition on which the light ray L28 that has perpendicularly entered the light diffusion sheet from the light emission surface side and has been reflected by the embossed portion E is absorbed by the between-lens portion 207 will be explained while referring to FIG. 24. In FIG. 24, the left side of the illustration is the viewer side and the right side of it is the image light source side. For brevity of the explanation, the embossed portion E is illustrated in the way of being enlarged, and, the diffusion agent mixed sheet 201 and the base sheet 203 are omitted.

The perpendicular light ray L28 that has gotten incident upon the light diffusion sheet S3 from the light emission surface side is reflected at a point A of the image light source side inner surface of the embossed portion E, crosses, at a point B, the boundary between the embossed portion E and the unit lens 202, and reaches the between-lens portion 207, at a point C. Here, it is assumed that φ represents the angle defined by the section of the embossed portion with respect to the unit lens 202; and α represents the angle defined by the reflected light ray L28, within the light diffusion sheet, with respect to the normal line to the light emission surface. Since the angle that is defined by the light ray L28 that has been reflected at the point A with respect to the normal line to the light emission surface, at the point B, within the embossed portion is 2φ, according to the Snell's law, the equation:

$$N1 \sin \alpha = N3 \sin 2\phi \qquad \text{(Equation 1)}$$

holds true. Also, since, at the point C, the angle β defined between the light ray L28 and the normal line to the slant of the between-lens portion 207 is (90°−α−θ), at the point C, the Snell's law under the critical conditions is expressed as follows.

$$N2 \sin 90° = N1 \sin \beta$$

Namely, $$N2 = N1 \sin (90°-\alpha-\theta) \qquad \text{(Equation 2 10)}$$

From the equations 1 s and 2, $$\sin (90°-(\sin^{-1}(N3*\sin(2\phi)/N1+\theta))=N2/N1 \qquad \text{(Equation 3 11)}$$

Accordingly, the conditions on which the light ray L28 can enter the between-lens portion 207 are expressed as follows.

$$\sin(90°-(\sin^{-1}(N3*\sin(2\phi)/N1+\theta))<N2/N1 \qquad \text{(Relationship 9)}$$

The larger the area of the embossed portion E satisfying the conditions of the Relationship 9, the higher the proportion in which the external light is absorbed into the light absorption particles 205 of the between-lens portion 207. As a result of this, the contrast of the light diffusion sheet can be increased. According to the inventor's knowledge of this application, it proves that if assuming that the area of the embossed portion E satisfying such conditions be 20% of the area of the entire light incidence surface, it is possible to obtain a light diffusion sheet that has excellent level of contrast.

Figure 25:
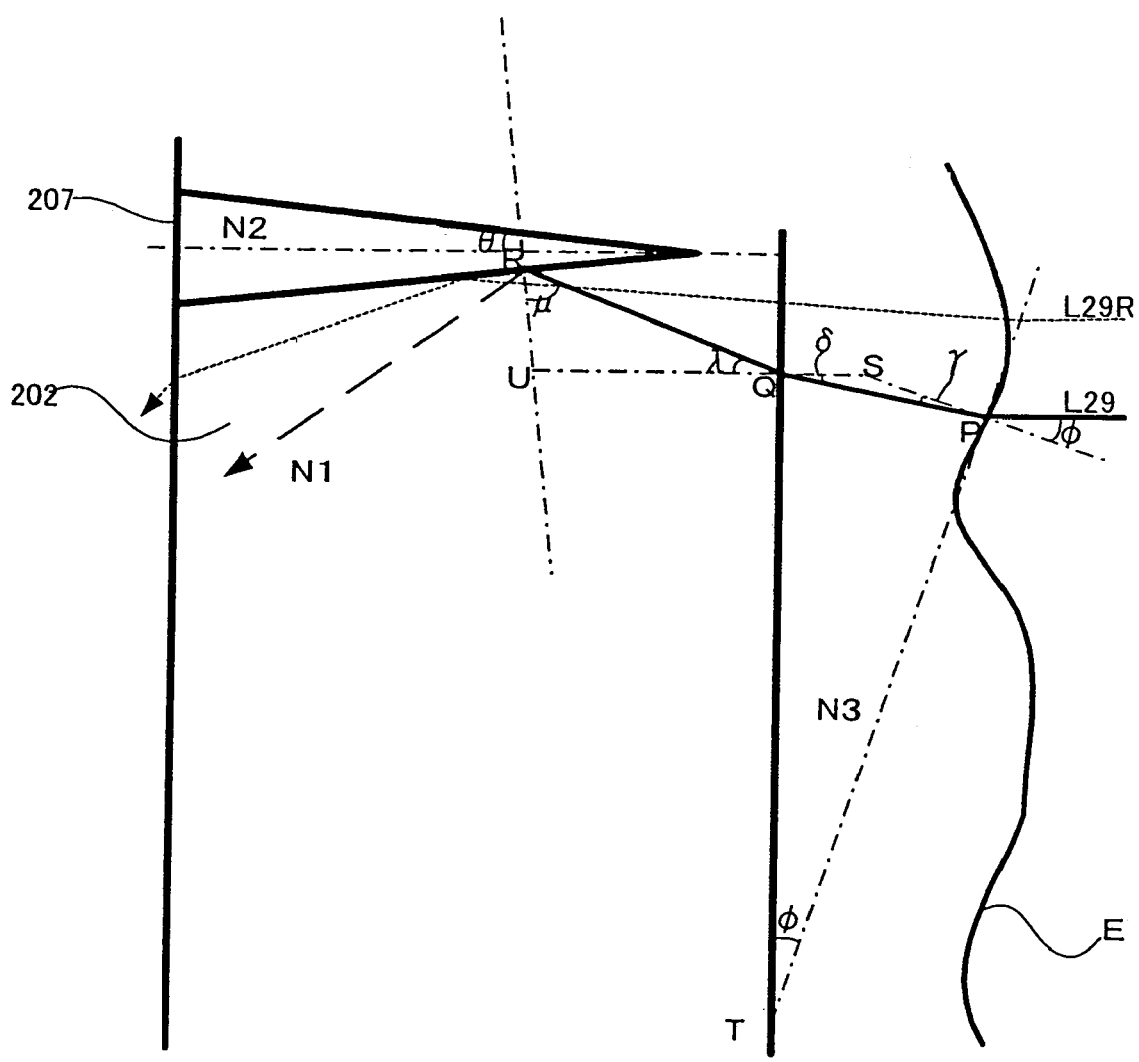
FIG. 25 is a view illustrating the condition on which an image light perpendicularly entering from the light incidence surface side is absorbed in the between-lens portion.

Next, the condition on which the light ray L29 (image light ray) that has perpendicularly entered the light diffusion sheet from the image light source side is absorbed by the between-lens portion 207 will be explained while referring to FIG. 25. In FIG. 25 as well, the left side of the illustration is the viewer side and the right side of it is the image light source side. Incidentally, here, the embossed portion E is depicted in the form of a random mat that is enlarged, and the diffusion agent mixed sheet 201 and the base sheet 203 are omitted. Incidentally, for reference, the light ray L29R that enters the embossed portion E from the image light source side at a perpendicular angle and that is completely reflected by the between-lens portion 207 is also shown in dotted lines.

The perpendicular light ray L29 that has gotten incident upon the embossed portion E from the image light source side is refracted at a point P on the image light source side of the embossed portion E and cross, at a point Q, the boundary surface between the embossed portion E and the unit lens 202. Further, that light is refracted at a point Q and gets incident upon the unit lens 202 and, at a point R, reaches the between-lens portion 207. Here, it is assumed that $\phi$ represents the angle that is defined by a line tangential, at the position where the perpendicular light ray L29 enters, to the section of the embossed portion with respect to the boundary between the embossed portion and the unit lens 202; $\gamma$ represents the angle defined by the light ray L29 with respect to the normal line to the slant of the embossed portion; $\delta$ represents the angle defined by the boundary surface between the unit lens 202 and the embossed portion with respect to the normal line; and $\mu$ represents the angle defined, within the unit lens 202, by the light ray L29 with respect to the normal line to the slant of the between-lens portion 207. Also, S and U are assumed to represent the intersections between respective twos of the three normal lines passing the respective points P, Q, and R and T is assumed to represent the intersection of the slant of the section of the embossed portion and the boundary between the between-lens portion and the embossed portion.

Now, in the square PSQT, $$\angle PSQ=360°-90°*2-\phi=180°-\phi$$

Accordingly, $$\delta=180°-\nu-\angle PSQ=\phi-\nu \quad \text{(Equation 4)}$$

Since at the point P the Snell's law holds true, $$\sin\phi=N3\sin\nu \quad \text{(Equation 5)}$$

At the point Q as well the Snell's law holds true. Therefore, $$N3\sin\delta=N1\sin\lambda \quad \text{(Equation 6)}$$

On the other hand, in the triangle RUQ, $$\angle RUQ 90°+\theta$$

Therefore, $$\mu=90°-\lambda-\theta \quad \text{(Equation 7)}$$

Further, at the point R, from the Snell's law under the critical conditions, $$N2=N1\sin\mu \quad \text{(Equation 8)}$$

Accordingly, from the equations 4 to 8, $$\sin(90°-(\sin^{-1}(N3/N1)*\sin(\phi-\sin^{-1}(\sin\phi/N3)))+\theta))=N2/N1$$

Accordingly, the conditions for the light ray L29 to be absorbed into the light absorption particles of the between-lens portion 207 are expressed as:

$$\sin(90°-(\sin^{-1}(N3/N1)*\sin(\phi-\sin^{-1}(\sin\phi/N3)))+\theta))<N2/N1 \quad \text{(Relationship 10)}$$

The smaller the area of the embossed portion E satisfying the conditions of the relationship 10, the higher the proportion in which the image light reaches the viewer side without being absorbed into the light absorption particles 205 of the between-lens portion 207. As a result of this, it is possible to obtain a light diffusion sheet having a high transmittance. According to the inventor's knowledge of this application, it proves that if the area of the embossed portion E satisfying the conditions of the relationship 10 is 20% or less of the area of the entire light incidence surface, it is possible to obtain an excellent value of transmittance.

Additionally, the explanations that have been made about FIG. 16 in the sixth and the seventh embodiments, are also applied to the eighth and the ninth embodiments.

Incidentally, according to the inventor's knowledge of this application, preferably, the pitch of the embossed portion is 1/1.5 or less, or more preferably 1/4.5, of the pitch of the unit lens of the light emission surface side. By setting the pitch of the embossed portion as such, the above-described optical characteristics can be sufficiently exhibited, and, further, the occurrence of moiré can be also avoided.

Figure 26:
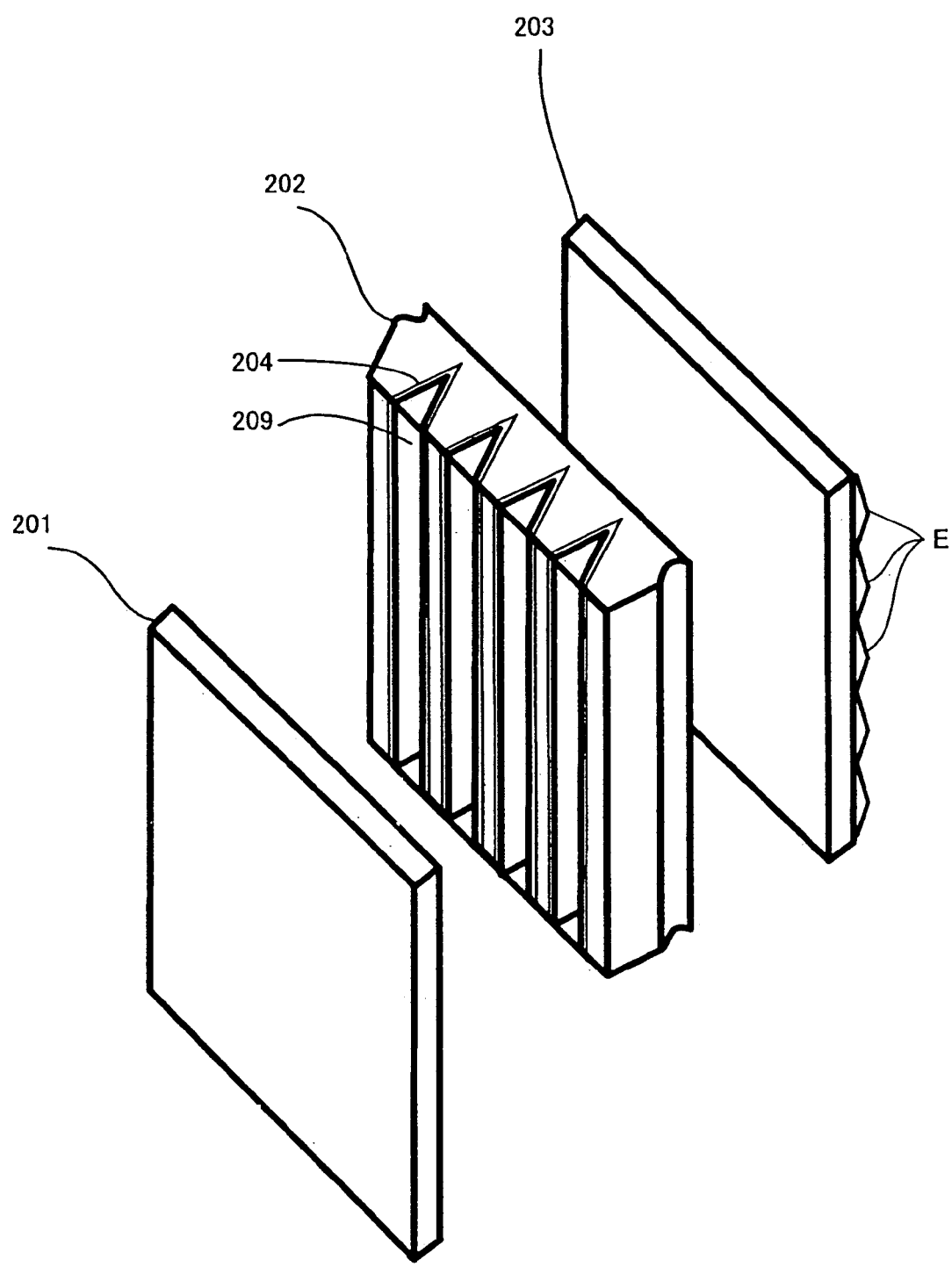
FIG. 26 is a view illustrating an example of the construction of the light diffusion sheet.
Figure 27:
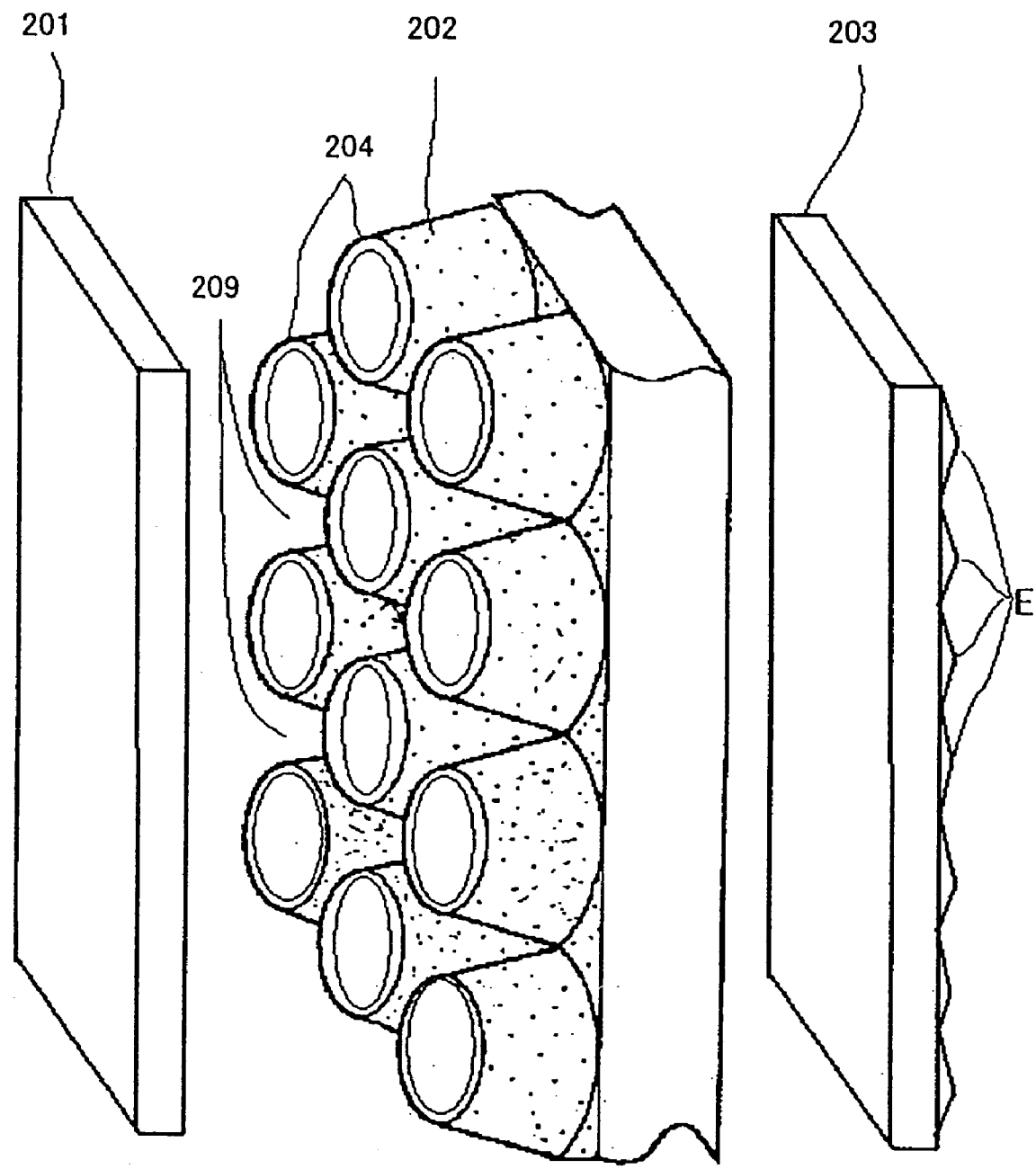
FIG. 27 is a view illustrating another example of the construction of the light diffusion sheet.

FIGS. 26 and 27 are views each illustrating an example of the construction of the light diffusion sheet S4 according to the ninth embodiment. The light diffusion sheet illustrated in FIG. 26 has a unit lens 102 the cross sectional configuration in the horizontal direction of that is fixed in the perpendicular direction. Between adjacent two of the unit lenses 102, 102 there is filled, in the between-lens portion 209, the resin material 208 having added thereto light absorption particles 205 with the transparent low refractive index layer 204 in between. On the light emission surface side there is disposed the diffusion agent mixed sheet 201 while, on the light incidence surface side, there is disposed the base sheet 203. In this figure, for better understanding, these three are illustrated by being separated from one another. However, in actuality, they are bonded together.

On the other hand, in the light diffusion sheet illustrated in FIG. 27, semi-frusto-conical unit lenses are two-dimensionally arrayed on a perpendicular flat surface. The flat surface of the semi-frusto-conical apex portion of each unit lens is formed on the same plane and, on that flat surface, there is bonded thereto the diffusion agent mixed sheet 201. The space between two adjacent of the unit lenses 202, 202 has filled therein at the between-lens portion 209 through the transparent low refractive index layer 204 the resin material 208 having added thereto the light absorption particles 205. By the construction of the light diffusion sheet illustrated in any one of FIGS. 26 and 27, also, the effects of the present invention can be obtained.

Figure 28:
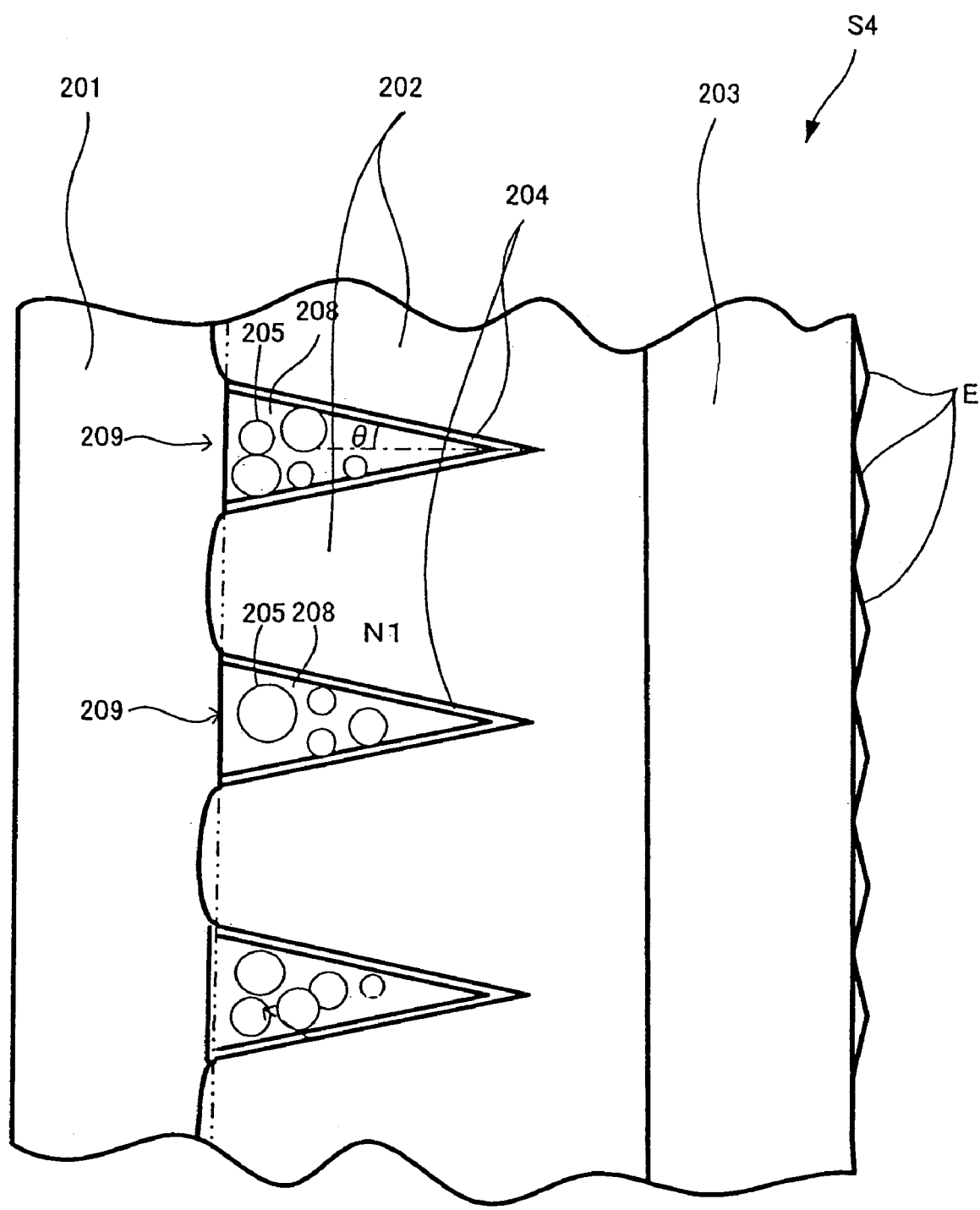
FIG. 28 is a view illustrating the cross section of a modification of the light diffusion sheet according to the ninth embodiment.

FIG. 28 is a view illustrating an example wherein, in the light diffusion sheet 54 according to the ninth embodiment, the light outgoing surface of the unit lens 202 (the portion corresponding to the upper bottom of the cross-sectionally viewed trapezoid) is formed in the way it is convex toward the viewer side. By constructing like that, in the manufacturing process, in the case of adopting the process of first forming the portion of the unit lens 202 and then filling the material 208 having added thereto the light absorption particles 205 into the between-lens portion 209, it is possible, after filling, to completely remove the light absorption particles 205 left on the light emission surface away by the use of a blade.

FIGS. 29A to 29D illustrate examples of the cross-sectional configuration of the embossed portion E. As apparent from the examples of that FIG. 29, the cross sectional configuration of the embossed portion E may be triangular (see E1 of FIG. 29A), or part of an ellipse (see E2 of FIG. 29B), or part of a polygon (see E3 of FIG. 29C). Further, as illustrated in FIG. 29D, the cross-sectional configuration of each embossed portion E4 is trapezoidal and the respective embossed portions are formed by being separated from one another.

Figure 30:
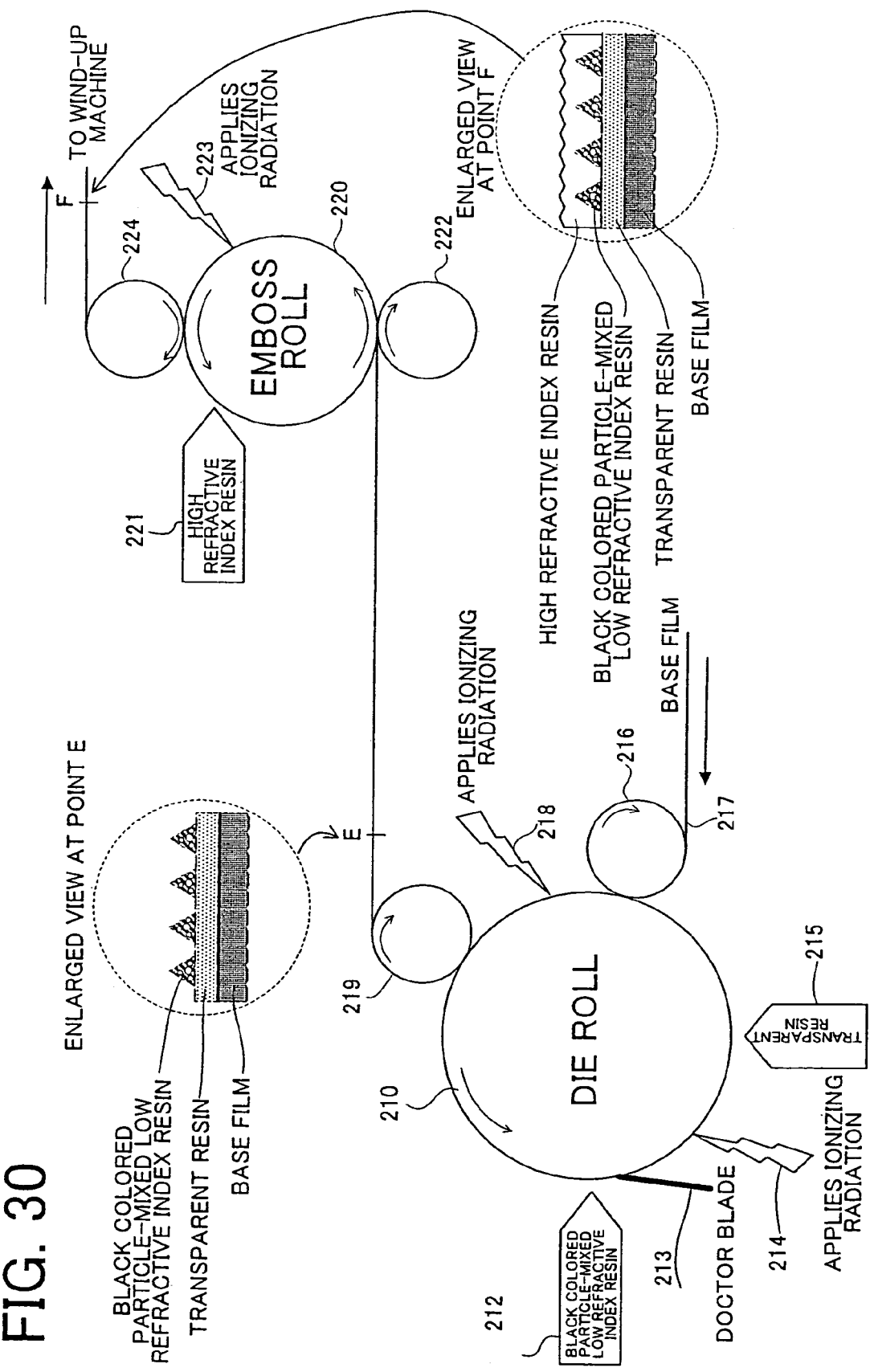
FIG. 30 is a view illustrating an example of the manufacturing method for the light diffusion sheet according to the eighth embodiment.
Figure 31:
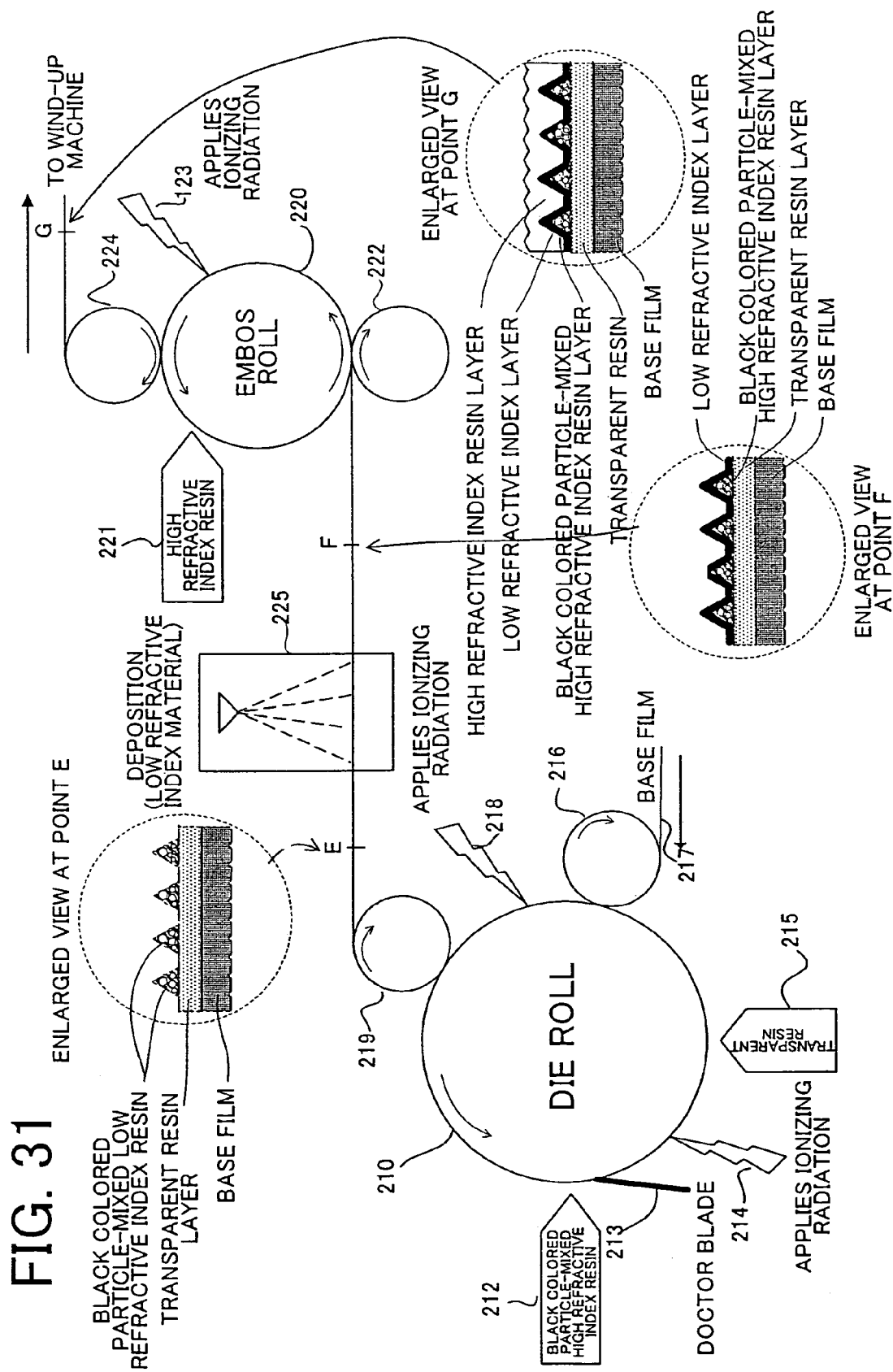
FIG. 31 is a view illustrating an example of the manufacturing method for the light diffusion sheet according to the ninth embodiment.

Next, the production method for manufacturing the light diffusion sheet according to the the eighth and the ninth embodiments with reference to FIGS. 30 and 31 will be explained. FIG. 30 and FIG. 31 illustrate, respectively, the production method for the light diffusion sheet S3 according to the eighth embodiment and the production method for the light diffusion sheet 54 according to the ninth embodiment.

A production system that is used for that production method includes a die roll 210, an emboss roll 220, a base film supply roll 216, auxiliary rolls 219, 222, and 224, ionizing radiation hardenable resin feeders 212, 215, 221, and ionizing radiation applicators 214, 218, and 223. The production system according to the eighth embodiment is equipped with the deposition device 225 for forming the transparent low refractive index layer.

In the production system for the light diffusion sheet S3 according to the eighth embodiment of FIG. 30, in the surface of the die roll 210 that rotates at a prescribed speed there is engraved a female die corresponding to the cross-sectionally viewed triangle portion constructing the between-lens portion 207. The low refractive index resin having added thereto black color particles (light absorption particles) and heated up to a prescribed temperature is supplied from the resin feeder 212 onto the die roll 210 and is filled into the concavity portion that is triangular. After the resin in excess is scratched off by a doctor blade 213, ionizing radiation is radiated onto the surface of the roll by the ionizing radiation applicator 214, thereby hardening the low refractive index resin containing therein the black colored particles. Subsequently, from the feeder 215 transparent resin is supplied to over substantially the entire length of the roll width to thereby form the transparent resin layer on the die roll 210. Further, over that surface, the base film 217 is applied by taking it out from the base film supply roll 216. Thereafter, the transparent resin is hardened by radiating ionizing radiation again by the ionizing radiation applicator 218. Then, the resulting film is turned back, by the auxiliary roll 219, to the emboss roll 220. By that turn-back process, the cross-sectionally viewed triangle black-colored added low refractive index portion that has been formed in the concavity portion of the surface of the die roll 210 is peeled off from the surface of the roll. At this point in time, as illustrated in the point E enlarged view, a transparent resin layer is formed on the base film, and, further, the transparent resin layer has formed on its upper surface the black-colored particles added low refractive index resin in the form of a triangle in cross section.

On the side of the emboss roll 220, beforehand, high refractive index resin constructing the unit lenses is supplied from the feeder 221 onto the surface of the roll having formed therein a female die for embossing, whereby a high refractive index resin layer is kept formed in a soft state before being hardened. This high refractive index resin layer and the intermediate product, that has been supplied on from the die roll 210, are pressure-bonded to each other by the emboss roll 220 and an auxiliary roll 222. By this bonding-together, the soft high refractive index resin is introduced into between each two adjacent of the cross-sectionally viewed trapezoids formed by the transparent low refractive index layer, with no clearance existing between the both. Further, ionizing radiation is applied, by the ionizing radiation applicator 223, onto the surface of the emboss roll 220 to thereby harden the high refractive index resin. Then, through the use of an auxiliary roll 224, the film is turned back in the opposite direction, thereby exfoliating the hardened high refractive index resin from the emboss roll 220. At this point in time, as illustrated in a point G enlarged view, the group of unit lenses that has been formed by the high refractive index resin layer the cross section of that is trapezoidal is kept formed on the upper surface of the cross-sectionally viewed triangular transparent low refractive index layer. Also, the upper surface of the unit lens has formed therein the embossed portion. Thereafter, that sheet is supplied to a take-up machine and thus is taken up in the form of a roll.

In the production system for the light diffusion sheet S4 according to the ninth embodiment of FIG. 31, it is the black-colored particle mixed transparent high refractive index resin (having a refractive index substantially the same as that of the unit lens portion) that is supplied from the resin feeder 212. Also, in this manufacturing process, the deposition device 225 is provided at the position of the production line after passing through it at the point E. In the deposition device 225, the transparent low refractive index material is deposited from above, and to over, the black-colored particle mixed transparent high refractive index resin to thereby form the transparent low refractive index layer 204 (see the point F enlarged view). The other constructions are the same as the production system for the light diffusion sheet 53 illustrated in FIG. 30.

FOURTH EXAMPLE

As the material of the high refractive index portion 202 (trapezoidal portion) constructing the unit lens, as the transparent low refractive index resin of the between-lens portion 207, and as the light absorption particles, there were, respectively, used epoxy acrylate, urethane acrylate, and the "RUBCOULEUR" (registered trademark) made by Dainichiseika Color & Chemicals Mfg. Co. LTD.

The average particle size of the "RUBCOULEUR" is 8 μm and the amount added thereof has been made 41 mass %.

The refractive index of the high refractive index portion 202 is 1.55 and the refractive index of the between-lens portion 207 is 1.48. On the light incidence side of the sheet that has been constructed in that way, there has been disposed the Fresnel lens sheet, and, on the side of the viewer, there is disposed a diffusion plate. The diffusion plate has an acrylic-made three-layer structure and, as the intermediate layer, there has been used the one having mixed therein a diffusion agent. The lens pitch of the high refractive index portion has been made 50 μm. Also, the length of the upper bottom of the trapezoidal portion of the high refractive index portion 202 and the length of the bottom side of the triangle-like low refractive index portion were set to be equal to each other. The so-called "black stripe proportion" thereby has been so set as to be 50%. Further, the apex angle θ has been set to 10°. And, the pitch of the embossed portion E is set to be 6 μm and the cross-sectional configuration thereof is set to an isosceles triangle (see FIG. 29A).

The light diffusion sheet that has been constructed above had a transmittance of 85%, a reflectance of 5%, and again value of 4. Also, the perpendicular angle of visibility (the half-value angle: the angle at which the brightness that prevails when view is made from that direction becomes half the one that prevails when view is made from the front) is 12° while, on the other hand, the horizontal angle of visibility (the half-value angle) is 30°.

Also, due to the existence of the embossed portion E, the image light had a diffusion angle of approximately 5° and, within the sheet, had an angle of approximately 3°. Of the external light that has perpendicularly entered the screen, the reflected light ray from the inner surface on the image light source side of the embossed portion has been reflected at an angle of approximately 20 degrees, and reached the black stripe portion and is absorbed.

FIFTH EXAMPLE

As the material of the high refractive index portion 202 (trapezoidal portion) constructing the unit lens, as the transparent low refractive index resin of the between-lens portion 207, and as the light absorption particles, there were, respectively, used epoxy acrylate, urethane acrylate, and the "RUBCOULEUR" (registered trademark) made by Dainichiseika Color & Chemicals Mfg. Co. LTD.

The average particle size of the "RUBCOULEUR" is 5 µm and the amount added thereof has been made 41 mass %.

The refractive index of the high refractive index portion 202 is 1.55 and the refractive index of the between-lens portion 207 is 1.48. On the light incidence side of the sheet that has been constructed in that way, there has been disposed the Fresnel lens sheet, and, on the side of the viewer, there is disposed a diffusion plate. The diffusion plate has an acrylic-made single-layer structure and, there has been used the one having mixed therein a diffusion agent. The lens pitch of the high refractive index portion is made 60 µm. Also, the length of the upper bottom of the trapezoidal portion of the high refractive index portion 202 and the length of the bottom side of the triangle-like low refractive index portion were prepared so that the black stripe proportion is so set as to be around 45%. Further, the angle defined by the slant side of the between-lens portion 207 with respect to the normal line to the light emission surface is set, on the viewer side, 10°, and is set, on the image light source side, 8°. Also, the cross sectional configuration of the embossed portion E is in the form of a trapezoid with two equal legs, the bottom angle of that is 10° (see FIG. 29D), and the pitch of it is 7 µm, and the apex portion has been made a flattened portion the length of that is 1 µm.

The light diffusion sheet that has been constructed above had a transmittance of 83%, a reflectance of 5.2%, and a gain value of 4.5. Also, the perpendicular angle of visibility (the half-value angle) is 12° while, on the other hand, the horizontal angle of visibility (the half-value angle) is 25°.

FIRST COMPARATIVE EXAMPLE

The light diffusion sheet according to the fourth example has been evaluated with the embossed portion E being omitted. The light diffusion sheet that has been constructed like that had a transmittance of 84%, a reflectance of 7.5%, and a gain value of 2.7. Also, the perpendicular angle of visibility (the half-value angle) is 15' while, on the other hand, the horizontal angle of visibility (the half-value angle) is 30°.

From the results above, in a case where the embossed portion E does not exist, it proved that the properties of the horizontal diffusion could not be maintained unless constructing so that the amount of diffusion in the diffusion agent mixed sheet 201 might be made large.

Figure 32:
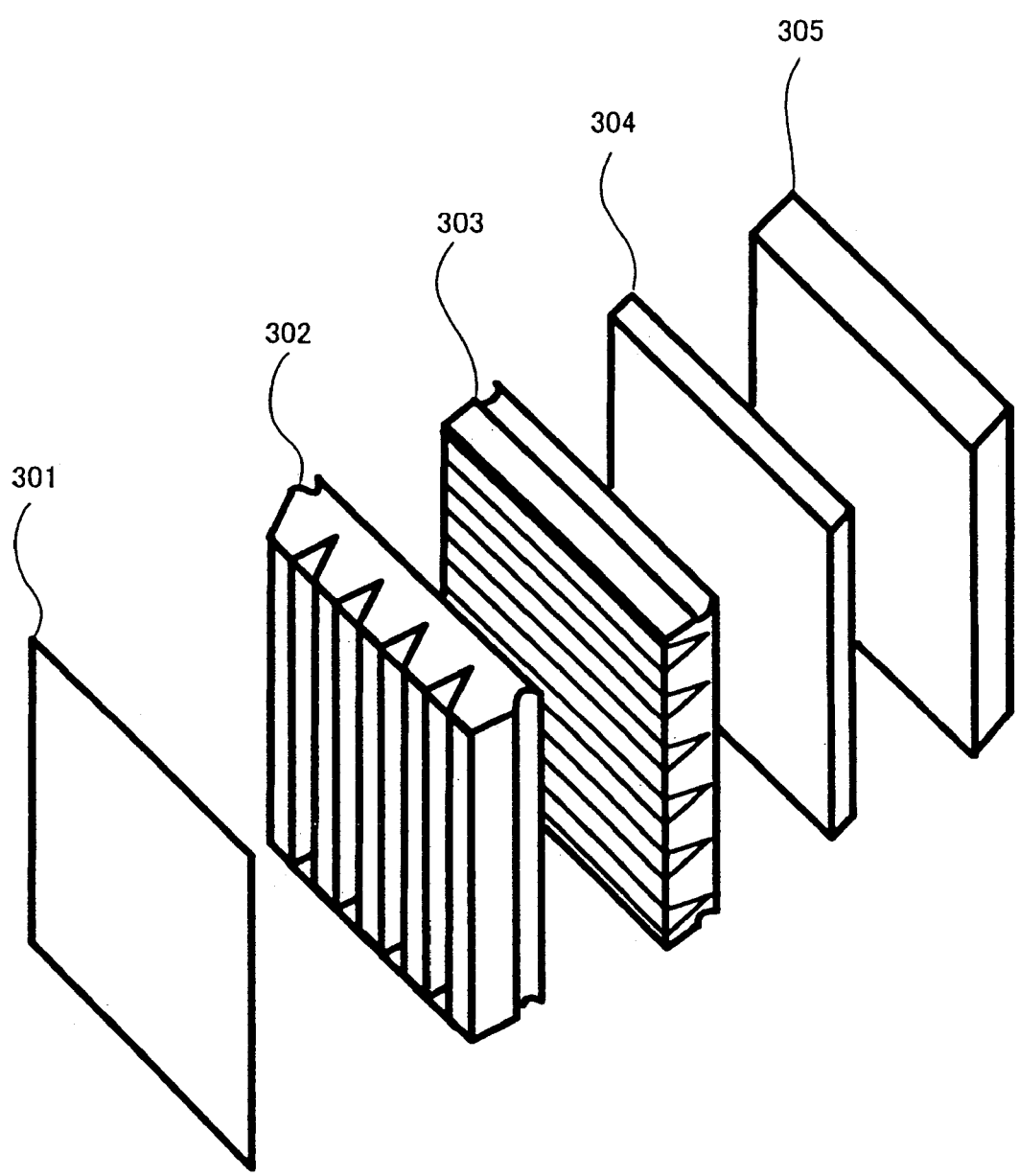
FIG. 32 is a view illustrating an example of the construction of a member with an enlarged two-dimensional angle of visibility.

FIG. 32 illustrates the construction of a display device equipped with a member with an enlarged two-dimensional angle of visibility according to the present invention. In FIG. 32, it is assumed that the position that is located in a leftward/downward, and toward you, direction of the drawing sheet be the viewer side and the zone that is located in a right/upper, and toward the depth, direction of the drawing sheet be the image light source side. The display device of the present invention is equipped, sequentially, from the viewer side, with a functional sheet 301 that has at least one function of an anti-reflection layer, a hard coat layer, a polarizing filter layer, an anti-static layer, an anti-glare processed layer, a soil-proofed layer, and a touch sensor layer, a light diffusion sheet 302 having perpendicularly arrayed thereon the unit lenses, a light diffusion sheet 303 having horizontally arrayed thereon the unit lenses, a Fresnel lens 304, and a liquid crystal display panel 305. It is to be noted that the disposition of the light diffusion sheet 302 and the disposition of the light diffusion sheet 303 may be interchanged with each other. Although in FIG. 32 these sheets are illustrated in a state of being separated from each other, that is for brevity of the illustration, and, actually, these are contacted with each other or bonded together.

Also, in the present invention, the wording "the member with an enlarged two-dimensional angle of visibility" has a constructional core in the respect of two combined sheets of the light diffusion sheet 302 and light diffusion sheet 303. However, if as in FIG. 32 the functional sheet 301 is disposed on the light emission side of that member and the Fresnel lens 304, etc. are disposed on the light incidence side, that member conceptually includes those functional sheet 301 and Fresnel lens 304.

As has been described above, according to a sheet or film for use for a projection screen, the sheet or film being adapted to be used for a screen of a rear surface projection type projection display device and be equipped with a prism surface and a lenticular lens surface, wherein the prism surface and the lenticular lens surface are formed integrally with each other in the way in which their respective reverse surfaces are bonded together; the prism surface is formed, as a total reflection linear Fresnel lens, on at least a part of an image light source side of the display device; and the lenticular lens surface is formed on a viewer side of the linear Fresnel lens in the way in which its cross section is in the shape of a trapezoid, the screen that has been conventionally constructed using two sheets of lens. Therefore, it is possible to reduce the number of the manufacturing processes and thereby greatly enhance the productivity more than in the prior art to thereby contribute to reducing the cost. Also, in a case where compared to the two-sheet-of-lens construction, the screen is also advantageous from the viewpoint of transmittance as well. Further, since the lens configuration is comprised of the linear Fresnel lens and the lenticular lens the cross section of that is trapezoidal, continuous forming on the production line becomes possible. Thereby, it is possible to greatly enhance the productivity from that point of view as well.

Also, if the angle of the slant of the trapezoid of the lenticular lens is formed in the way of being differentiated in the width direction so that the optical axis in the horizontal direction of the image light may be corrected, the correction of the optical axis in the horizontal direction is correctly performed and therefore it is possible to provide an excellent image to the viewer.

Also, constructing in the way the material having a refractive index lower than that of the material constructing the trapezoid is disposed on the viewer side of the slant of the trapezoid, most part of the light rays going toward the viewer through the interior of the lenticular lens is reflected by the slant of the trapezoid. As a result of this, the light diffusion in the horizontal direction can be obtained and it is possible to ensure a large angle of visibility in the horizontal direction.

Further, in a case where constructing in the way the material having a low refractive index is colored, even when there are light rays that are not reflected by the slant of the trapezoid but pass through it, they can be absorbed within the colored low refractive index material.

Also, if forming on the viewer side of the slant surface of the trapezoid a layer of material having a refractive index lower than that of the material constructing the trapezoid, the amount of the low refractive index material can be mitigated to thereby enable the reduction in the weight of the screen. Also, it is possible to further form a third layer over the low refractive index material layer and thereby impart a desired function to the screen.

Also, if providing the light absorption portion on the viewer side of the layer of low refractive index material, even when there are light rays that are not reflected by the slant surface of the trapezoid and pass through it, they can be absorbed by the light absorption portion, whereby it is possible to obtain the effect that is the same as that which is attained when the low refractive index material is colored.

Further, if forming the reflection layer of metal on the viewer side of the slant surface of the trapezoid, regardless of whatever refractive index the material disposed on the viewer side of the slant surface of the trapezoid may have, it is possible almost completely reflect the light rays that are going to transmit through the slant of the trapezoid from the interior of the lenticular lens.

Also, if constructing as the sheet or film for a projection screen that has further provided thereon a diffusion layer on the viewer side of it, the diffusion properties in the horizontal direction and in the perpendicular direction of the screen can be compensated for, with the result that the level of uniformity of the image can be enhanced.

According to the projection screen that has further provided thereon a diffusion sheet on the viewer side of the above-described type of sheet or film for the projection screen, the sheet or film for projection screen having the above described kind of effect can be used for the projection screen. Also, by the diffusion sheet, the diffusion properties in the horizontal and the perpendicular direction of the screen are compensated for, with the result that the uniformity of the image can further be enhanced.

Also, in a case where constructing in the way of having on the viewer side at least one function selected from the group consisting of AR, HC, AS, AG, soil-proofing, and sensor functions, the projection screen can be made to have a third function and as a result the projection screen can be made a product that is attractive to those who demand.

If making the projection display device the one having the above-described projection screen, it is possible to apply the projection screen having the above-described kind of effect to the projection display device.

Further, according to the production method for manufacturing a sheet or film for projection screen that comprises a step of continuously forming a linear Fresnel lens in the longitudinal direction on one-surface side of the base sheet and a step of continuously forming a lenticular lens, the cross sectional configuration of that is trapezoid, on the other-surface side of the base sheet, and according to the production method for manufacturing a projection screen that comprises a step of continuously forming a linear Fresnel lens in the longitudinal direction on one-surface side of the base sheet and a step of continuously forming a lenticular lens, the cross sectional configuration of that is trapezoid, on the other-surface side of the base sheet, and a step of bonding a light diffusion sheet to the surface of the continuously formed lenticular lens, it is possible to manufacture the sheet or film for projection screen and the projection screen by the continuous production line, and, therefore, the productivity is remarkably enhanced and at the same time a great reduction in the production cost can be achieved.

Also, according to a light diffusion sheet or film, the light diffusion sheet or film having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and the unit lens is formed using a material having a prescribed refractive index of N1; a portion, the cross section of that is triangular, and that is located between adjacent two of the unit lenses, is formed using a material having a refractive index N2 lower than the N1 and having added thereto light absorption particles; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as:

$$\sin(90°-\theta) > N2/N1$$

$$N1 < 1/\sin 2\theta$$

$$0 < H < T/(\tan(2\theta+10°) - \tan\theta)$$

the incident light rays that are parallel with the normal line to the light emission surface are totally reflected by the surface of the transparent low refractive index layer of the slant and are emitted toward the viewer side without the occurrence of reflection at the light emission surface. Also, the light ray that has gotten incident at a 10° at maximum angle of inclination with respect to the normal line to the light emission surface and that has been reflected by the surface of the transparent low refractive index layer of each of the trapezoid slants formed by the cross sections of the unit lenses is emitted from the light emission surface toward the viewer side without reaching the transparent low refractive index layer on the trapezoid slants formed by two adjacent of the unit lens cross sections. Also, in the present invention, there has been adopted a construction wherein the portion the cross section of that is triangular is not entirely constructed using the light absorption material but is constructed using a transparent material having dispersed therein the light absorption particles. Therefore, the total reflection at the slant portion is highly efficiently performed. Therefore, it is possible to obtain a light diffusion sheet or film the brightness and contrast of that are respectively high and the stray light of that is less.

Also, in a case where forming the unit lens on the transparent plate-like, or film-like, base member, it is possible to continuously manufacture the arrayed unit lenses using the roll-shaped die.

Also, in a case where bonding the diffusion agent mixed sheet, together, to the viewer side, because the surface on the viewer side can be made a flat surface, machining with respect to that surface becomes easy. In addition, owing to the optical action of the diffusion agent, the gain on the light emission side can be uniformly leveled.

Also, according to the light diffusion sheet or film, the light diffusion sheet or film having formed thereon a plurality of unit lenses one-dimensionally or two-dimensionally, wherein the unit lens is substantially trapezoidal in cross section; the lower bottom of the trapezoid is made to be a light incidence portion and the upper bottom thereof is made to be a light emission portion; and the unit lens is formed using a material having a prescribed refractive index of N1; the portion the cross section of that is triangular and that is located between two adjacent of the unit lenses is formed using a material having a refractive index of N2 lower than the N1 and having added thereto the light absorption particles; and when it is assumed that T represents the length of the upper bottom of the trapezoid; H represents the height of the upper bottom thereof; and θ represents the angle defined by the slant of the trapezoid with respect to a normal line to the light emission portion, the relationship holds true that is expressed as:

$\sin(90°-\theta) > N2/N1$ $N1 < 1/\sin 2\theta$ $0 < H < T/(\tan(2\theta+10°)-\tan\theta)$ and the surface of the light incidence portion has performed thereon emboss processing, because the surface of the light incidence portion has performed thereon emboss processing, the light rays that, of the external light having entered from the light emission portion side of the sheet, reach the light incidence surface of the sheet and are reflected are diffused to get incident upon the slant portion at a great angle. Therefore, those light rays enter the cross-sectionally viewed triangular portion and are absorbed into the light absorption particles, without being subjected to total reflection by the slant portion. Accordingly, the light diffusion sheet or film can have its contrast enhanced. Further, the incident light rays that are parallel with the normal line to the light emission surface within the light diffusion sheet or film are totally reflected by the surface of the slant of the cross-sectionally viewed trapezoid and are emitted toward the viewer side without the occurrence of reflection at the light emission surface. Also, the stray light rays within the sheet or the light rays that have entered from the viewer side are absorbed by the light absorption particles or colored material. Therefore, it is possible to obtain a light diffusion sheet or film the brightness and contrast of that are respectively high.

Also, in a case where constructing in the way the area of the embossing performed portion that, when it is assumed that φ represents the components of the angle in the same direction as in the case of the θ that represents the angle defined by the slant of the embossing performed portion with respect to the light incidence surface; and N3 represents the refractive index of the material forming the embossed portion, satisfies the relationship of;

$\sin(90°-(\sin^{-1}(N3*\sin(2\phi)/N1)+\theta)) < N2/N1$ is 20% or more of the area of the entire incidence surface, under the conditions satisfying the above-described inequality, the external light that has perpendicularly entered the light emission surface from the light emission side is reflected by the surface of the embossed portion and is absorbed into the light absorption particles. Accordingly, by providing the emboss surface satisfying those conditions in an amount that is 20% or more of the entire light incidence surface, it is possible to construct a light diffusion sheet or film the contrast of that is high.

Also, in a case where constructing in the way the components of a light that is diffused 20° or more by the emboss configuration the embossing of that is performed on the light incidence surface are 20% or less, many of the image light rays that have entered the light diffusion sheet or film can reach the viewer side without being absorbed by the light absorption particles of the between-lens portion. Accordingly, it is possible to realize the light diffusion particles the transmittance of that is high.

Also, further, in the description that has been made above, under the conditions satisfying the relationship:

$\sin(90°-(\sin^{-1}(N3/N1)*\sin(\phi-\sin^{-1}(\sin \phi/N3)))+\theta)) < N2/N1$ the image light that has perpendicularly entered the light incidence surface is absorbed into the light absorption particles. Accordingly, by controlling so that the area of the embossed portion satisfying such conditions to a value that is 20% or less of the area of the entire light incidence surface, it is possible to provide a light diffusion sheet or film the transmittance of that is high. Also, in a case where forming the unit lens on the transparent plate-like, or film-like, base member, it is possible to continuously manufacture the arrayed unit lenses using the roll-shaped die.

Also, in a case where bonding the diffusion agent mixed sheet, together, to the viewer side, because the surface on the viewer side can be made a flat surface, machining with respect to that surface becomes easy. In addition, owing to the optical action of the diffusion agent, the gain on the light emission side can be uniformly leveled.

What is claimed is:

1. A light diffusion sheet or film, the light diffusion sheet or film comprising:
   a plurality of unit lenses formed of a material having a refractive index N1, each unit lens having a trapezoidal cross-section, wherein a first base of the trapezoidal cross-section is a light incident side of the respective unit lens and a second base is a light emitting side of the respective unit lens;
   at least one between lens portion, having a triangular cross-section, positioned between two of the unit lenses, wherein the at least one between lens portion is formed of a material having a refractive index N2 that is less than N1, wherein the material includes light absorption particles that account for between 10–60% of the mass of the at least one between lens portion, wherein if θ represents an angle defined by a side of the trapezoidal cross-section and a line normal to a base of the trapezoidal cross-section, then sin(90−θ)>N2/N1 and N1<1/sin(2θ); and
   a base sheet attached to the light incident side of the unit lenses, wherein a portion of the light incident side of the base sheet is embossed.

2. The light diffusion sheet or film of claim 1, further comprising:
   a diffusion agent mixed sheet disposed on the light emitting side of the unit lenses.

3. The light diffusion sheet or film of claim 1, further comprising:
   a Fresnel lens disposed on the side of the base sheet that includes the embossed portion.

4. The light diffusion sheet or film of claim 1, wherein the light adsorption particles have an average particle size of between 1/30 to 2/3 of the length of the light emitting side of each unit lens.

5. The light diffusion sheet or film of claim 1, wherein the triangular cross-section includes two opposing sides each comprising two line segments having a first end and a second end, wherein the two line segments are joined at the respective first ends and curve away from each other such that the second ends are spaced apart.

6. The light diffusion sheet or film of claim 1, wherein the triangular cross-section includes two opposing sides each comprising two line segments having a first end and a second end, wherein the two line segments are joined at the respective first ends and have an angle greater than 90 degrees between the respective second ends.

7. A light diffusion sheet or film, the light diffusion sheet or film comprising:
- a plurality of unit lenses formed of a material having a refractive index N1, each unit lens having a trapezoidal cross-section, wherein a first base of the trapezoidal cross-section is a light incident side of the respective unit lens and a second base is a light emitting side of the respective unit lens;
- at least one between lens portion, having a triangular cross-section, positioned between two of the unit lenses, wherein the at least one between lens portion is formed of a material having a refractive index N2 that is less than N1, wherein the material includes light absorption particles having an average particle size of between 1/30 to 2/3 of the length of the light emitting side of each unit lens, wherein if θ represents an angle defined by a side of the trapezoidal cross-section and a line normal to a base of the trapezoidal cross-section, then sin(90−θ)>N2/N1 and N1<1/sin(2θ);
- a base sheet attached to the light incident side of the unit lenses, wherein a portion of the light incident side of the base sheet is embossed.

8. The light diffusion sheet or film of claim 7, further comprising:
- a diffusion agent mixed sheet disposed on the light emitting side of the unit lenses.

9. The light diffusion sheet or film of claim 7, further comprising:
- a Fresnel lens disposed on the side of the base sheet having the embossed portion.

10. A light diffusion sheet or film, the light diffusion sheet or film comprising:
- a plurality of unit lenses formed of a material having a refractive index N1, each unit lens having a trapezoidal cross-section, wherein a first base of the trapezoidal cross-section is a light incident side of the respective unit lens and a second base is a light emitting side of the respective unit lens;
- at least one between lens portion, having a triangular cross-section, positioned between two of the unit lenses, wherein the at least one between lens portion is formed of a material having a refractive index N2 that is less than N1, wherein the material is either colored or includes light absorption particles, wherein if θ represents an angle defined by a side of the trapezoidal cross-section and a line normal to a base of the trapezoidal cross-section, then sin(90−θ)>N2/N1 and N1<1/sin(2θ); and
- a base sheet attached to the light incident side of the unit lenses, wherein at least 20% of the light incident side of the base sheet includes an embossed portion, and wherein components of light are diffused 3° or more by the embossed portion.

11. The light diffusion sheet or film of claim 10, wherein the light emitting side of the unit lens is convex.

12. The light diffusion sheet or film of claim 10, further comprising:
- a diffusion agent mixed sheet disposed on the light emitting side of the unit lenses.

13. The light diffusion sheet or film of claim 10, wherein the embossed portion is embossed at 1/15 to 1/1.5 of a pitch of the light emitting side of the unit lens.

14. The light diffusion sheet or film of claim 10, further comprising:
- a Fresnel lens disposed on the side of the base sheet having the embossed portion, the Fresnel lens selected from the group consisting of a refraction Fresnel lens, a total reflection Fresnel lens, and a combination of refraction/total reflection Fresnel lens.

15. The light diffusion sheet or film of claim 10, wherein the material includes light absorption particles having an average particle size of between 1/30 to 2/3 of the length of the light emitting side of each unit lens.

16. The light diffusion sheet or film of claim 10, wherein the triangular cross-section includes two opposing sides each comprising two line segments having a first end and a second end, wherein the two line segments are joined at the respective first ends and curve away from each other such that the second ends are spaced apart.

17. The light diffusion sheet or film of claim 10, wherein the triangular cross-section includes two opposing sides each comprising two line segments having a first end and a second end, wherein the two line segments are joined at the respective first ends and have an angle greater than 90 degrees between the respective second ends.

18. A light diffusion sheet or film, the light diffusion sheet or film comprising:
- a plurality of unit lenses formed of a material having a refractive index N1, each unit lens having a trapezoidal cross-section, wherein a first base of the trapezoidal cross-section is a light incident side of the respective unit lens and second base is a light emitting side of the respective unit lens;
- at least one between lens portion, having a triangular cross-section, positioned between two of the unit lenses, wherein the at least one between lens portion is formed of a material having a refractive index N2 that is less than N1, wherein the material is either colored or includes light absorption particles, wherein if θ represents an angle defined by a side of the trapezoidal cross-section and a line normal to a base of the trapezoidal cross-section, then sin(90−θ)>N2/N1 and N1<1/sin(2θ); and
- a base sheet attached to the light incident side of the unit lenses, wherein at least 20% of one surface of the base sheet includes an embossed portion, wherein components of light are diffused 3° or more by the embossed portion and satisfies a relationship of sin(90°−(sin$^{-1}$(N3*sin(2φ)/N1)+θ))<N2/N1, when it is assumed that φ represents components of an angle, in a same direction as θ, defined by the slant of the embossed portion with respect to the surface of the base sheet, and N3 represents the refractive index of material forming the embossed portion, wherein a configuration of a section, as sectioned by a plane perpendicular to the light emission portion, of the light incidence is in a shape of a chipped piece of an ellipse and/or a chipped piece of a polygon.

19. The light diffusion sheet or film of claim 18, wherein the light emitting side of the unit lens is convex.

20. The light diffusion sheet or film of claim 18, further comprising:
- a diffusion agent mixed sheet disposed on the light emitting side of the unit lenses.

21. The light diffusion sheet or film of claim 18, wherein the embossed portion is embossed at 1/15 to 1/1.5 of a pitch of the light emitting side of the unit lens.

22. The light diffusion sheet or film of claim 18, further comprising:
   a Fresnel lens disposed on the side of the base sheet having the embossed portion, the Fresnel lens selected from the group consisting of a refraction Fresnel lens, a total reflection Fresnel lens, and a combination of refraction/total reflection Fresnel lens.

23. The light diffusion sheet or film of claim 18, wherein the light emitting side of the unit lens is convex.

24. The light diffusion sheet or film of claim 18, wherein the triangular cross-section includes two opposing sides each comprising two line segments having a first end and a second end, wherein the two line segments are joined at the respective first ends and curve away from each other such that the second ends are spaced apart.

25. The light diffusion sheet or film of claim 18, wherein the two line segments are joined at the respective first ends and have an angle greater than 90 degrees between the respective second ends.

26. A light diffusion sheet or film, the light diffusion sheet or film comprising:
   a plurality of unit lenses formed of a material having a refractive index N1, each unit lens having a trapezoidal cross-section, wherein a first base of the trapezoidal cross-section is a light incident side of the respective unit lens and a second base is a light emitting side of the respective unit lens, and wherein at least one side of the trapezoidal cross-section extends in a direction that is vertical with respect to the orientation of the light diffusion sheet or film when it is in use;
   at least one between lens portion, having a triangular cross-section, positioned between two of the unit lenses, wherein the at least one between lens portion is formed of a material having a refractive index N2 that is less than N1, wherein if $\theta$ represents an angle defined by a side of the trapezoidal cross-section and a line normal to a base of the trapezoidal cross-section, then $\sin(90-\theta) > N2/N1$ and $N1 < 1/\sin(2\theta)$;
   a base sheet attached to the light incident side of the unit lenses, wherein a portion of the light incident side of the base sheet is embossed; and
   a Fresnel lens disposed on the side of the base sheet that includes the embossed portion.

* * * * *